(12) United States Patent
Katsuda et al.

(10) Patent No.: US 6,234,521 B1
(45) Date of Patent: May 22, 2001

(54) AIRBAG INFLATOR AND AN AIRBAG APPARATUS

(75) Inventors: Nobuyuki Katsuda; Shingo Oda, both of Hyogo; Masayuki Ueda, Kanagawa, all of (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 08/829,314

(22) Filed: Mar. 31, 1997

(30) Foreign Application Priority Data

| Apr. 8, 1996 | (JP) | 8-085389 |
| Apr. 8, 1996 | (JP) | 8-085390 |
| Jul. 31, 1996 | (JP) | 8-202460 |
| Jul. 31, 1996 | (JP) | 8-202461 |
| Jul. 31, 1996 | (JP) | 8-202462 |
| Jul. 31, 1996 | (JP) | 8-202463 |
| Jul. 31, 1996 | (JP) | 8-202464 |
| Aug. 29, 1996 | (JP) | 8-228620 |
| Oct. 31, 1996 | (JP) | 8-290348 |
| Oct. 31, 1996 | (JP) | 8-290349 |

(51) Int. Cl.$^7$ ................................................. B60R 21/26
(52) U.S. Cl. ........................ 280/736; 280/741; 280/742
(58) Field of Search ...................... 280/741, 742, 280/737, 736

(56) References Cited

U.S. PATENT DOCUMENTS

| 3,986,456 | 10/1976 | Doin et al. . | |
| 4,547,342 | 10/1985 | Adams . | |
| 4,890,860 | 1/1990 | Schneiter . | |
| 4,902,036 | 2/1990 | Zander et al. . | |
| 5,269,561 | 12/1993 | Davis et al. . | |
| 5,314,203 | 5/1994 | Adams et al. . | |
| 5,340,151 | * 8/1994 | Sato | 280/743.1 |
| 5,433,475 | 7/1995 | Kokeguchi . | |
| 5,439,249 | * 8/1995 | Steffens, Jr. et al. | 280/735 |
| 5,454,586 | * 10/1995 | Rogerson | 280/728.2 |
| 5,458,371 | 10/1995 | Fulmer et al. . | |
| 5,466,420 | 11/1995 | Parker et al. . | |
| 5,487,561 | 1/1996 | Mandzy et al. . | |
| 5,503,806 | * 4/1996 | Fulmer et al. | 280/736 |
| 5,507,891 | 4/1996 | Zeigler . | |
| 5,551,725 | 9/1996 | Ludwig . | |
| 5,556,130 | 9/1996 | Fulmer . | |
| 5,564,741 | 10/1996 | Ward et al. . | |
| 5,566,973 | * 10/1996 | Green et al. | 280/732 |
| 5,613,705 | 3/1997 | Hock et al. . | |
| 5,624,134 | 4/1997 | Iwai et al. . | |
| 6,033,500 | 3/2000 | Ito et al. . | |

FOREIGN PATENT DOCUMENTS

| 1095243 | 2/1981 | (CA) . |
| 2329558 A1 | 1/1975 | (DE) . |
| 3742383 A1 | 6/1989 | (DE) . |
| 3923046 A1 | 1/1991 | (DE) . |
| 4444490 A1 | 8/1996 | (DE) . |
| 0012627 A2 | 6/1980 | (EP) . |
| 0405962 A3 | 1/1991 | (EP) . |
| 0476886 A1 | 3/1992 | (EP) . |
| 0504408 A1 | 9/1992 | (EP) . |
| 0509655 A1 | 10/1992 | (EP) . |
| 0589042 A1 | 3/1994 | (EP) . |

(List continued on next page.)

Primary Examiner—Eric Culbreth

(57) ABSTRACT

An airbag inflator includes non-azide gas generating propellants, surrounding an ignition device, disposed inside a housing. The gas generating propellants are surrounded by a coolant/filter device having a pressure loss of $0.3 \times 10^{-2}$ to $1.5 \times 10^{-2}$ kg/cm$^2$ at a flow rate of 100 l/min/cm$^2$. A space is provided between an outer periphery of the coolant/filter device and the housing such that the combustion gas passes through the entire area of the coolant/filter device. The coolant/filter device is also surrounded by a swell suppressing layer which prevents the coolant/filter device from swelling due to a combustion of the gas generating propellants.

103 Claims, 22 Drawing Sheets

FOREIGN PATENT DOCUMENTS

| | | |
|---|---|---|
| 0623373 A1 | 11/1994 | (EP) . |
| 0640515 A1 | 3/1995 | (EP) . |
| 0800964 | 10/1997 | (EP) . |
| 2693122 A1 | 1/1994 | (FR) . |
| 49-044434 | 4/1974 | (JP) . |
| 50-156952 | 12/1975 | (JP) . |
| 5024498A | 2/1993 | (JP) . |
| 523511 | 2/1993 | (JP) . |
| 5200216 | 8/1993 | (JP) . |
| 6183310 | 7/1994 | (JP) . |
| 747911A | 2/1995 | (JP) . |
| 752748A | 2/1995 | (JP) . |
| 7267040A | 10/1995 | (JP) . |
| 7267041A | 10/1995 | (JP) . |
| 7285413 | 10/1995 | (JP) . |
| 8183687A | 7/1996 | (JP) . |
| 3033793 | 11/1996 | (JP) . |
| 3035865 | 1/1997 | (JP) . |
| 10-095302 | 4/1998 | (JP) . |
| 93 18940 A2 | 9/1993 | (WO) . |
| 93 21040 A1 | 10/1993 | (WO) . |
| 94 14637 A1 | 7/1994 | (WO) . |
| 94 25315 A1 | 11/1994 | (WO) . |
| 94 27842 A1 | 12/1994 | (WO) . |
| 94 27842A | 12/1994 | (WO) . |
| 96 08302 A2 | 3/1996 | (WO) . |
| 96 08302A | 3/1996 | (WO) . |
| 96 10494 | 11/1996 | (WO) . |
| 97 05087 A1 | 2/1997 | (WO) . |

\* cited by examiner

AIRBAG INFLATOR AND AN AIRBAG APPARATUS

FIELD OF THE INVENTION

This invention relates to airbag inflators and systems utilizing same for the enhancement of driver and passenger protection, including side impact protection, in motor vehicles and the like.

BACKGROUND OF THE INVENTION

Conventional airbag inflators are relatively complex structures with such as forged housings defining internal ignition, combustion, and filter chambers by integrally formed and/or welded internal partitions. Furthermore, coolant structures, such as filters formed from heat conductive materials and the like, in many cases require the foregoing structural complexities in order to withstand the temperatures and pressures generated within these inflator structures.

Many such conventional inflators use azide based gas generating materials such as sodium azide based materials which have relatively high burn rates and undesirable toxicity levels and products of combustion such as mists and ash associated therewith.

Accordingly, there is a need in the prior art for more simplistic inflator structures, such as those formed from sheet metal having internal chambers formed in part by improved coolant/filter structures and utilizing non-azide propellants having controllable burn rates, gas volume production, internal pressures, and internal temperatures to increase the effectiveness of airbag inflators while reducing the size and the cost thereof and producing lesser amounts of undesirable products of combustion such as mists and ash.

The azide-based gas generating material ($NaN_3$/CuO, for example) has a relatively high linear burning velocity of about 45–50 mm/sec under the pressure of 70 $kg/cm^2$. Because of the relatively high linear burning velocity, the azide-based gas generating material, even in the form of relatively large pellets or disk-shaped pieces with an excellent shape retention capability, can satisfy the required complete combustion time of 40–60 msec when used, for example, in the airbag inflator for the airbag at the driver's seat.

Non-azide gas generating materials have been developed which are excellent in terms of impacts on environment and safety of passengers. Such materials, however, have the linear burning velocity of less than 30 mm/sec in general. If we assume that the linear burning velocity is about 20 mm/sec and that the gas generating material is manufactured in the form of pellets 2 mm in diameter or disks 2 mm thick, which are advantageous in retaining their shapes, the combustion speed will be about 100 mm/sec, which fails to meet the desired combustion time of 40–60 msec. When the linear burning velocity is approximately 20 mm/sec, to obtain the desired combustion time requires the material's pellet diameter or disk thickness to be about 1 mm. When the linear burning velocity is less than 10 mm/sec, the gas generating material's disk is required to have a thickness of 0.5 mm or less. Thus, it is practically impossible to manufacture the gas generating material in the form of pellets or disks that are industrially stable and can withstand many hours of vibrations of an automobile. It has been difficult to develop the airbag inflator that meets the desired performances.

By way of specific example, reference is made to FIG. 9 wherein is shown a conventional airbag inflator such as disclosed in U.S. Pat. No. 4,547,342 of Adams et al., Oct. 15, 1985.

A housing 40 has a diffuser shell 41 and a closure shell 42. The diffuser shell 41 is formed by forging and has three concentric cylinders 43, 44, 45 formed integral with a circular portion 46. Like the diffuser shell 41, the closure shell 42 is also formed by forging and has three concentric welded portions 50, 51, 52. The diffuser shell 41 and the closure shell 42 are joined together at these welded portions 50, 51, 52 by friction welding. It is common with the prior art to form the shells of the airbag inflator by forging.

In this airbag inflator, the cylinder 43 defines an ignition means accommodating chamber 53, the cylinder 44 defines a combustion chamber 54, and the cylinder 45 defines a coolant/filter chamber 55. The ignition means accommodating chamber 53 accommodates an ignition means comprising an igniter 56 and a transfer charge 47. In the combustion chamber 54 there are installed pellets of a gas generating material 57, ignited by the ignition means to produce a gas, and a first coolant/filter 58 surrounding the gas generating material 57 to cool the combustion gas and arrest combustion particulates. In the coolant/filter chamber 55 is installed a second coolant/filter 59 to further cool the combustion gas and arrest combustion particulates.

A PROBLEM TO BE SOLVED BY THE INVENTION

Forged products, though they are homogeneous in the metal structure and highly tenacious, have a drawback of high cost. When the shell members having many concentric cylinders as disclosed in the above U.S. patent are manufactured by forging, the circular portion 46 is not flat and requires a cutting work, increasing the number of manufacturing processes and therefore cost. In the shell member having the cylinder 43 formed integral with the circular portion 46 as in the above U.S. patent, when the volume of the cylinder 43 is to be changed, the overall shape of the diffuser shell 41 needs to be changed. Changing the volume of the cylinder 43 therefore is not easy. In the above conventional airbag inflator, because the coolant/filter chamber is formed outside the combustion chamber, the diameter of the airbag inflator becomes large, increasing its size and weight. Further, because the combustion chamber is defined by the cylinder 44 of the diffuser shell, the diffuser shell is complex in shape, making the manufacture of the airbag inflator difficult and increasing the cost.

As a further example, a coolant for an airbag inflator is obtained by rolling a strip-like metal mesh into a multi-layer cylinder and works to cool a combustion gas generated in the combustion chamber of the airbag inflator as it passes therethrough and to entrap relatively large combustion particulates. FIG. 12 illustrates an airbag inflator equipped with a conventional coolant similar to that shown in U.S. Pat. No. 4,902,036 to Zander et al., issued Feb. 20, 1990. The airbag inflator comprises a housing 231 having gas discharge ports 230, an ignition means accommodating chamber 232 defined at a central portion in the housing 231, a combustion chamber 233 defined on the outer side of the ignition means accommodating chamber 232, and a coolant/filter chamber 234 defined on the outer side of the combustion chamber 233. In the ignition means accommodating chamber 232 are disposed an ignition means or an igniter 235 and a transfer charge 236, in the combustion chamber 233 is disposed a canister 238 filled with a gas generating material 237 which is ignited by the ignition means and generates a gas, and in the coolant/filter chamber 234 are disposed a coolant 239 for cooling the combustion gas generated in the combustion chamber 233 and a filter 240 for cleaning the combustion gas. The combustion chamber 233 is defined by a cup-like combustor cup 243 having ports 244 for releasing the combustion gas and a center hole 245 formed in the bottom thereof. The coolant/filter chamber 234 is divided by a retainer 242 into an upper chamber and a lower chamber, the upper chamber containing a filter 240 and the lower chamber containing a coolant 239.

When a sensor (not shown) detects an impact, a signal is sent to the igniter 235 which is then actuated to ignite the transfer charge 236 to produce flame of a high temperature and high pressure. The flame passes through an opening 241, breaks through the wall of the canister 238 and ignites the gas generating material 237 contained therein. Thus, the gas generating material 237 burns to generate a gas which gushes through the ports 244 formed in the combustor cup 243 and is cooled as it passes through the coolant 239. Here, relatively large combustion particulates are entrapped and the remaining combustion particulates are entrapped as the gas further passes through the filter 240. The gas that is cooled and cleaned is discharged through the gas discharge ports 230 and flows into an airbag (not shown). Thus, the airbag inflates to form a cushion between a passenger and a hard structure to protect the passenger from the impact.

The conventional coolant still has a problem from the standpoint of effectively entrapping fine combustion particulates because of its simple clearance structure. Therefore, a filter must be used in addition to the coolant. Moreover, the conventional coolant has a small pressure loss (has a good gas permeability), which makes it difficult to define a pressure chamber such as combustion chamber. It is therefore necessary to form a combustion chamber separately from the coolant by using a defining member such as combustor cup, combustion ring, etc.

Therefore, the airbag inflator equipped with the conventional coolant uses an increased number of parts, and has an increased diameter resulting in an increase in the size and weight.

Furthermore, the conventional coolant having a small bulk density (a value obtained by dividing a mass of the molded article by a bulk volume thereof) is not capable of defining a pressure chamber, has a small shape-retaining strength and is, hence, deformed upon the application of a gas pressure, adversely affecting the entrapping of combustion particulates.

OBJECTS OF THE INVENTION

It is an object of the present invention to provide an improved and relatively simplistic airbag inflator structure.

Another object of the present invention is to provide an improved airbag inflator structure utilizing a coolant/filter structure to define an outer peripheral boundary of a combustion chamber within said inflator containing a gas generating material.

Another object of the present invention is to provide an improved and simplistic airbag inflator structure utilizing non-azide gas generating materials.

Still another object of the present invention is to provide an improved and simplistic airbag inflator structure using non-azide gas generating materials and improved coolant/filter structures defining an outer periphery of a combustion chamber within said inflator containing said non-azide gas generating materials.

Still another object of the present invention is to provide an improved and simplistic airbag inflator structure incorporating an improved cooperation between the outer housing of said structure and an internal coolant/filter structure defining an outer periphery of a combustion chamber internal to said outer housing.

Yet another object of the present invention is to provide airbag inflator structures and systems for driver, passenger, and side impact applications utilizing the structures, components, and/or propellants of the present invention.

These and other objects of the present invention will become more fully apparent with reference to the following specification and drawings which are directed to several preferred embodiments, components, and propellants forming a part of and/or associated with the inflators of the present invention.

SUMMARY OF THE INVENTION

A. The Overall Structure

The airbag inflator of this invention comprises: a housing having a diffuser shell and a closure shell, the diffuser shell being formed by pressing a metal plate and having gas discharge ports, the closure shell being formed by pressing a metal plate and having a center hole; a central cylinder member made of a pipe, installed in the housing, and disposed concentric with the center hole to form an ignition means accommodating chamber; and a coolant/filter disposed surrounding the central cylinder member to define a combustion chamber for a gas generating means and having a pressure loss of $0.3 \times 10^{-2}$ to $1.5 \times 10^{-2}$ kg/cm$^2$ at a flow rate of 100 l/min/cm$^2$ at a normal temperature, the coolant/filter being adapted to cool a combustion gas and arrest combustion particulates; wherein a gas generated in the combustion chamber when an impact occurs is introduced into an airbag to protect a passenger from the impact. The terms "coolant/filter" and "coolant-filter" used herein refer to filter means which both cools combustion gases and scavenges residues therefrom.

One preferred embodiment of the airbag inflator of this invention thus includes a diffuser shell, a closure shell, a central cylinder member, and a coolant/filter. These four members are manufactured separately. That is, the diffuser shell and the closure shell are formed by pressing a metal plate; the central cylinder member is made, preferably, by rolling a metal plate into a cylinder and welding its opposing sides; and the coolant/filter is made, preferably, by stacking flat plaited metal meshes in a radial direction and compressing them in radial and axial directions.

By separating from the diffuser shell the central cylinder member that has been formed integral with the circular portion of the diffuser shell in the prior art, the shape of the diffuser shell is simplified. Because of this separated forming, the volume of the central cylinder member can be changed as required independently of the diffuser shell. The central cylinder member can be manufactured at low cost by using, for example, the UO press method. Such a welded pipe can be made by the UO press method (which involves the steps of forming a plate in a U shape, then forming it into an O shape, and welding the seam) or an electro-resistance-welding method (which involves the steps of rolling a plate into a cylinder and passing a large current while applying a pressure at the seam to weld the seam by resistance heat).

Forming the diffuser shell and the closure shell by pressing makes their manufacture easy and reduces their manufacture cost.

The coolant/filter of the airbag inflator is arranged surrounding the central cylinder member to define, together with the housing, a combustion chamber for a gas generating means. Further, because of its relatively large, predetermined pressure loss, the coolant/filter of the airbag inflator of this invention can arrest combustion contaminants or particulates contained in the combustion gas with good efficiency. Hence, the filter that has conventionally been provided in addition to a coolant can be obviated.

An alternative embodiment of the inflator structure eliminates the central cylinder by use of an ignition canister centrally located in the housing and mounted on the closure shell within the combustion chamber defined by the coolant/filter and the housing. The coolant/filter is referred to herein as a coolant/filter structure or device to better describe its duality of function in cooling and filtering gas generated by the preferably non-azide gas generating material.

In one preferred embodiment, the pressure loss through the coolant/filter structure is preferably set at $0.5 \times 10^{-2}$ to $1.2 \times 10^{-2}$ kg/cm$^2$ at the flow rate of 100 l/min/cm$^2$ at normal temperatures. More preferably, it is set at $0.7 \times 10^{-2}$ to $0.9 \times 10^{-2}$ kg/cm$^2$ at the flow rate of 100 l/min/cm$^2$ at normal temperatures. In the case where an additional mesh layer is provided to strengthen the coolant/filter, that layer has a pressure loss of at least $1.5 \times 10^{-2}$ kg/cm$^2$ under these same conditions.

A suitable solid gas generating means for the airbag inflator includes pellets of a gas generating material of NQ/Sr(NO$_3$)$_2$/CMC. This is a mixture of 32.4% NQ (nitroguanidine) by weight, 57.6% Sr(NO$_3$)$_2$ (strontium nitrate) by weight, and 10% CMC (carboxymethylcellulose) by weight. NQ functions as a fuel, Sr(NO$_3$)$_2$ as an oxidizing agent, and CMC as a binder.

The solid gas generating material preferably has a linear burning velocity of 5–30 mm/sec under the pressure of 70 kg/cm$^2$ and more preferably 5–15 mm/sec.

The diffuser shell and the closure shell are made of a stainless steel plate 1.2 to 3.0 mm thick. The diffuser shell has the outer diameter of 45 to 75 mm and the closure shell 45 to 75 mm. It is preferred that a narrow space 1.0 to 4.0 mm wide be formed between an outer circumferential wall formed by the diffuser shell and closure shell and the coolant/filter.

The diffuser shell and the closure shell together form the housing of the airbag inflator, and at least one of the shells may be formed with a mounting flange. The diffuser shell and the closure shell are joined together by a variety of welding methods, such as plasma welding, friction welding, projection welding, electron beam welding, laser welding and TIG arc welding. As to the material of the diffuser shell and the closure shell, a nickel-plated steel plate may be used instead of the stainless steel plate. The narrow space between the outer circumferential wall formed by the diffuser shell and closure shell has a role as a gas passage, through which the gas cooled and cleaned by the coolant/filter passes to reach the gas discharge ports of the diffuser shell.

The gas discharge ports of the diffuser shell may have a diameter of 2.0 to 5.0 mm and a total of 12 to 24 such ports may be arranged in the circumferential direction.

The central cylinder member for an electrically activated inflator is formed of a pipe, which is made by rolling a stainless steel plate 1.2 to 3.0 mm thick into a cylinder 17 to 22 mm in outer diameter and welding the opposing sides. In the case of a mechanically-actuated inflator, the central cylinder plate is 1.5 to 7.5 mm thick with an outside diameter of 19 to 30 mm.

The central cylinder member preferably has a total of six to nine through-holes 1.5 to 3.0 mm across arranged in the circumferential direction. These through-holes are arranged in two staggered rows, one of which may consist, for example, of three through-holes 1.5 mm in diameter and the other may consist of three through-holes 2.5 mm in diameter. The central cylinder member forms a hollow chamber for accommodating an ignition means comprising an igniter and a transfer charge. The through-holes allow flames of the transfer charge to be ejected therethrough. The central cylinder member has its inner circumferential portion tapped with a female thread and the igniter is formed with a male thread at its outer circumferential portion. By screwing the igniter into the central cylinder member, the ignition means can be securely fixed in the central cylinder member. Alternatively, the central cylinder member may have a swaged portion at one end, which is swaged to fix the ignition means to the central cylinder member. It can also be secured by welding. The method of fixing the central cylinder member to the diffuser shell includes friction welding, projection welding, laser welding, arc welding and electron beam welding.

The coolant/filter is preferably made by stacking the flat-plaited metal meshes in the radial direction and then compressing them in the radial and axial directions. The coolant/filter thus formed has a complex clearance structure and thus an excellent arresting capability. In this way, an integrated coolant/filter having both the cooling function and the arresting function is realized. In a preferred embodiment, such a coolant/filter has a pressure loss of $0.3 \times 10^{-2}$ to $1.5 \times 10^{-2}$ kg/cm$^2$ under the conditions of a normal temperature and a flow rate of 100 l/min/cm$^2$.

In more concrete terms, the steps of making the coolant/filter involves forming a flat-plaited stainless steel mesh into a cylinder, repetitively folding one end portion of the cylinder outwardly to form an annular multi-layer body, and compressing the multi-layer body in a die. Alternatively, the coolant/filter may be made by forming a flat-plaited stainless steel mesh into a cylinder, pressing the cylinder in the radial direction to form a plate member, rolling the plate member into a multi-layer cylinder body, and compressing the multi-layer cylinder body in a die. The stainless steels used for the meshes include SUS304, SUS310S, and SUS316 (JIS Standard). SUS304 (18Cr-8Ni-0.06C), an austenite stainless steel, exhibits an excellent corrosion resistance.

The coolant/filter may also be formed in a double layer structure having a mesh with a wire diameter of 0.3 to 0.5 mm and, on the inner side of the mesh, a layer 1.5 to 2.0 mm thick of a mesh with a wire diameter of 0.5 to 0.6 mm. The inner mesh layer has a coolant/filter protection function, i.e., protecting the coolant/filter against the flames from the ignition material ejected toward the coolant/filter and against the combustion gas produced when the gas generating material is ignited and burned by the flames.

The coolant/filter may have an outer diameter of 55 to 65 mm, an inner diameter of 45 to 55 mm and a height of 26 to 32 mm, namely, a thickness of 5 to 10 mm. Alternatively, the outer diameter may be 40 to 65 mm, the inner diameter 30 to 55 mm and the height 19 to 37.6 mm. The coolant/filter preferably has a coolant/filter support member for blocking its displacement. The coolant/filter support member has a flame resisting portion that is disposed facing the flame through-holes formed in the central cylinder member and covers the inner circumferential surface of the coolant/filter. The flame resisting portion has a coolant/filter protection function to protect the coolant/filter from the flames ejected toward the coolant/filter, and a combustion facilitating function to change the direction of flame propagation to ensure that the flames from the ignition material reach the entire gas generating material. The coolant/filter support member may be formed of a stainless steel plate or steel plate 0.5 to 1.0 mm thick.

To prevent entry of external moisture into the housing, the gas discharge ports of the diffuser shell are preferably closed with an aluminum sealing tape having a width 2 to 3.5 times the diameter of the gas discharge ports. Sticking of the aluminum tape can be achieved by using, for example, adhesive aluminum tapes or bonding agents and, more preferably, hot melt adhesives that are melted by heat and can offer secure bonding.

A cushion for the gas generating material can be installed in the combustion chamber. The cushion is made of a stainless steel mesh and secured to an inner surface of the closure shell. The support plate preferably has bent portions at its inner and outer circumferential portions, whose elasticity securely positions the support plate between the central cylinder member and the coolant/filter. When the cushion is formed of a stainless steel mesh, it can also serve as a coolant. The cushion can also be formed of a silicon foamed body.

The overall height of the housing is preferably in the range of between 30 and 35 mm.

The coolant/filter has a predetermined wire diameter and a predetermined bulk density. The proper setting of the wire diameter and the bulk density also make it possible to arrest combustion particulates of the burning gas well and increase the shape retaining strength of the coolant/filter significantly, thus preventing the coolant/filter from being deformed by the gas pressure, assuring the normal function of arresting combustion contaminant particulates and allowing the coolant/filter to be reduced in thickness. This bulk density is preferably from 3.5 to 4.5 g/cm$^3$, but may be from 3.0 to 5.0 g/cm$^3$ with a wire diameter of 0.3 to 0.6 mm.

Instead of a metal mesh, a sintered metal may be used to form the coolant/filter device. The coolant/filter can also be made from a composite material of metal and ceramics or from a foamed metal body.

Several other embodiments of the coolant/filter structure are provided and will be more fully described in the detailed description of the invention in connection with the accompanying drawings.

The present invention also can be utilized in an aluminum housing such that as disclosed in U.S. Pat. No. 5,466,420. In this case, the housing, having a thickness of 2–4 mm, is formed by means other than press forming, and the diffuser shell is connected to the closure shell by friction welding.

The airbag inflator apparatus of the present invention comprises:
an airbag inflator including:
  a housing having a diffuser shell and a closure shell, the diffuser shell being formed by pressing a metal plate and having gas discharge ports, the closure shell being formed by pressing a metal plate and having a center hole;
  a central cylinder member made of a pipe, installed in the housing, and disposed concentric with the center hole to form an ignition means accommodating chamber; and
  a coolant/filter made of a metal mesh with a wire diameter of 0.3 to 0.6 mm, having a bulk density of 3.0 to 5.0 g/cm$^3$, disposed surrounding the central cylinder member to define a combustion chamber for a gas generating means and having a pressure loss of 0. 3×10$^{-2}$ to 1.5×10$^{-2}$ kg/cm$^2$ at a flow rate of 100 l/min/cm$^2$ at a normal temperature, the coolant/filter being adapted to cool a combustion gas and arrest combustion particulates;
an impact sensor for detecting an impact and outputting an impact detection signal;
a control unit for receiving the impact detection signal and outputting a drive signal to the ignition means of the airbag inflator;
an airbag to be inflated by admitting a gas generated by the airbag inflator; and
a module case for accommodating the airbag.

B. Short Pass Prevention

Another embodiment of the invention provides the ability to form the inflator housing of relatively thin stock by preventing gases from distorting the housing and by-passing the end faces of the coolant/filter as a result of this distortion. The present invention provides a combined coolant/filter and cooperative baffle structure precluding such a short pass or bypass of the coolant/filter, as will be more fully described in the detailed description of the drawings. Without such preventative structure, unfiltered combustion particulates can exit the inflator and damage the associated airbag. The structures provided are for both driver, passenger, and side impact inflator configurations.

C. Housing Parameters Accommodating Non-Azide Propellants

In order to accommodate the relatively slow burning velocities (less than 30 mm/sec) of many non-azide propellants, and to insure complete combustion of the gas generating materials in the proper time intervals for driver, passenger, and side impact applications, there is adjusted a ratio A/At, where A is the total surface area of the gas generating material and At is the total area of the gas discharge or gas diffuser ports in the diffuser shell of the inflator housing.

In the case of a driver-side airbag inflator, the preferred amount of non-azide propellant is on the order of 20 to 50 g. For passenger-side applications, the preferred amount of non-azide propellant is 40 to 120 g; and for side impact applications, 10 to 25 g. This combustion parameter is further enhanced by controlling the particulate size of the non-azide gas generating material as will be more fully described herein. Other parameters controlled are the internal volume of the inflator housing and the quantity of gas generating material, also to be more fully described herein.

Further optimization of gas flow is achieved by controlling the radial (annular) cross-sectional area $S_t$ of the defined gas passage or gap between the coolant/filter and the housing end walls to be equal to or greater than the total area $A_t$ of the gas discharge or diffuser ports. It is preferred that this ratio $S_t/A_t$ should preferably fall in the range of 1 to 10 and more preferably 2 to 5.

In order to maintain this annular cross-sectional area of the gas passage or gap, the coolant/filter is provided with an external porous cylindrical reinforcement defining the inner wall of the gas passage and preventing expansion of the coolant/filter into that passage under the pressure of the generated gas. Other suitable external peripheral supporting layers may also be provided for this purpose.

Coolant/filter structures of the present invention control the solid particulate content of expelled gas from the diffuser ports to less than 2 g and preferably from less than 1 g to less than 0.7 g.

Furthermore, the total area At of the diffuser ports/volume of gas produced is maintained above a desired index and the area At controlled by the size and number of the diffuser ports such that a maximum pressure range of 100 to 300 kg/cm$^2$ is maintained within an inflator housing having a volume of 130 cc or less, for non-azide gas generating materials whose linear combustion velocity 30 mm/sec or less under a pressure of 70 kg/cm$^2$. At a housing volume of 120 cc, the total area of the gas discharge ports is preferably 1.13 cm$^2$.

DETAILED DESCRIPTION OF THE DRAWINGS

A FIRST PREFERRED EMBODIMENT

Figure 1:
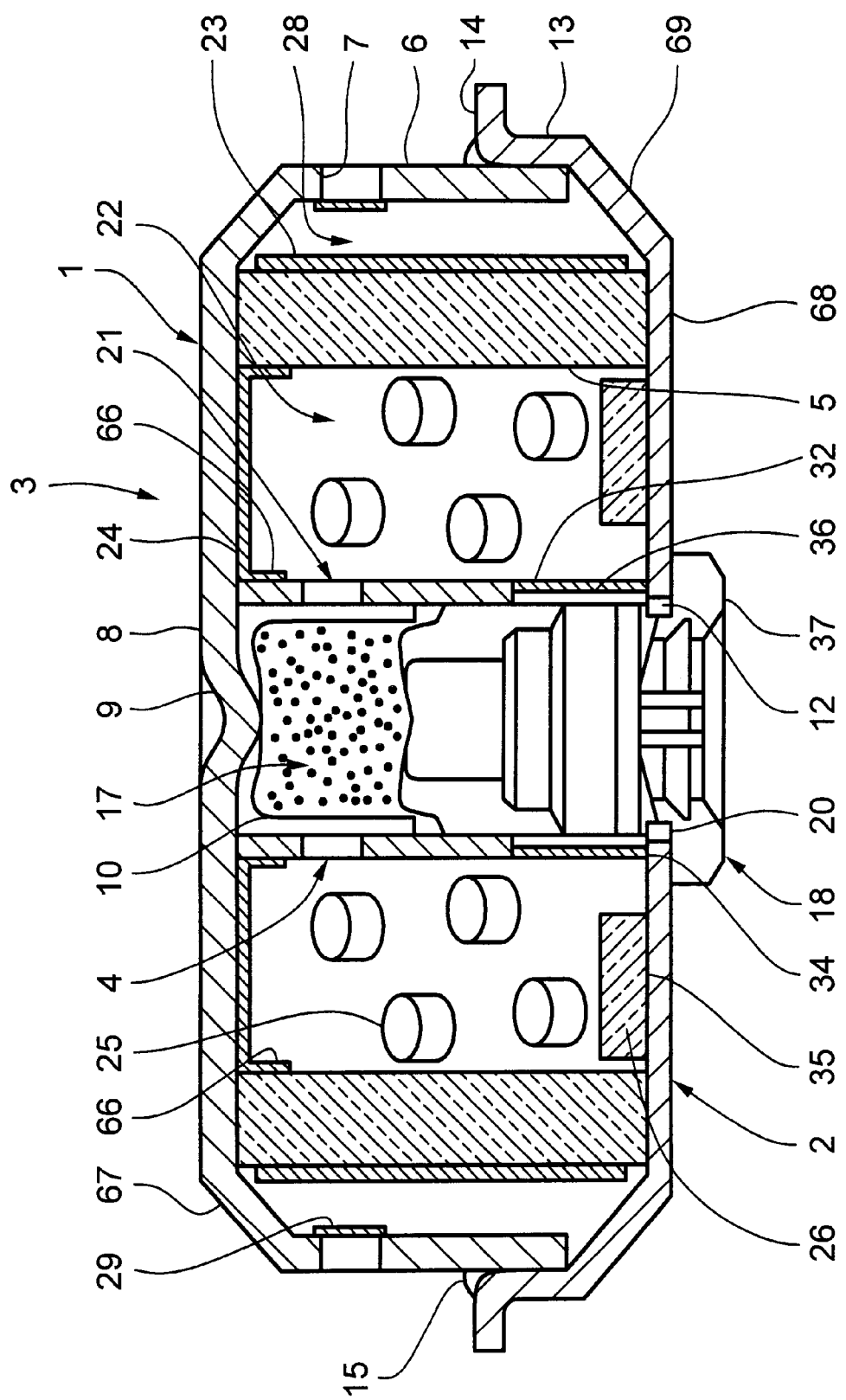
FIG. 1 is a cross-section of an airbag inflator of the present invention.

FIG. 1 is a cross section of an airbag inflator of the present invention. The airbag inflator includes a housing 3 made up of a diffuser shell 1 and a closure shell 2, a central cylinder member 4 inside the housing 3, and a coolant/filter 5 surrounding the central cylinder member 4.

The diffuser shell 1 is made by pressing a stainless steel plate and its circumferential wall 6 is formed with 20 gas discharge ports 7, 3 mm in diameter, arranged at equal intervals in the circumferential direction. The diffuser shell 1 has an inwardly recessed portion 9 at the center of the circular portion 8. The recessed portion 9 holds a transfer charge canister 10 of an ignition device shown between it and an igniter 18 of the ignition device. The closure shell 2 is made by.pressing a stainless steel plate and has a center hole 12 at the center. Arranged concentric with the center hole 12 is the central cylinder member 4, whose end face 34 at the free end side engages with an inner surface 35 of the closure shell. The closure shell 2 also has a mounting flange portion 14 at the free end of a circumferential wall portion 13. The diffuser shell 1 and the closure shell 2 are fitted together at their circumferential wall portions and joined by a laser weld 15 to form the housing 3.

The central cylinder member 4 is made of a stainless steel pipe with open ends, one of which is tapped with a female screw 32 and the other end of at which is fixed to the circular portion 8 of the diffuser shell by inert gas arc welding so that the second end of the central cylinder member 4 encloses the recessed portion 9. Inside the central cylinder member 4 is formed an ignition device accommodating chamber 17 for accommodating the ignition device. The ignition device comprises an igniter 18 that is activated by a signal from a sensor (not shown), and a transfer charge canister 10 containing a transfer charge (i.e., an ignition-transfer or an enhancer) to be ignited by the igniter 18. The outer circumferential surface of the igniter 18 has a male screw 36 that engages with the female screw 32 of the central cylinder member to securely fix the igniter 18 to the central cylinder member 4. A flange portion 37 of the igniter 18 has a function of preventing the screws from loosening up. The igniter 18 has an O-ring 20 fitted in its outer circumferential groove, which works as a seal for the ignition device accommodating chamber 17. Near the second end on the diffuser shell side, the central cylinder member 4 has two rows of through-holes 21 arranged in a staggered relationship. In this embodiment, one of the two rows consists of three through-holes 1.5 mm across and the other consists of three 2.5 mm diameter holes.

Several preferred construction parameters for the diffuser and closure shells 1 and 2 and the inner cylinder 5 are as follows:

The diffuser shell and the closure shell preferably are made of a stainless steel plate 1.2 to 2.0 mm thick and have outer diameters of 65 to 70 mm and 65 to 75 mm, respectively. It is also preferred that a narrow space 1.0 to 4.0 mm wide be formed between the outer circumferential wall formed by the diffuser shell and closure shell and the coolant/filter 5.

The gas discharge ports of the diffuser shell are preferably set to 2.0 to 5.0 mm in diameter and a total of 16 to 24 such gas discharge ports arranged in the circumferential direction.

The central cylinder member may be made by rolling a stainless steel plate 1.2 to 3.0 mm thick into a pipe 17 to 20 mm in outer diameter and welding its seam.

The central cylinder member preferably has a total of six to nine through-holes 1.5 to 3.0 mm in diameter arranged in the circumferential direction.

These through-holes are preferably arranged in two staggered rows, one of which consists of three through-holes 1.5 mm in diameter and the other consists of three through-holes 2.5 mm in diameter.

Additionally, the central cylinder 4 is preferably of different dimensions depending upon the use of electrical or mechanical crash sensors. In a mechanical system, the cylinder wall thickness is 1.5 to 7.5 mm with an outside diameter of 19 to 30 mm; and in an electrical system, the cylinder wall thickness is 1.2 to 3.0 mm with an outside diameter of 17 to 22 mm.

Figure 2:
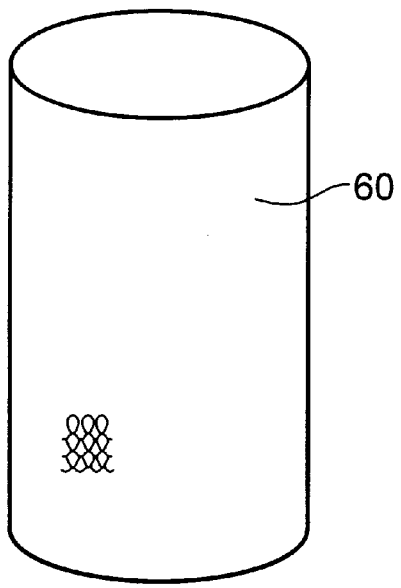
FIG. 2 is a prospective of a cylindrical metallic mesh used in the process of manufacturing a coolant/filter structure of the present invention.
Figure 3:
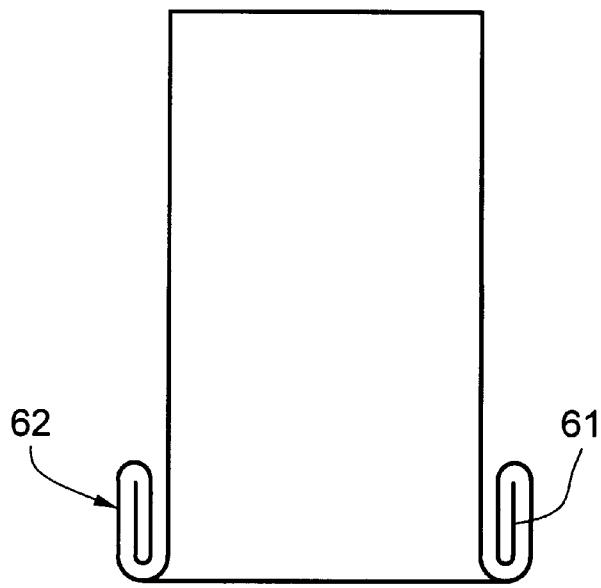
FIG. 3 is a schematic illustration of forming the cylindrical mesh of FIG. 2 into a coolant/filter structure.
Figure 4:
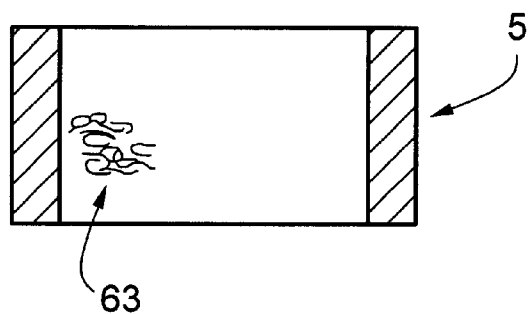
FIG. 4 is a cross-sectional schematic of a formed coolant/filter structure of the present invention.

The coolant/filter 5 is arranged to surround the central cylinder member 4 to define with the housing 3 a gas generating annular combustion chamber 22 around the central cylinder member 4. The coolant/filter 5 is made by stacking flat plaited stainless steel meshes in the radial direction and compressing them in the radial and axial directions, and has a bulk density of 3.0 to 5.0 $g/cm^3$. A preferred method of forming the coolant/filter 5 will be described by referring to the drawings. First, stainless steel wires 0.3 to 0.6 mm in diameter are flat-plaited to form a cylindrical body 60 as shown in FIG. 2. Next, one end portion 61 of this cylindrical body 60 is folded outwardly as shown in FIG. 3. This folding operation is repeated to form an annular multi-layer body 62. The number of folding operations is determined considering the wire diameter and the coolant/filter thickness. Finally, this multi-layer body 62 is put in a die (not shown) and compressed in the radial and axial directions until its bulk density is 3.0 to 5.0 $g/cm^3$, thus forming the coolant/filter 5 as shown in FIG. 4.

The coolant/filter of the present invention is obtained by laminating flat-plaited metal meshes of a wire diameter of 0.3 to 0.6 mm in the radial direction and compressing them in the radial and axial directions. The coolant/filter obtained by laminating the metal meshes having a flat-plait structure in the radial direction and compressing them, exhibits a complex clearance structure and an excellent entrapping effect. Therefore, the coolant/filter exhibits an entrapping function which is that of a filter in addition to its cooling function. According to the present invention, therefore, a coolant/filter of the type of coolant and filter that are formed integrally together is realized exhibiting both the cooling function and the entrapping function.

Figure 5:
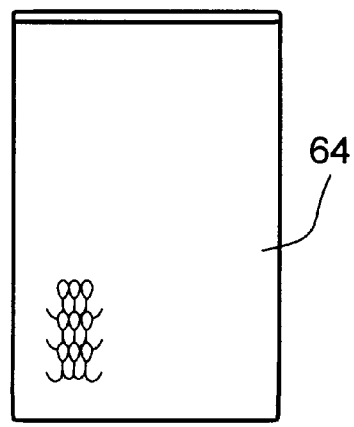
FIG. 5 is a schematic of a flat plate member formed of metallic mesh cylinder pressed in a radial direction.
Figure 6:
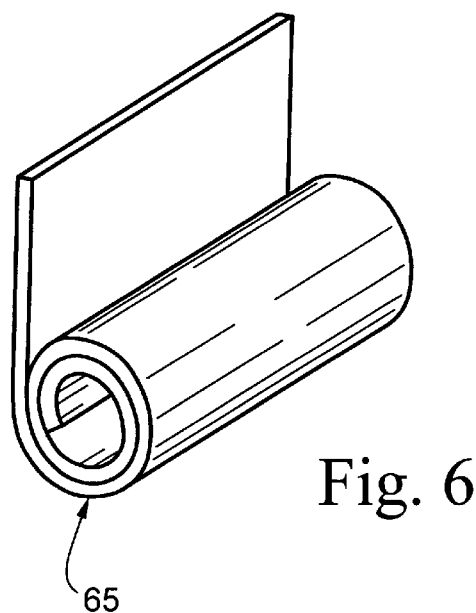
FIG. 6 is a schematic illustration of a multi-layered mesh cylinder formed by rolling the plate of FIG. 5.

Another method of forming the coolant/filter 5 is explained with reference to FIGS. 5 and 6. After the cylindrical body 60 is formed as shown in FIG. 2, it is compressed in the radial direction to form a plate body 64 as shown in FIG. 5, which is then rolled into a cylinder in multiple layers as shown in FIG. 6 to form a multi-layer body 65. This multi-layer body 65 is compressed in the radial and axial directions in a die to form the coolant/filter 5.

The coolant/filter 5 formed in this way has its plaited loops in each layer collapsed as shown at 63, and the layers of collapsed mesh loops are stacked in the radial direction. Hence, the clearance structure of the coolant/filter is complex, offering an excellent arresting and entrapping capability.

Figure 11:
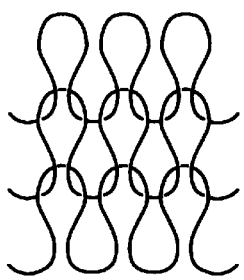
FIG. 11 is an illustration of a flat-plaited mesh for the coolant/filter structure of the present invention.
Figure 12:
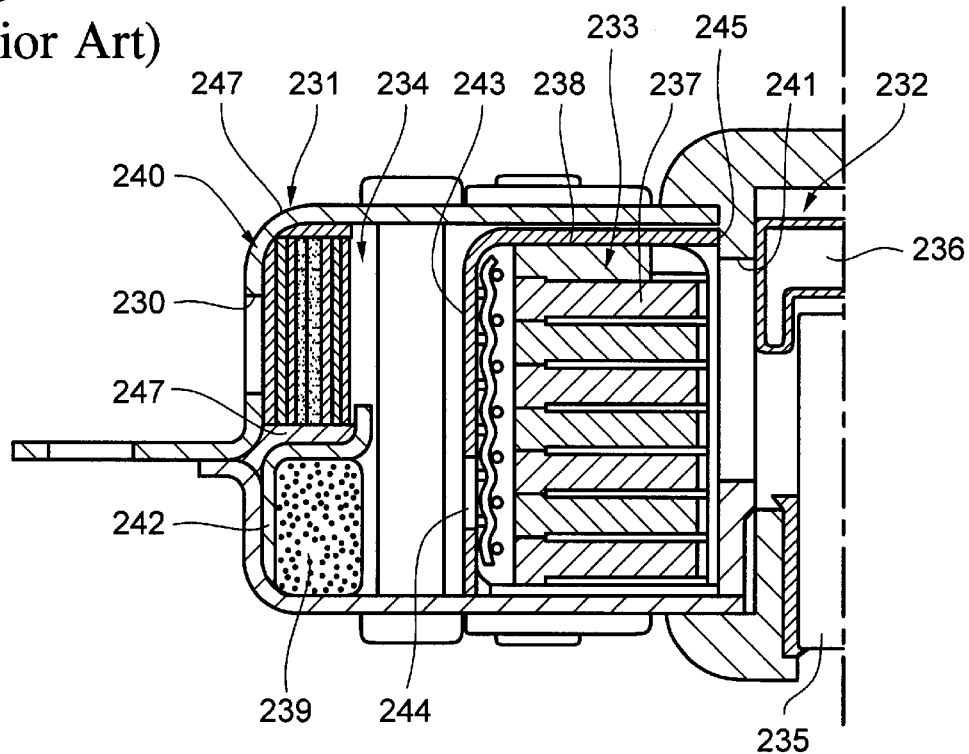
FIG. 12 is a partial cross-section of a conventional coolant/filter structure in an airbag inflator.

As shown in FIG. 11, the flat plaited mesh can be formed by knitting metal wire to have loops directed to one direction and a clearance structure.

Using the above forming method, the compression formed coolant/filter is provided so that it has a pressure loss of $0.3 \times 10^{-2}$ to $1.5 \times 10^{-2}$ $kg/cm^2$ at the flow rate of 100 $l/min/cm^2$ at room (normal) temperature.

By inserting another multi-layer body inside the multi-layer body 65 and compressing them together, a double structure coolant/filter can be obtained. The second multi-layer body may, for example, be made by rolling the plate body 64 of a metal mesh with a wire diameter of 0.5 mm, like the one shown in FIG. 5, into a two-layer cylinder as shown in FIG. 6.

This coolant/filter 5 defines the combustion chamber 22 and also has the functions of cooling the combustion gas generated in the combustion chamber and arresting combustion particulates. Fitted over the outside of the coolant/filter 5 is a ring 23, which has a number of through-holes in its entire circumferential wall and reinforces the coolant/filter 5, all as shown in FIG. 1.

Referring further to FIG. 1, an inclined portion 67 is formed in the circumferential direction around the circular portion 8 of the diffuser shell 1. Similarly, another inclined portion 69 is formed in the circumferential direction around the annular portion 68 of the closure shell. These inclined portions 67, 69 are designed to block the movement of the coolant/filter 5 and form a space between the circumferential walls 6, 13 of the housing and the ring 23 of the coolant/filter 5.

In the combustion chamber 22 there are installed pellets of a gas generating material 25 and a cushion 26 for the gas generating material 25. The ring-shaped cushion 26 is made of a stainless steel mesh and secured to the inner surface 35 of the closure shell 2. The cushion 26 also serves as a coolant. The ring-shaped support plate 24 is made of a stainless steel plate and has bent portions 66 at its inner and outer circumferential portions, whose elasticity securely positions the support plate 24 between the central cylinder member 4 and the coolant/filter 5.

Between the circumferential walls 6, 13 of the housing and the ring 23 of the coolant/filter is formed a space 28, which serves as a gas passage, through which the gas, after being cooled and cleaned while passing through the coolant/filter 5, is led to the gas discharge ports 7 of the diffuser shell. To prevent ambient moisture from entering into the housing 3, the gas discharge ports 7 of the diffuser shell are closed by an aluminum sealing tape 29.

In the airbag inflator of the above construction, when a sensor (not shown) detects an impact, its signal is sent to the igniter 18 to activate it, igniting the transfer charge in the transfer charge canister 10 to produce hot flames. The flames eject through the rows of through-holes 21 to ignite the gas generating material 25 in the combustion chamber 22. The gas generating material is burned to produce a hot, high-pressure gas, which is then cooled and cleared of particulates by the cushion 26 and also cooled and cleared of combustion particulates while passing through the coolant/filter 5. The combustion gas thus cooled and cleaned passes through the through-holes of the porous ring 23 and the space 28 and breaks the aluminum sealing tape 29 before ejecting through the gas discharge ports 7 and flowing into the airbag (not shown), which is inflated to form a cushion between the passenger and surrounding hard structures, thereby protecting the passenger from impacts.

Figure 8:
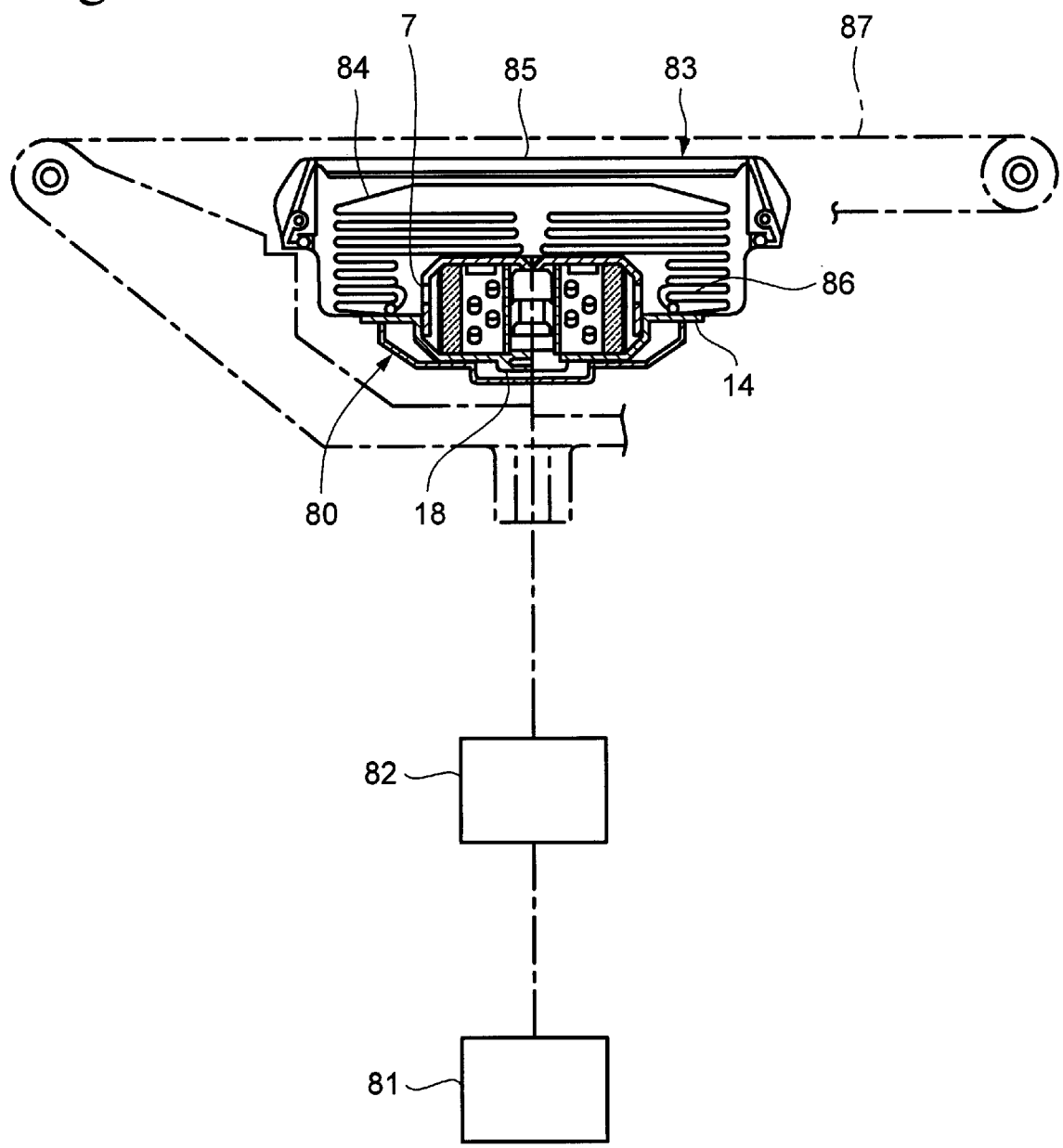
FIG. 8 is a schematic of an airbag apparatus of the present invention incorporating airbag inflators such as those illustrated in FIGS. 1 and 2.
Figure 9:
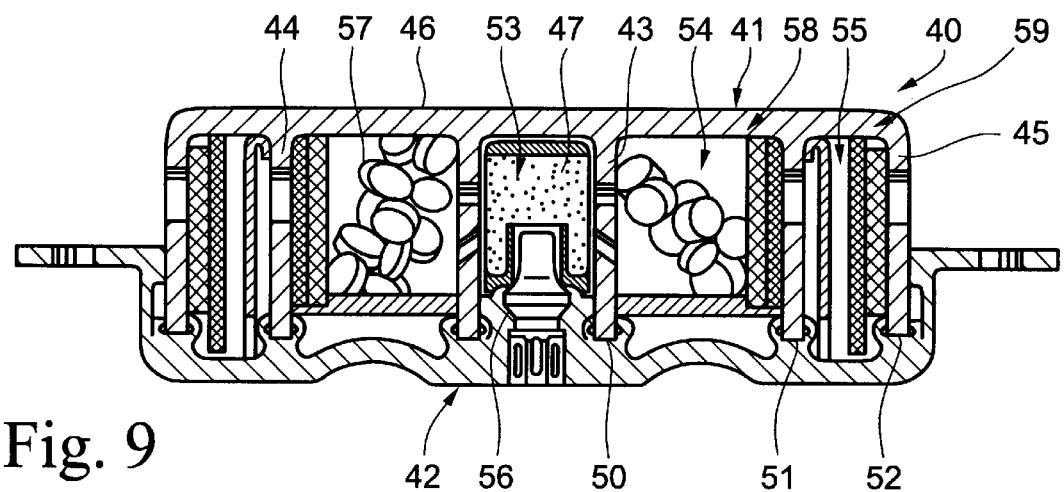
FIG. 9 is a cross-section of a conventional airbag inflator.

FIG. 8 shows an airbag apparatus having the airbag inflator of this invention. This airbag apparatus comprises an airbag inflator 80, an impact sensor 81, a control unit 82, a module case 83, and an airbag 84.

The airbag inflator 80 employs the airbag inflator explained with reference to FIG. 1.

The impact sensor 81 may, for example, be a semiconductor type acceleration sensor, which has a silicon substrate beam that deflects when applied an acceleration and four bridge-connected semiconductor strain gauges formed on the beam. When accelerated, the beam deflects, causing a strain on its surface, which changes resistance of the semiconductor strain gauges. The resistance change is then detected as a voltage signal proportional to the acceleration.

The control unit 82 has an ignition decision circuit, which receives a signal from the semiconductor type acceleration sensor. When the impact signal from the sensor exceeds a threshold level, the control unit 82 starts calculation. When the calculation result exceeds a predetermined value, the unit sends an activation signal to the igniter 18 of the airbag inflator 80.

The module case 83 is formed of polyurethane, for instance, and includes a module cover 85. The module case 83 accommodates the airbag 84 and the airbag inflator 80, thus forming a pad module, which is mounted to a steering wheel 87 of an automobile.

The airbag 84 is made of nylon (nylon 66 for example) or polyester and is folded and secured to the flange portion 14 of the inflator, with its inlet 86 enclosing the gas discharge ports 7 of the inflator.

When the semiconductor acceleration sensor 81 detects an impact at time of automobile collision, the impact signal is sent to the control unit 82, which, when the impact signal exceeds the threshold level, starts calculation. When the result of the calculation exceeds a predetermined value, the control unit 82 outputs an activation signal to the igniter 18 of the airbag inflator 80. The igniter 18 is thus activated to ignite and burn the gas generating material, producing a gas. The generated gas ejects into the airbag 84, which is inflated breaking the module cover 85 to form a cushion between the steering wheel 87 and a passenger for absorbing impacts.

A SECOND PREFERRED EMBODIMENT

Figure 7:
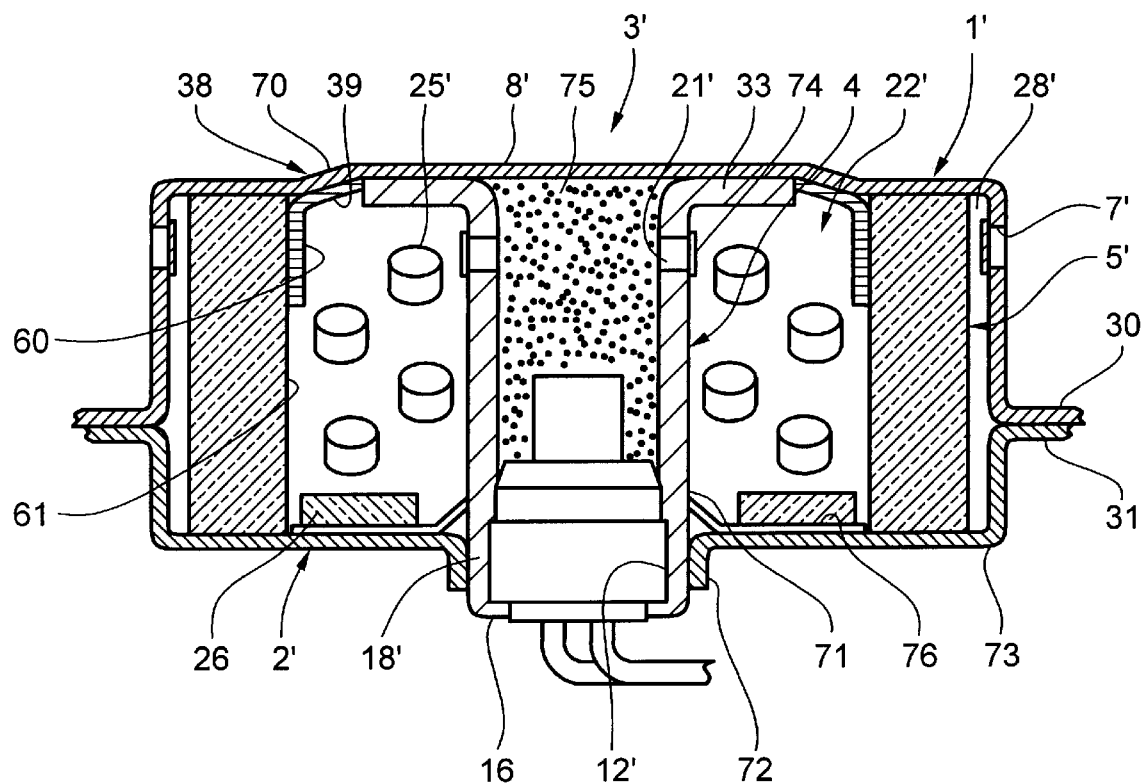
FIG. 7 is a cross-section of another embodiment of the airbag inflator of the present invention.

FIG. 7 shows another embodiment of the airbag inflator of this invention. The airbag inflator of this embodiment differs from that shown in FIG. 1 in terms of the shape of the diffuser shell and closure shell. That is, the diffuser shell 1' and the closure shell 2' have flange portions 30, 31, respectively, which are joined together by welding. The closure shell 2' has a bent portion 72, which is made by axially bending an edge of a center hole and whose inner circumferential surface defines a center hole 12'. Further, the diffuser shell 1' has a circumferentially extending inclined portion 70, which forms a dish-like circular portion 8' that helps position a central cylinder member 4'.

The central cylinder member 4' has one of its ends projecting from the closure shell 2', and the projected end is formed with a crimped portion 16. The other end of the central cylinder member 4' is formed with a horizontally outwardly projecting flange 33, which is put in contact with the bottom of the dish-shaped circular portion 8' of the diffuser shell. The central cylinder member 4' is secured to the diffuser shell 1' by a projection weld between the flange 33 and the circular portion 8'. The central cylinder member 4' has a row of through-holes 21' near the second end on the diffuser shell side. In this embodiment, six through-holes 2.5 mm in diameter are arranged in the circumferential direction. The row of the through-holes 21' is closed by an aluminum sealing tape 74, and a transfer charge 75 is directly loaded in the central cylinder member 4'. The central cylinder member 4' is positioned at the bottom of the dish-shaped circular portion 8' and fixed to the diffuser shell 1', after which the center hole 12' of the closure shell is sleeved over the central cylinder member 4'. Then, the closure shell and the diffuser shell, and the closure shell and the central cylinder member are joined, respectively. A ring-shaped plate member 76 that is mounted to the central cylinder member 4' by its elastic force works as a welding protection plate. Near the first end on the closure shell side, the central cylinder member 4' is formed with a stepped portion 71 for the igniter 18'. After the transfer charge 75 is loaded, the igniter 18' is also inserted into the central cylinder member 4' and engages with the stepped portion 71. Then, the portion 16 of the central cylinder member is crimped to securely fix the igniter 18' to the housing 3'.

The coolant/filter 5' has a coolant/filter support member 38 that blocks the displacement of the coolant/filter 5'. The coolant/filter support member 38 is made by pressing a stainless steel plate about 1 mm thick and has an annular portion 39, which surrounds the horizontally outwardly projecting flange 33 and engages with the inclined portion 70, and a flame resisting plate portion 60 bent from the annular portion 39. The flame resisting plate portion 60 is disposed facing the row of through-holes 21' which are formed in the central cylinder member for the passage of flames from the ignition means and covers an inner circumferential surface 61 of the coolant/filter 5. The flame resisting plate portion 60 has a function of protecting the coolant/filter 5' against flames ejected toward it and also a function of changing the direction of the ejecting flames to ensure that the flames reach the far side of the gas generating material 25' to facilitate combustion. In addition to the inclined portions 67, 69 (FIG. 1) and the coolant/filter support member 38, the means for preventing displacement of the coolant/filter 5' may also be formed by inwardly projecting both or one of upper and lower corners 73 of the housing and making the formed projection engage with the coolant/filter 5'. The porous ring 23 for the coolant/filter 5 shown in FIG.

1 is not a must and, in the case of the coolant/filter 5' of the second embodiment, this ring is not provided.

In the airbag inflator with the above construction, when a sensor (not shown) detects an impact, an impact signal is sent to the igniter 18', which is then activated to ignite the transfer charge 75 to produce hot flames. The flames break the wall of the aluminum tape 74 and eject through the row of through-holes 21' into the combustion chamber 22', in which the flames ignite the gas generating material 25' near the through-holes 21' and are directed by the flame resisting plate portion 60 to ignite the gas generating material 25' at the lower part of the combustion chamber 22'. As a result, the whole gas generating material burns, producing a hot, high-temperature gas, which then passes through the coolant/filter 5' and, during such passage is cooled and cleared of combustion contaminants or particulates. The combustion gas thus cooled and cleaned passes through the space 28' and the gas discharge ports 7' and flows into the airbag (not shown). The airbag is then inflated to form a cushion between the passenger and surrounding hard structures, thereby protecting the passenger from impacts.

A THIRD PREFERRED EMBODIMENT

Figure 10:
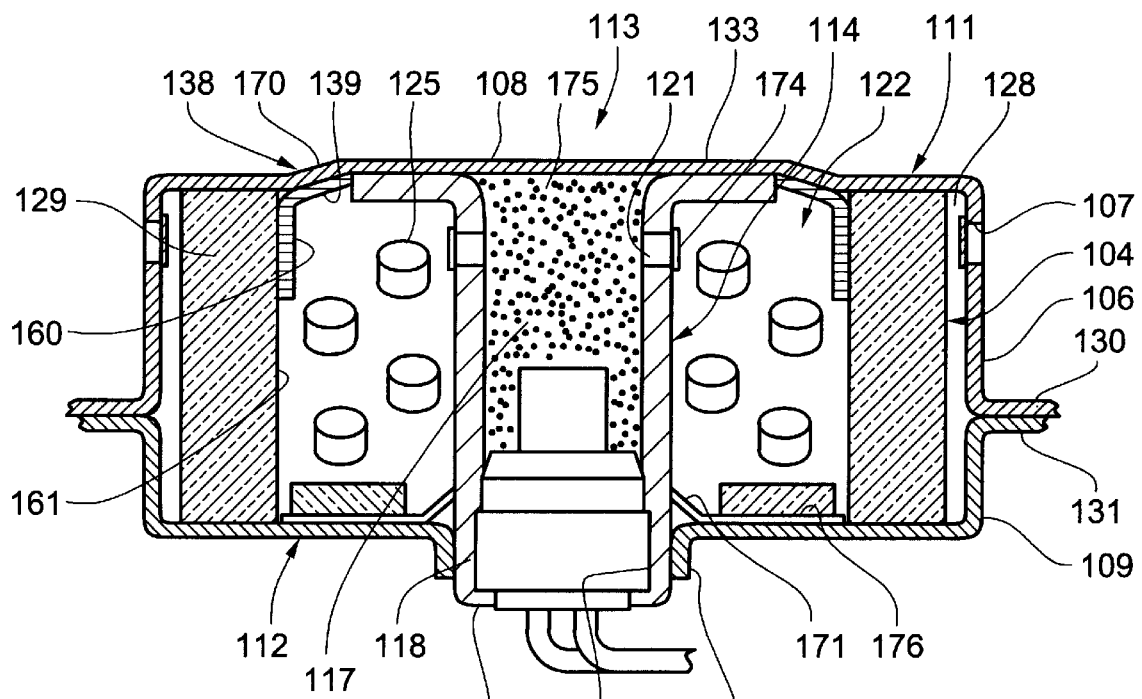
FIG. 10 is a cross-section of another embodiment of an airbag inflator of the present invention including a coolant/filter structure of the present invention.

FIG. 10 illustrates an example where the coolant/filter of the present invention is adapted to an airbag inflator for an airbag. The airbag inflator comprises a housing 113 constituted by a diffuser shell 111 and a closure shell 112, a central cylinder member 114 disposed at the center in the housing 113, and the coolant/filter 104 arranged surrounding the central cylinder member 114.

The diffuser shell 111 is formed by pressing a stainless steel plate and has a plurality of gas discharge ports 107 formed in the peripheral wall 106 thereof maintaining an equal distance in the circumferential direction. Due to an inclined portion 170 extending in the circumferential direction, furthermore, the diffuser shell 111 has a dish-like circular portion 108 which works to determine the position of the central cylinder member 114. The closure shell 112 is formed by pressing the stainless steel plate and has a hole in the central portion thereof. The edge of the hole is outwardly folded in the axial direction to form a folded portion 172, and a center hole 115 is formed by the inner peripheral surface of the folded portion 172.

The central cylinder member 114 is made of a stainless steel tube with its one end protruding toward the outer side of the closure shell 112 and being crimped as designated at 116 at the protruded end. At the other end is formed an outwardly directed flange 133 which is brought into contact with the bottom of the dish-shaped circular portion 108 of the diffuser shell. The outwardly directed flange 133 and the circular portion 108 are projection-welded together, so that the central cylinder member 114 is secured to the diffuser shell 111. The central cylinder member 114 further has one row of through-holes 121 formed on the side of the other end thereof.

An ignition device accommodating chamber 117 for containing the ignition device is formed inside the central cylinder member 114. The ignition device comprises an igniter 118 that operates upon receiving a signal from the sensor (not shown) and a transfer charge 175 that will be ignited by the igniter 118. The row of through-holes 121 are closed by an aluminum sealing tape 174, and the central cylinder member 114 is directly filled with the transfer charge 175.

The dish-like circular portion 108 positions on the bottom thereof the central cylinder member 114 which is then secured to the diffuser shell 111. Thereafter, the central cylinder member 114 is inserted in the central hole 115 of the closure shell, and the flange portion 130 of the diffuser shell is placed on the flange portion 131 of the closure shell. Then, the closure shell and the diffuser shell are joined together, and the closure shell and the central cylinder member are joined together. A ring-like plate member 176 resiliently fitted to the central cylinder member 114 works as a welding protection plate. A step 171 for an igniter 118 is formed at one end of the central cylinder member 114. After being filled with the transfer charge 175, the igniter 118 is inserted in the central cylindrical member 114 and is fitted to the step 171. Thereafter, the igniter 118 in the central cylinder member is secured to the housing 113 by crimping portion 116.

The coolant/filter 104 is arranged surrounding the central cylinder member 114 and defines, with the housing 113, an annular chamber or a combustion chamber 122 around the central cylinder member 114. The combustion chamber 122 is filled with the pelletized gas generating material 125. The coolant/filter 104 has a support member 138 for preventing the movement thereof. The support member 138 is formed by pressing a stainless steel plate, and has an annular portion 139 that is arranged surrounding the outwardly directed flange 133 of the central cylinder member and that comes into contact with the inclined portion 170, and a flame-preventing plate 160 which is folded relative to the annular portion 139. The flame-preventing plate 160 is arranged being opposed to the row of through-holes 121 and covers the inner peripheral surface 161 of the coolant/filter 104. The flame-preventing plate 160 protects the coolant/filter 104 from the flame that gushes toward the coolant, and causes the gushing flame to be deflected so that the flame sufficiently reaches the gas generating material.

A space 128 is formed between the coolant/filter 104 and the outer peripheral walls 106, 109 of the housing. The space 128 works as a flow passage through which the gas that is cooled and cleaned through the coolant/filter 104 flows to the gas discharge ports 107 of the diffuser shell. In order to prevent moisture from infiltrating into the housing 113 from the exterior thereof, furthermore, the gas discharge ports 107 of the diffuser shell are closed by an aluminum sealing tape 129.

In the thus constituted airbag inflator, when a sensor (not shown) detects a shock, a signal is transmitted to the igniter 118 which then actuates to ignite the transfer charge 175 to produce flame of a high temperature. This flame breaks through the aluminum sealing tape 174, gushes through the row of through-holes 121 and enters into the combustion chamber 122 defined by the coolant/filter 104 and housing 113. The flame that has entered into the combustion chamber 122 ignites the gas generating material 125 near the row of through-holes 121, is deflected by the flame-preventing plate 160 and ignites the gas generating material 125 in the lower portion of the combustion chamber. Thus, the gas generating material 125 burns to generate a gas of a high temperature and high pressure. The coolant/filter 104 acts to maintain the pressure of the combustion gas generated in the combustion chamber at a value desired for the proper combustion of the gas generating material 125. The combustion gas is cooled by the cooling function of the coolant/filter 104 as it passes therethrough. The combustion particulates contained in the combustion gas are entrapped by the trapping function of the coolant/filter 104. The combustion gas so cooled and cleaned flows through the gas flow passage 128 and enters into the airbag (not shown) through the gas discharge ports 107. Then, the airbag inflates and forms a cushion between a passenger and surrounding hard structures to protect the passenger from the impact.

Figure 13:
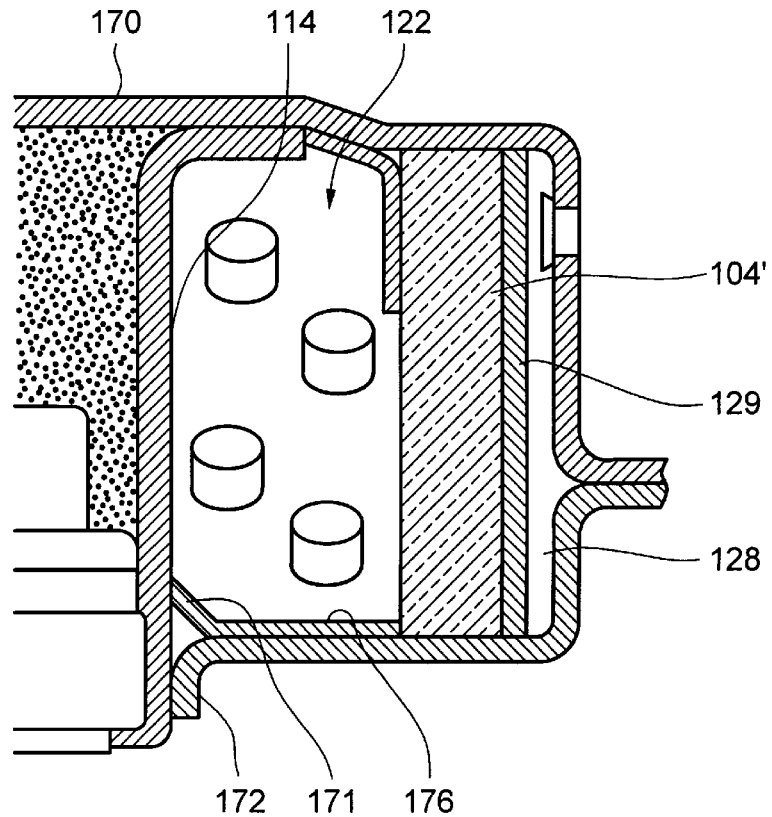
FIG. 13 is a partial cross-section of another embodiment of the coolant/filter structure in an airbag inflator of the present invention.

FIG. 13 depicts, on an enlarged scale, a portion of when a coolant/filter according to another embodiment of the present invention is adapted to the airbag inflator for an airbag, like that of FIG. 10.

A coolant/filter 104' is arranged surrounding the gas generating material 125 and defines an annular chamber or a combustion chamber 122 around the central cylinder member 114. The coolant/filter 104' is obtained by laminating flat-plaited metal meshes of a stainless steel in the radial direction and compressing them in the radial and axial directions. The coolant/filter 104' comprises multiple layers of collapsed mesh loops stacked in the radial direction. Thus, the mesh clearance structure of the coolant/filter is complex and exhibits an excellent entrapping effect. On the outer side of the coolant/filter 104' is formed an outer layer 129 comprising laminated metallic mesh members. The outer layer 129 works as a swell suppressing layer for suppressing the coolant/filter from swelling so that the coolant/filter 104' will not be swollen by the gas pressure when the airbag inflator has operated and the space 128 will not be materially narrowed or closed. The coolant/filter 104' defines a combustion chamber 122 with the inflator housing, cools the combustion gas generated in the combustion chamber, and entraps the combustion particulates. Instead of having an associated outer layer 129, the coolant/filter 104' may be surrounded by a wire or a belt means. With the wire or the belt means being located at a portion where the two flange portions are joined together, a change in the annular cross-sectional area of space 128 is minimized.

Figure 14:
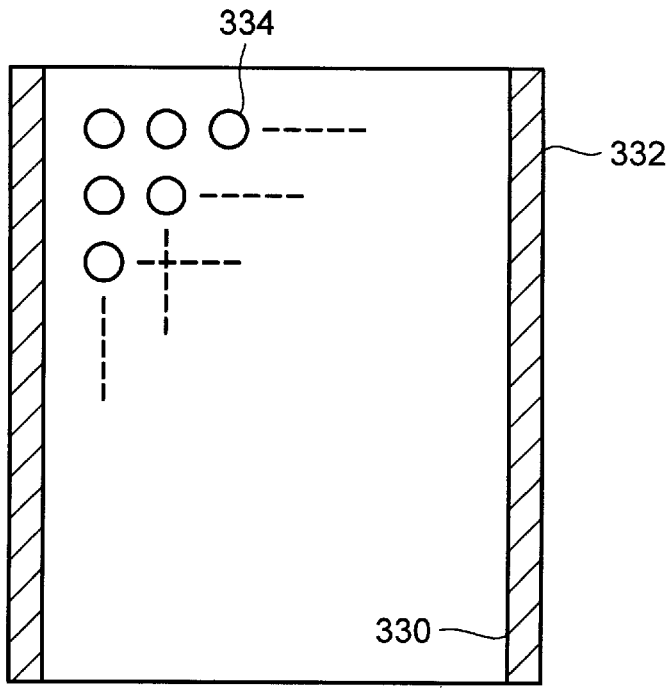
FIGS. 14 and 15 are illustrative embodiments of an outer deformation or swell suppressing component of the coolant/filter structure of FIG. 13.
Figure 15:
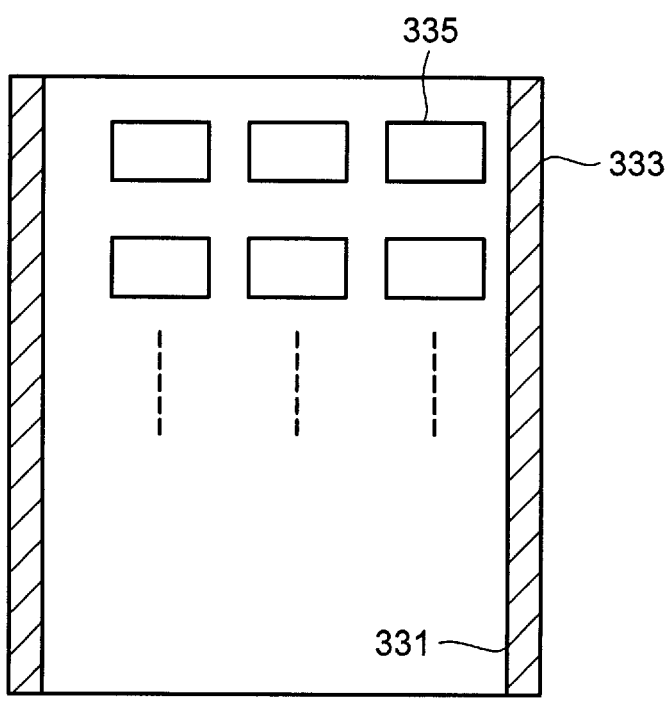

Means for suppressing the coolant/filter from swelling or expanding can be constituted by using a porous (perforated) cylinder. An example of such a perforated cylinder is shown in FIGS. 14 and 15. The perforated cylinder has an inner peripheral surface 330, 331 that fits over the outer peripheral surface of the coolant, and has a number of through-holes 334, 335 formed evenly in the whole peripheral wall 332, 333. The through-holes 334 are round holes of a small diameter, and the through-holes 335 are square holes of a large diameter. The swelling or expanding suppressing cylindrical layers described above do not affect the pressure loss of the coolant/filter 104'. They have a pressure loss being smaller than the coolant/filter device.

A FOURTH PREFERRED EMBODIMENT

Figure 16:
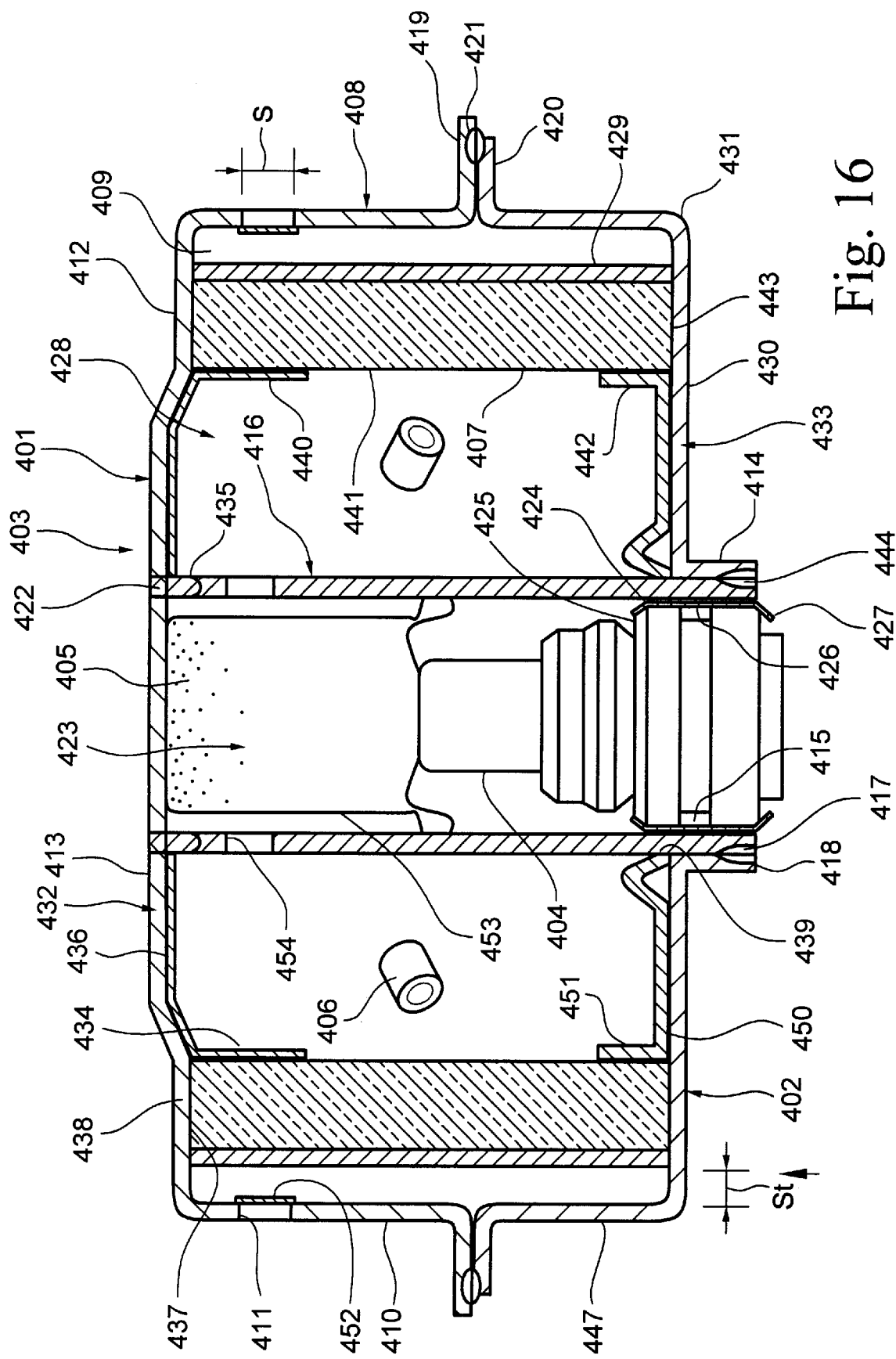
FIG. 16 is a cross-section of still another embodiment of the airbag inflator of the present invention illustrating additional structural details.

FIG. 16 is a cross section of the airbag inflator of this invention. This airbag inflator includes a housing 403 comprising a diffuser shell 401 and a closure shell 402; an ignition device installed in the accommodation space within the housing 403, i.e., an igniter 404 and a transfer charge 405; a gas generating material to be ignited by the igniter and the transfer charge to produce a combustion gas, i.e., a solid gas generating material 406; a coolant/filter for defining, with the housing 403, a combustion chamber 428 accommodating the gas generating material 406, i.e., a coolant/filter 407; and a space 409 formed between the coolant/filter 407 and the outer circumferential wall 408 of the housing 403.

The diffuser shell 401 is formed by pressing a stainless steel plate and has a circular portion 412, a circumferential wall portion 410 formed at the outer circumference of the circular portion 412, and a flange portion 419 formed at the free end of the circumferential wall portion 410 and extending radially outwardly. In this embodiment, the circumferential wall portion 410 is formed with 18 gas discharge ports 411, 3 mm in diameter, arranged at equal intervals in the circumferential direction. The diffuser shell 401 has a raised circular portion 413 projecting outwardly through a step at the central part of the circular portion 412. This raised circular portion 413 gives rigidity to the housing, particularly, a ceiling portion and at the same time increases the volume of the accommodation space. Between the raised circular portion 413 and the igniter 404 is held a transfer charge canister 453 containing a transfer charge 405.

The closure shell 402 is formed by pressing a stainless steel plate and has a circular portion 430, a center hole 415 formed at the center of the circular portion 430, a circumferential wall portion 447 formed at the outer circumference of the circular portion 430, and a flange portion 420 formed at the free end of the circumferential wall portion 447 and extending radially outwardly. The center hole 415 has an axial bent portion 414 at its edge. Fitted in the center hole 415 is a central cylinder member 416, whose end face 417 at one end is flush with an end face 418 of the axial bent portion 414.

The diffuser shell 401 and the closure shell 402 have flange portions 419, 420, respectively, which are stacked together and joined by a laser weld 421 to form the housing 403.

Figure 21:
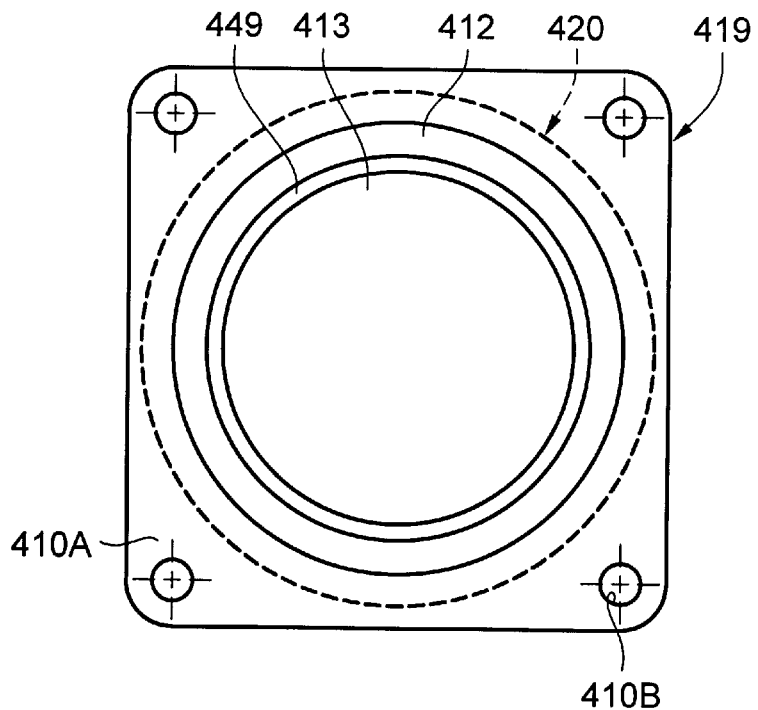
FIG. 21 is a top plan view of the airbag inflator of FIG. 16.

The flange portion 419 of the diffuser shell, as shown in FIG. 21, has mounting portions 410A to be mounted on a fitting of a pad module. The mounting portions 410A are arranged in the circumferential direction at 90° intervals and have threaded bolt holes 410B. The outline of a flange portion 420 on the closure shell is shown by a dashed line.

The central cylinder member 416 is made of stainless steel with open ends and is secured at its other end on the diffuser shell side to the raised circular portion 413 by an electron beam weld 422. Inside the central cylinder member 416 is formed an ignition device accommodating chamber 423, in which are installed the igniter 404 triggered by a signal from a sensor (not shown) and the transfer charge canister 453 loaded with the transfer charge 405 ignited by the igniter 404. The central cylinder member 416 has an igniter holding member 424, which comprises an inward flange portion 425 for restricting the axial displacement of the igniter 404, a circumferential wall portion 426 in which the igniter is fitted and which is fixed inside the inner circumferential surface of the central cylinder member 416, and a portion 427 crimped to axially fix the igniter between it and the inward flange portion 425. The central cylinder member 416 has through-holes 454 near its second end on the diffuser shell side. In this embodiment, six such through-holes 2.5 mm across are arranged at equal intervals in the circumferential direction.

The central cylinder member 416 is made by rolling a stainless steel plate 1.2 to 2.0 mm thick into a pipe 17 to 20 mm in outer diameter and welding the seam. Such a welded pipe may be formed by a UO pressing method or an electro-resistance-welding method (which involves the steps of rolling a plate into a cylinder and passing a large current while applying a pressure at the seam to weld the seam by resistance heat).

The coolant/filter 407 is disposed surrounding the gas generating material 406 to define an annular combustion chamber 428 around the central cylinder member 416. This coolant/filter 407 is made by stacking flat plaited stainless steel meshes in the radial direction and compressing them in the radial and axial directions. The coolant/filter 467 comprises multiple layers of collapsed mesh loops stacked in the radial direction. Thus, the clearance structure of the coolant/ filter is complex providing an excellent arresting performance. On the outer side of the coolant/filter 407 is formed an outer layer 429 made of laminated metallic mesh members, which works to prevent the coolant/filter 407 from expanding and closing the narrow space 409 by gas pressure generated during the operation of the airbag inflator. The coolant/filter 407, in addition to defining the combustion chamber 428, also cools the combustion gas produced in the combustion chamber and arrests combustion contaminant particulates. Rather than using the outer layer 429, it is possible to wind a wire or belt around the coolant/filter 407. By positioning the wire or belt at the joint of the stacked flange portions, a change in the area of the gas passage in the space can be minimized.

Means for preventing the coolant/filter 407 from expanding can be formed of a porous (perforated) cylinder member or peripheral layer previously described with reference to FIGS. 14 and 15.

Referring further to FIG. 16, surrounding the circular portion 430 of the closure shell in the circumferential direction is an inclined portion 431, which works as a displacement prevention means to prevent the displacement of the coolant/filter 407 and also as a means to form the space 409 between the housing outer circumferential wall 408 and the coolant/filter 407.

In the combustion chamber 428 are installed a solid gas generating material 406 and a displacement prevention means for preventing the displacement of the coolant/filter 407, i.e., a support member 432 and a plate member 433. The gas generating material 406 is provided in the form of hollow cylindrical pieces. This shape offers an advantage that the combustion of the gas generating material 406 occurs in the outer and inner surfaces and thus the overall surface area of the gas generating material does not change greatly as the combustion proceeds. The support member 432 comprises a flame resisting plate portion 434, disposed facing through-holes 454 for flames from the ignition device and covering the inner circumferential surface of the coolant/filter 407, and a circular portion 436 having a center hole 435 in which the central cylinder member 416 is fitted. The flame resisting plate portion 434 has a coolant/filter protection function to protect the coolant/filter 407 from the flames ejected toward it, and also a combustion facilitating function to change the direction of flame propagation by deflection to ensure that the flames of the ignition device reach a sufficient amount of the gas generating material 406. The coolant/filter support member 432 has a function of positioning the coolant/filter during the assembly of the airbag inflator and also works as a short pass (blow-by) prevention means for blocking a short pass of combustion gas between the inner surface 437 of the housing and the end face 438 of the coolant/filter 407 during the operation of the airbag inflator. Such a clearance may be formed by the internal pressure of combustion gas acting against the internal walls of the inflator housing. The plate member 433 is made of a stainless steel plate 0.5 to 1.0 mm thick, as is the support member 432, and has a center hole 439 fitted over the central cylinder member 416, a circular portion 450 in contact with the gas generating material to prevent its displacement, and a circumferential wall portion 451 formed integral with the circular portion 450 and in contact with the inner circumferential surface of the coolant/filter 407. The plate member 433 is held between the central cylinder member 416 and the coolant/filter 407 by its elasticity to block a short pass of combustion gas at the end face of the coolant/filter on the side opposite the end face 438. The plate member 433 also functions as a protection plate during welding.

The space 409 is formed between the outer circumferential wall 408 of the housing and the outer layer 429 of the coolant/filter 407 to provide a gas passage, annular in radial cross section, around the coolant/filter 407. In this embodiment, the annular cross-sectional area of the space in the radial direction is constant. It is also possible to form the coolant/filter in a conical shape so that the radial cross-sectional area of the gas passage increases toward the gas discharge ports 411. In this case, the radial cross-sectional area of the gas passage may take an average value. Instead of the inclined portion 431, a projection may be provided at the end portion of the coolant/filter 407 to engage with the outer circumferential wall 408 of the housing to prevent displacement of the coolant/filter 407 and to form a space between the outer circumferential wall 408 of the housing and the coolant/filter 407. The area $S_t$ of the gas passage in the radial cross section is set larger than the sum $A_t$ of open areas S of the gas discharge ports 411 in the diffuser shell. The space 409 around the coolant/filter allows the combustion gas to flow through the whole area of the coolant/filter, thus realizing efficient utilization of the coolant/filter and effective cooling and cleaning of the combustion gas. The combustion gas thus cooled and cleaned flows through the space 409 into the gas discharge ports 411 in the diffuser shell.

To prevent outside moisture from entering into the housing 403, the gas discharge ports 411 of the diffuser shell are closed with an aluminum sealing tape 452.

In the airbag inflator of the above construction, when a sensor (not shown) detects an impact, an impact detection signal is sent to the igniter 404, which is then activated to ignite the transfer charge 405 in the transfer charge canister 453, producing high-temperature flames. The flames eject through the through-holes 454 igniting the gas generating material 406 near the through-holes 454 and are directed by the flame resisting plate portion 434 to ignite the gas generating material in the lower part of the combustion chamber. As a result, the gas generating material burns to produce high-temperature, high-pressure gas, which passes through the whole area of the coolant/filter 407, during which time the gas is effectively cooled and cleared of contaminant particulates. The combustion gas thus cooled and cleaned flows through the space 409, breaks the aluminum sealing tape 452 and ejects through the gas discharge ports 411 into the airbag (not shown). The airbag is inflated forming a cushion between the passenger and surrounding hard structures to protect the passenger from impacts.

The assembly process for the airbag inflator of FIG. 16 consists in putting the diffuser shell 401 joined with the central cylindrical member 416 so that its raised circular portion 413 is at the bottom, sleeving the plate member 432 over the central cylindrical member 416, fitting the coolant/filter 407 over the outer side of the circumferential wall of the plate member 432 to position the coolant/filter 407, filling the solid gas generating material 406 inside the coolant/filter, and putting the plate member 433 over the gas generating material 406. Then, the center hole 415 of the closure shell is put over the central cylindrical member 416 to overlap the flange portion 420 of the closure shell and the flange portion 419 of the diffuser shell. The overlapping flange portions are laser-welded at 421 and 444 to weld together the diffuser shell 401 and the closure shell 402, and also the closure shell 402 and the central cylindrical member 416. As the final step, the transfer charge canister 453 and the igniter 404 are inserted into the central cylindrical member 416 and then an igniter holding member 427 is crimped to securely fix them.

A FIFTH PREFERRED EMBODIMENT

Figure 17:
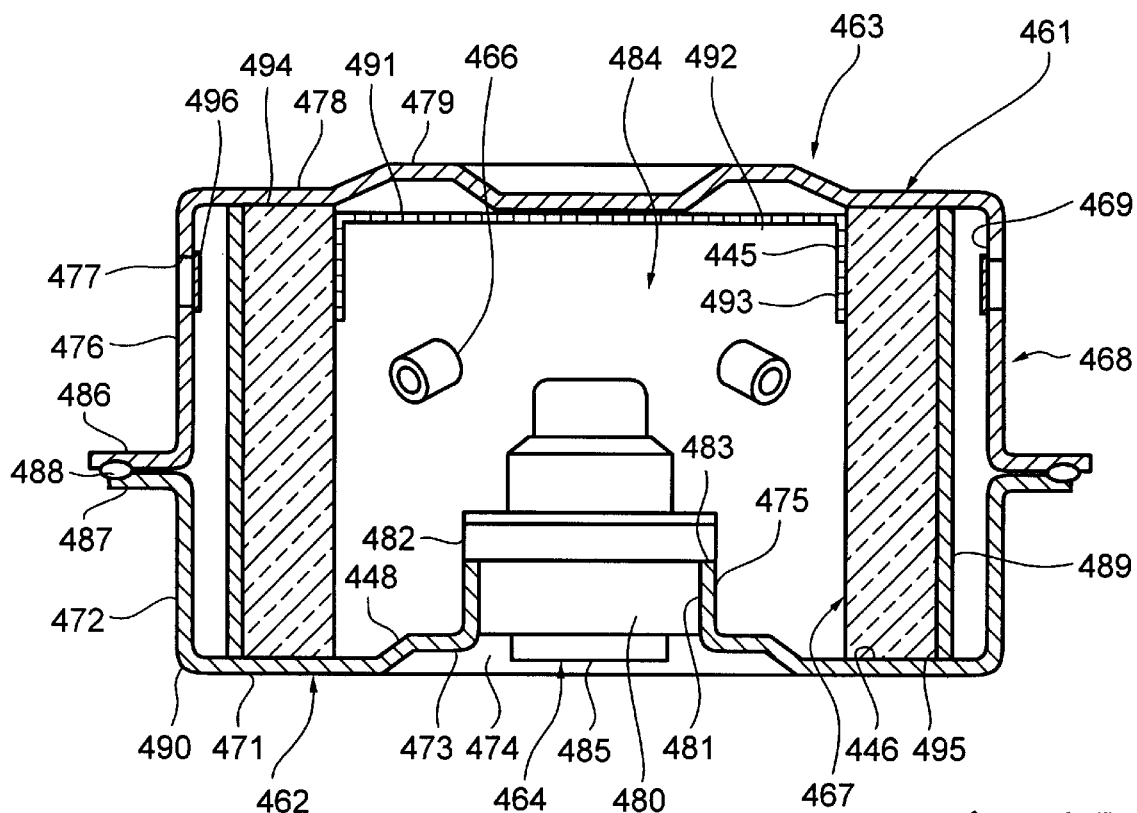
FIG. 17 is a cross-section of yet another embodiment of the present invention.

FIG. 17 is a cross section of another embodiment of the airbag inflator according to this invention. The airbag inflator includes a housing 463 preferably having an outer diameter of about 60 mm comprising a diffuser shell 461 and a closure shell 462; an igniter 464 installed inside the housing 463; a solid gas generating material 466 ignited by the igniter 464 to produce a combustion gas; a coolant/filter 467 for defining a combustion chamber 484 accommodating the gas generating material 466; and a space 469 formed between the coolant/filter 467 and an outer circumferential wall 468 of the housing 463.

The diffuser shell 461 is made by pressing a stainless steel plate and has a circular portion 478 and a circumferential wall portion 476 formed at the outer circumference of the circular portion 478. The circumferential wall portion 476 has a plurality of gas discharge ports 477 arranged at equal intervals in the circumferential direction. The diffuser shell 461 has a plurality of radial ribs 479 in the circular portion 478. These radial ribs 479 give rigidity to the circular portion 478 of the diffuser shell so that the circular portion 478 forming the ceiling of the housing will not deform by the gas pressure.

Figure 22:
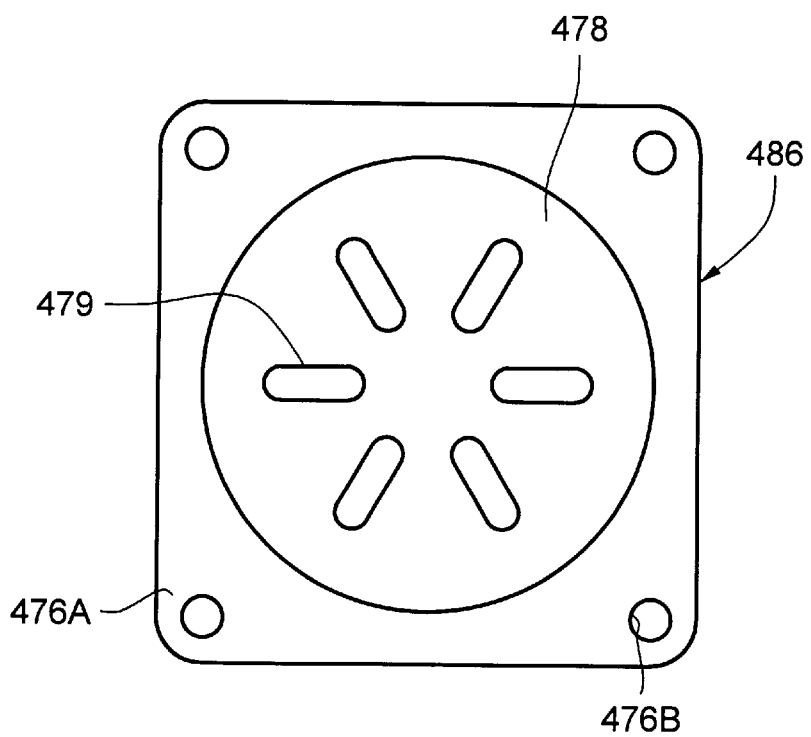
FIG. 22 is a top plan view of the airbag inflator of FIG. 17.

As also shown in FIG. 22, these radial ribs 479 give rigidity to the circular portion 478 of the diffuser shell so that the circular portion 478 forming the ceiling of the housing will not deform by the gas pressure. The flange portion of the diffuser shell, as shown in FIG. 22, has mounting portions 476A to be mounted on a fitting of a pad module. The mounting portions 476A are arranged at 90° intervals in the circumferential direction and have threaded bolt holes 476B.

The closure shell 462 is made by pressing a stainless steel plate and has a circular portion 471 and a circumferential wall portion 472 formed at the outer circumference of the circular portion 471. The circular portion 471 has a recessed portion 473 at the central part, which in turn has a center hole 474 at the center. The center hole 474 has an axial bent portion 475 at its edge, which has an inner circumferential surface 481, in which a body portion 480 of the igniter 464 is fitted, and an end face 483 with which a flange portion 482 of the igniter 464 engages. The inner circumferential surface 481 of the axial bent portion 475 provides a relatively large seal surface. To secure air tightness, a sealing material may be applied between the body portion 480 of the igniter 464 and the inner circumferential surface 481, or welding may be done between the flange portion 482 of the igniter and the end face 483. The end face 483, with which the flange portion 482 of the igniter 464 engages, serves to prevent the igniter 464 from coming off by the gas pressure in the combustion chamber 484. The recessed portion 473 gives rigidity to the circular portion 471 of the closure shell and keeps a connector bottom surface 485 of the igniter 464 recessed inwardly from the outer surface of the circular portion 471.

The diffuser shell 461 has a flange portion 486 extending radially outwardly at the free end of the circumferential wall portion 476. The closure shell 462, too, has a flange portion 487 extending radially outwardly at the free end of the circumferential wall portion 472. These flange portions 486, 487 are stacked together at an axially central position of the housing and welded by laser welding at 488 to join the diffuser shell 461 and the closure shell 462. These flange portions 486, 487 give rigidity to the outer circumferential wall of the housing to prevent deformation of the housing due to gas pressure.

The igniter 464 is a commonly used electric igniter that is activated by a signal from a sensor (not shown). The electric igniter does not include a mechanical structure and is simple in construction, small in size and light in weight, and is thus preferable to the mechanical igniter. This igniter 464 (output: 300 to 1500 psi in a 10 cc airtight pressure vessel) does not include a transfer charge canister 453 of FIG. 16 or the like. This is because the gas generating material 466 has excellent ignition and burning characteristics. That is, this gas generating material 466 has a decomposition ignition temperature of 330° C. or less and a combustion temperature of 2000° K. or higher. The gas generating material 466 is formed into hollow cylindrical pieces and, because of this shape, combustion occurs both at the outer surface and inner surface, offering the advantage that the overall surface area of the gas generating material does not change greatly as combustion proceeds.

The coolant/filter 467 is disposed concentric with the center hole 474 and, together with the housing 463, forms the combustion chamber 484. The coolant/filter 467 is formed by stacking flat plaited stainless steel meshes in the radial direction and compressing them in the radial and axial directions. The coolant/filter 467, in addition to defining the combustion chamber 484, also cools the combustion gas produced in the combustion chamber and arrests combustion particulates. On the outer side of the coolant/filter 467 is formed an outer layer 489 made of laminated metallic mesh, which reinforces the coolant/filter and precludes swelling.

Surrounding the circular portion 471 of the enclosure shell and extending in the circumferential direction is an inclined portion 490, which functions as a means to position the coolant/filter 467 and prevent its displacement. It also works as a means to form the space 469 between the outer circumferential wall 468 of the housing and the outer layer 489 of the coolant/filter.

In the combustion chamber 484 there are installed the solid gas generating material 466 and the plate member 491. The gas generating material 466 is directly filled in the space inside the combustion chamber and disposed adjacent to the igniter 464. The displacement of the gas generating material 466 is prevented by a circular portion 492 of a plate member 491 that closes any opening between one end of the coolant/filter 467 and the shell portion 478. The plate member 491 has the circular portion 492 and a circumferential wall portion 493 formed integral with the circular portion 492, which engages with and covers the inner circumferential surface of one end portion of the coolant/filter 467. This plate member 491 blocks a short pass of the combustion gas between an end face 494 at one end of the coolant/filter and the inner surface of the diffuser shell circular portion 478. When the plate member 491 that blocks the short pass is provided, the fixing of the coolant/filter to the housing is needed only at the end face 495 on the opposite side.

Between the outer circumferential wall 468 of the housing and the outer layer 489 of the coolant/filter 467 is formed a narrow space 409, which provides a gas passage 409', annular in a radial cross section, around the coolant/filter 467. As with the airbag inflator of FIG. 16, the area of the space 409 in the annular radial cross section is set larger than the total open areas of the gas discharge ports 477 in the diffuser shell. The spacer 469 provided around the coolant/filter ensures that the combustion gas passes through the entire area of the coolant/filter 467 and flows toward the gas passage 409', thereby enhancing uniformity of flow and realizing an efficient use of the coolant/filter 467 and effective cooling and cleaning of the combustion gas. The combustion gas cooled and cleaned in this manner passes through the space 409 to reach the gas discharge ports 477 in the diffuser shell. To prevent entry of outer moisture into the housing 463, the gas discharge ports 477 in the diffuser shell are sealed from inside with an aluminum sealing tape 496.

The airbag inflator is assembled in the following procedure. First, the closure shell 462 is placed so that its circular portion 471 is at the bottom and the igniter 464 is installed in the center hole 474. Next, the coolant/filter 467 is installed and the solid gas generating material 466 is filled inside the filter. Then the plate member 491 is fitted over the gas generating material 466. Finally, the flange portion 486 of the diffuser shell is stacked on the flange portion 487 of the closure shell and they are welded by the laser weld 488 to join the diffuser shell 461 and the closure shell 462.

In the airbag inflator of this construction, when a sensor (not shown) detects an impact, an impact detection signal is sent to the igniter 464, which is activated to ignite the gas generating material 466 in the combustion chamber 484. The gas generating material burns producing a high-temperature, high-pressure gas, which enters the entire area of the coolant/filter 467 and, during the passage through the coolant/filter 467, is cooled and cleared of combustion contaminant particulates. The combustion gas cooled and cleaned in this way passes through the narrow space 409, breaks the aluminum sealing tape 496, and flows through the gas discharge ports 477 into the airbag (not shown). The airbag then inflates forming a cushion between a passenger and a hard structure, protecting the passenger from impacts.

In the foregoing embodiments of FIGS. 16 and 17, the diffuser shell and the closure shell together form a housing for the airbag inflator and are made from a stainless steel plate preferably 1.2–3.0 mm thick and 45–75 mm, or more preferably 50–70 mm, in outer diameter. The diffuser shell and the closure shell can be joined by a variety of welding methods, such as electron beam welding, laser welding, TIG arc welding and projection welding. Instead of the stainless steel plate, a nickel-plated steel plate may be used as the material of the diffuser shell and closure shell. The gas discharge ports of the diffuser shell may have a diameter of 1.5–4.5 mm and a total of 16 to 24 such ports may be arranged in the circumferential direction. The overall height of the housing (from the top surface of the diffuser shell to the bottom surface of the closure shell) is preferably set to 25–40 mm.

A SIXTH PREFERRED EMBODIMENT

Figure 18:
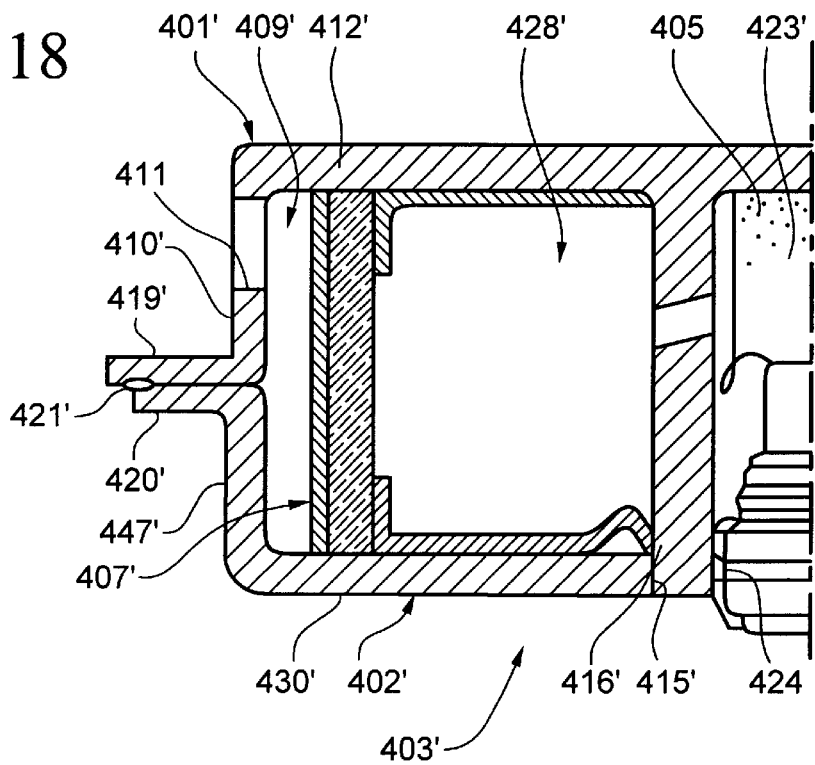
FIG. 18 is a partial cross-section of another embodiment of the airbag inflator of the present invention.

FIG. 18 shows another example of the airbag inflator, which is similar to the one shown in FIG. 16 and in which a diffuser shell 401' and a closure shell 402' are formed by casting aluminum alloy. The diffuser shell 401' has a circular portion 412', a central cylinder portion 416' formed integral with the circular portion 412', a circumferential wall portion 410' formed at the outer circumference of the circular portion 412', and a flange portion 419' formed at the free end of the circumferential wall portion 410' and extending radially outwardly. The closure shell 402' has a circular portion 430', a center hole 415' formed at the center of the circular portion 430', a circumferential wall portion 447' formed at the outer circumference of the circular portion 430', and a flange portion 420' formed at the free end of the circumferential wall portion 447' and extending radially outwardly. The center hole 415' is fitted over the outer circumference of the central cylinder portion 416'; the flange portion 419' of the diffuser shell and the flange portion 420' of the closure shell are stacked and laser-welded at 421' to join the diffuser shell and the closure shell to form the housing 403'. Similar to the inflator as illustrated in FIG. 16, the inflator of the present embodiment also includes a combustion chamber 428', having a coolant/filter 407' therein, and an ignition device accommodating chamber 423' defined by a central cylinder member 416' protruding from the diffuser shell 401'. A narrow space 409' is provided between the coolant/filter 407' and the housing. The members identical with those of FIG. 16 are given like reference numbers and their descriptions are omitted.

In the airbag inflator, as illustrated in FIG. 18, the closure shell is laser-welded to the diffuser shell to form the housing. However, friction welding can also be used instead of the laser welding as disclosed in U.S. Pat. No. 5,466,420.

A SEVENTH PREFERRED EMBODIMENT

Figure 19:
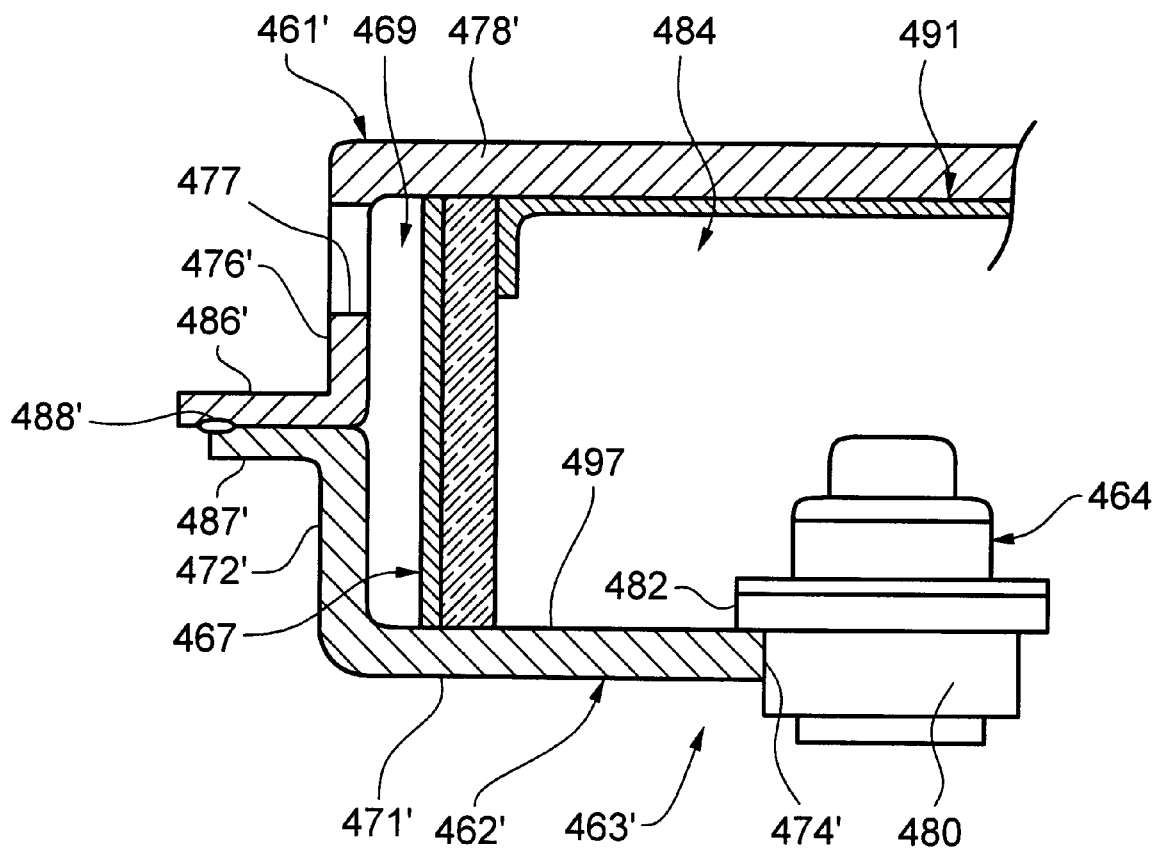
FIG. 19 is a partial cross-section of still another embodiment of the airbag inflator of the present invention.

FIG. 19 shows another example of the airbag inflator, which is similar to the one shown in FIG. 17 and in which a diffuser shell 461' and a closure shell 462' are formed by casting aluminum alloy. The diffuser shell 461' has a circular portion 478', a circumferential wall portion 476' formed at the outer circumference of the circular portion 478', and a flange portion 486' formed at the free end of the circumferential wall portion 476' and extending radially outwardly. The closure shell 462' has a circular portion 471', a circumferential wall portion 472' formed at the outer circumference of the circular portion 471', and a flange portion 487' formed at the free end of the circumferential wall portion 472' and extending radially outwardly. At the center of the circular portion 471' is formed a center hole 474', in which a body portion 480 of the igniter 464 is fitted. The flange portion 482 of the igniter 464 engages with the inner surface 497 of the circular portion 471' of the closure shell. The flange portion 486' of the diffuser shell and the flange portion 487' of the closure shell are overlapped and laser-welded at 488' to join the diffuser shell 461' and the closure shell 462' to form the housing 463'. The members identical with those of FIG. 17 are given like reference numbers and their explanations are omitted.

AN EIGHTH PREFERRED EMBODIMENT

Figure 20:
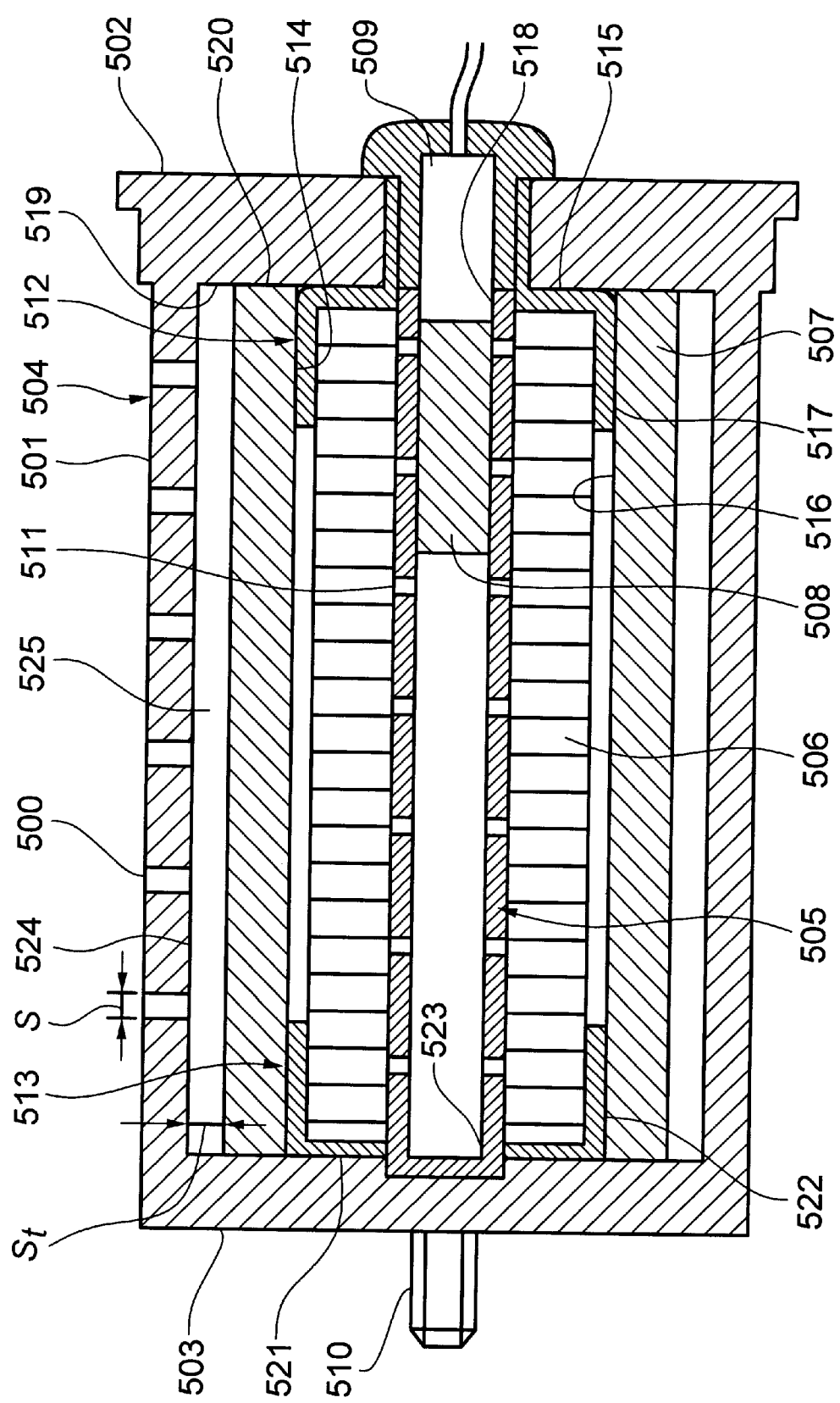
FIG. 20 is a cross-section of an airbag inflator of the present invention adapted for passenger side airbags.

FIG. 20 is a cross section of an airbag inflator of this invention suited for an airbag apparatus used at the front passenger seat. The airbag inflator of FIG. 20 has a housing 504, which includes a cylindrical portion 501 formed with a plurality of gas discharge ports 500 arranged in circumferential and axial directions and sidewall portions 502, 503 provided at the ends of the cylindrical portion 501. At the center in the housing 504 is arranged a transfer charge tube 505, over which are sleeved a number of disk-shaped pieces of a gas generating material 506. Surrounding these is a coolant/filter 507. In one of the sidewall portions 502 is installed an ignition device comprising a transfer charge 508 and an igniter 509. The ignition device is accommodated in the transfer charge tube 505. A fixing bolt 510 is secured to the other sidewall portion 503. The transfer charge tube 505 has many openings 511, through which flames of the transfer charge 508 eject and which are distributed evenly over the wall of the transfer charge tube. In at least an area where the gas discharge ports 500 are formed, the inner surface of the housing 504 is bonded with an aluminum sealing tape 524. This aluminum sealing tape 524 hermetically closes the gas discharge ports 500 to prevent external moisture from entering into the housing through the gas discharge ports 500.

A plate member 512 is installed at the right end of the coolant/filter 507 and a plate member 513 at the left end. The plate member 512 comprises a circular portion 515, which closes a right end opening 514 of the coolant/filter 507, and a circumferential wall portion 517 formed integral with the circular portion 515 and engaging with an inner circumferential surface 516 of the coolant/filter. The circular portion 515 has a center hole 518 that is fitted over the outer circumferential surface of the transfer charge tube 505. The plate member 513, like the plate member 512, has a circular portion 521, a circumferential wall portion 522, and a center hole 523. These plate members 512, 513, because they are blocked from moving in the radial direction by the transfer charge tube 505, function as a means for positioning the coolant/filter 507 during the assembly of the airbag inflator. Further, the plate members 512, 513 work as a means for preventing the displacement of the coolant/filter 507 due to vibration of the vehicle and also as a short pass prevention means for preventing a short pass of the combustion gas between the inner surface 519 of the housing and the coolant/filter end face 520 during the operation of the airbag inflator.

The space 525 is formed between the cylindrical portion 501 of the housing and the coolant/filter 507 to provide a gas passage, annular in radial cross section, around the coolant/filter 507. The area $S_r$ of the gas passage in the radial annular cross section is set larger than the sum $A_r$ of open areas S of the gas discharge ports 500 in the cylindrical portion. The space 525 around the coolant/filter allows the combustion gas to flow through the whole area of the coolant/filter toward the gas discharge ports 500, thus realizing enhanced uniformity of flow and efficient utilization of the coolant/filter and effective cooling and cleaning of the combustion gas. The combustion gas thus cooled and cleaned flows through the gas passage into the gas discharge ports 500 in the cylindrical portion.

When a sensor detects an impact, an impact detection signal is sent to the igniter 509, which is then activated to ignite the transfer charge 508, producing high-temperature flames. The flames eject through the openings 511 of the transfer charge tube 505, igniting the gas generating material 506 near the openings. As a result, the gas generating material 506 burns to produce high-temperature, high-pressure gas, which passes through the whole area of the coolant/filter 507, during which time the gas is effectively cooled and cleared of contaminant particulates. The combustion gas thus cooled and cleaned flows through the space 525, breaks the aluminum sealing tape 524, and ejects through the gas discharge ports 500 into the airbag (not shown). The airbag is inflated forming a cushion between a passenger and surrounding hard structures to protect the passenger from impacts.

In the airbag inflator of FIGS. 16 and 17, for example, the ratio between the total surface area A of the cylindrical pieces of solid gas generating material 406 and the total surface area At of open areas of the gas discharge ports 411 in the diffuser shell is set to A/At=100–300 with 20 to 50 g of gas generating material. This setting of the surface area ratio adjusts the combustion speed of the gas generating material to a value appropriate for the airbag at the driver's seat and ensures that the gas generating material in the airbag inflator burns completely within a desired duration.

In the airbag inflator of FIG. 20, for example, the ratio between the total surface area A of the cylindrical pieces of solid gas generating material 506 and the total surface area At of open areas of the gas discharge ports 500 in the cylindrical portion is set to A/At=80–240 with 40 to 120 g of gas generating material. This setting of the surface area ratio adjusts the combustion speed of the gas generating material to a value appropriate for the airbag at the front passenger seat and ensures that the gas generating material in the airbag inflator burns completely within a desired duration. By contrast, a suitable ratio for a side-impact airbag inflator, albeit of similar structure, is 250–3600 with 10 to 25 g of gas generating material.

Figure 35:
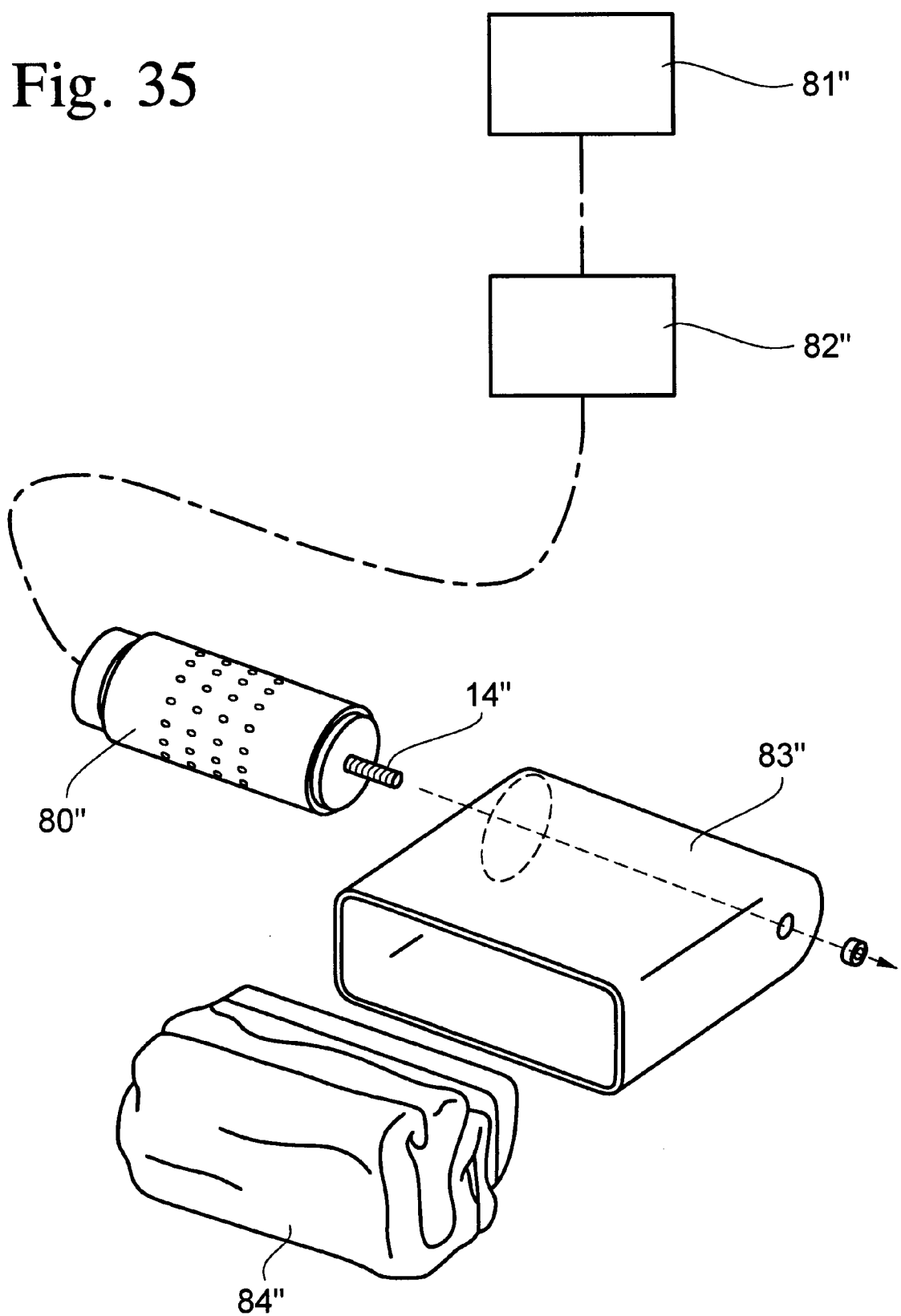
FIG. 35 is a schematic of an airbag apparatus of the present invention incorporating airbag inflators such as those illustrated in FIG. 20.

FIG. 35 shows an airbag apparatus suitable for use in a passenger side. The airbag apparatus of the present invention has an inflator 80", suitable for a passenger side airbag apparatus, an airbag 84", both of which are disposed inside a module case 83". Further, a shock sensor 81" is connected to the inflator 80" through a control unit 82". The passenger side airbag apparatus, as shown in FIG. 35, is disposed in a passenger side dashboard, for example, of a vehicle.

The inflator 80" of FIG. 35, which shows one of the preferred embodiments of the present invention, is an electrically activated inflator, as previously described with respect to FIG. 20. However, a mechanically-activated inflator having a mechanical shock sensor can also be used as long as the inflator has a housing, which is elongated along a central axis thereof, and gas exhaust ports in periphery and axial directions of the housing.

The airbag 84" is made of nylon (i.e., nylon 66), or polyester, and has sufficient capacity to maintain safety of a passenger. The airbag is attached to an opening of the module case 83", folded, and installed inside the module case 83".

The module case 83", made of polyurethene, for example, has a size sufficient to install the inflator 80" and the airbag 84". A pad module is constituted by installing the airbag 84" and the inflator 80" in the module case 83". The pad module is disposed, for example, in the passenger side dashboard.

The shock sensor 81" and the control unit 82" are identical to the sensor and unit used in the airbag apparatus as described with respect to FIG. 8.

In this airbag apparatus, the control unit 82" initiates a calculation when it receives a signal, from the shock sensor 81", generated by a shock due to a collision of the vehicle. The inflator 80" is activated and generates combustion gas based on a result of calculation. The gas generated by the inflator 80" flows into the airbag 84". Thus, the airbag 84" expands outside the module case 83" and forms a cushion, which absorbs the shock, between the passenger and the dashboard.

A NINTH PREFERRED EMBODIMENT

Figure 23:
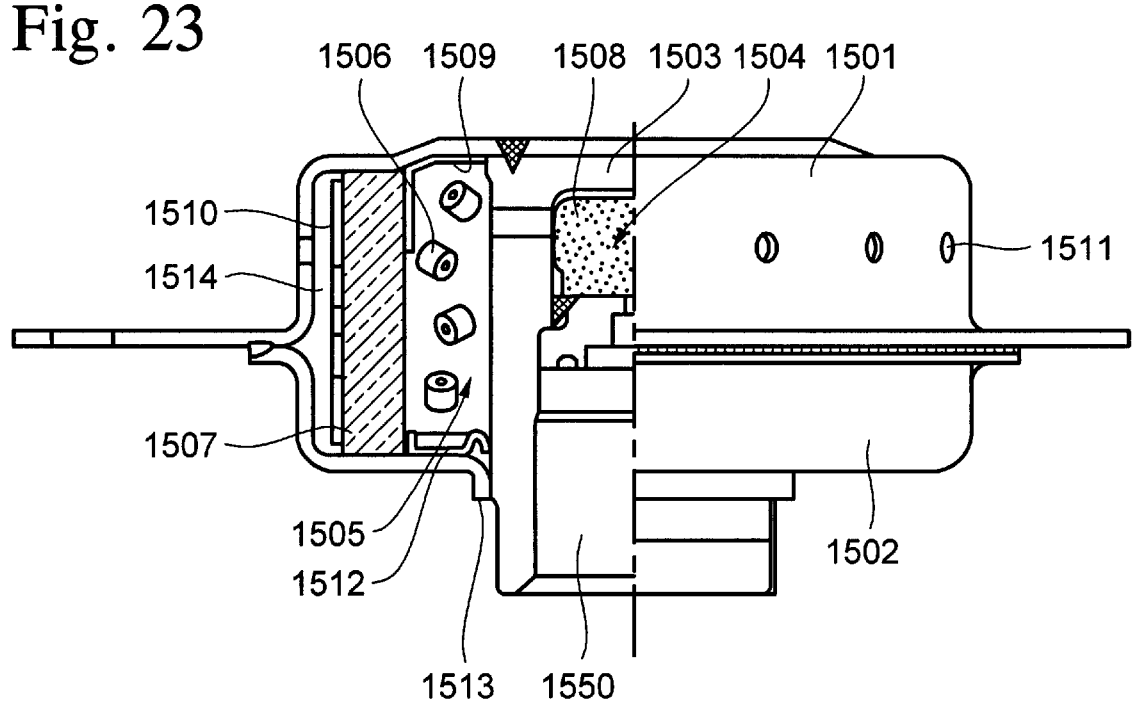
FIG. 23 is a partial cross-section of still another embodiment of the airbag inflator of the present invention.

FIG. 23 shows a mechanically actuated inflator which uses a mechanical sensor for detecting a shock. The mechanically actuated inflator, as shown in FIG. 23, is particularly suitable when installed in a driver side.

The mechanically actuated inflator, as illustrated in FIG. 23, has a housing which includes a diffuser shell 1501 having a plurality of gas diffuser ports at a periphery thereof, and a closure shell 1502, having a central opening 1513, joined to the diffuser shell 1501. Both shell can be joined together by various welding method such as plasma welding, friction welding, projection welding, electron beam welding, laser welding, and TIG arc welding. The housing has two chambers therein, defined by a cylindrical separation wall 1503 disposed concentrically with the central opening 1513. The separation wall 1503 defines an ignition device accommodating chamber 1504 and a combustion chamber 1505. As stated in the description with respect to FIGS. 1, 7, 10, 16, for example, a gas generating propellants 1506, coolant/filter 1507, a coolant/filter supporting element 1509, a ring 1510, a ring-shaped plate member 1512, and other elements suitable for the actuation of the inflator are installed inside the combustion chamber 1505. Also, it is possible to provide, for example, a space 1514 outside the coolant/filter 1507.

Figure 24:
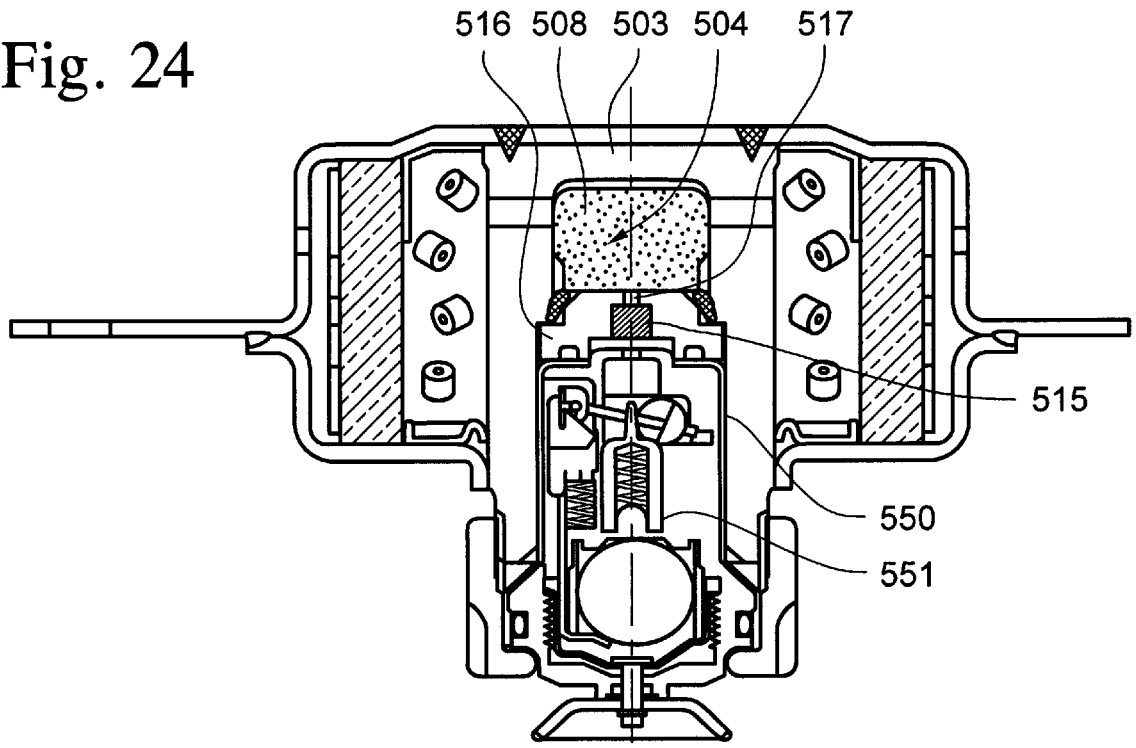
FIG. 24 is a cross-section of the airbag inflator of FIG. 23.

In the inflator, as illustrated in FIG. 24, an ignition device for igniting the propellants includes: a mechanical-type sensor 1550, which mechanically detects a shock and fires a firing pin 1551; a detonator 1515, which is ignited and burnt by being pierced by the firing pin 1551 fired from the mechanical-type sensor 1550; and a transfer charge 1508 which burns the propellants 1506 by being ignited and burnt by the flame from the ignited detonator 1515. The ignition device, shown in FIG. 24, is disposed inside the ignition device accommodating chamber 1504 of the housing. A detonator piece 1516 for accommodating and fixing the detonator 1515 is disposed between the transfer charge 1508 and the mechanical-type sensor 1550. The detonator piece 1516 is attached to the separation wall 1503 by disposing the detonator 1515 at the central axial of the housing. The mechanical-type sensor 1550 is disposed inside the chamber 1504 such that the firing pin 1551, which is fired when the sensor 1550 detects a shock, can pierce the detonator 1515. The detonator piece 1516 includes a penetration port 1517 which connects a portion where the detonator 1515 is installed and a portion where the transfer charge 1508 is installed. In order to avoid the detonator 1515 from adsorbing moisture, a sealing tape (not shown) can be attached on either one or both ends of the penetration port 1517 to block the port 1517.

Figure 25:
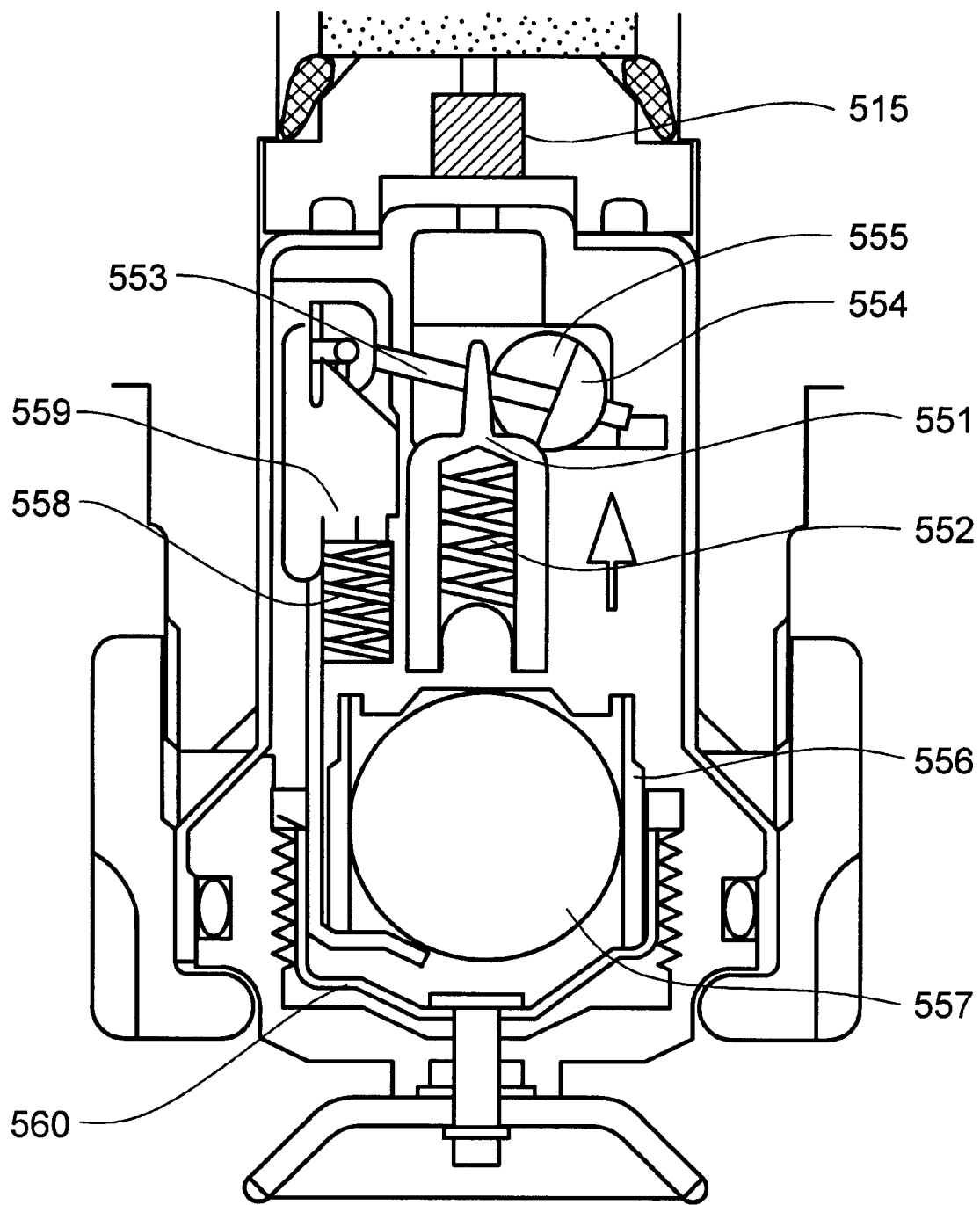
FIG. 25 is a cross-section of a mechanical-type sensor of the airbag inflator of FIG. 23.

For the mechanical-type sensor 1550, which mechanically detects a shock and fires the firing pin 1551, a sensor, as illustrated in FIG. 25, constructed by: urging a single firing pin 1551 against a cam face 1554 of a trigger 1553 by a coil spring 1552; forming a depression 1555 adjacent the cam face 1554 such that an engagement of the trigger 1553 and the firing pin 1551 is released; and providing a ball 1557 in a cylinder 1556 and engaging the ball 1557 with an arm portion 1560 of a holder 1559 which is upwardly urged by a coil spring 1558, can be used. When a shock is applied to this mechanical-type sensor 1550, the ball 1557 moves in a downward direction inside the cylinder 1556, thereby moving the holder 1559 downward via the arm portion 1560. The movement of the holder 1559 rotates the trigger 1553, and disengages the cam face of the trigger 1553 from the firing pin 1551. This causes the coil spring 1552 to project the firing pin 1551 through the depression 1555 and hit the detonator 1515. The structure of this mechanical-type sensor 1550 is simple and the capacity and weight thereof is less as compared to a mechanical-type sensor having two firing pins, since this sensor 1550 utilizes only one piercing mechanism for the firing pin.

Figure 32:
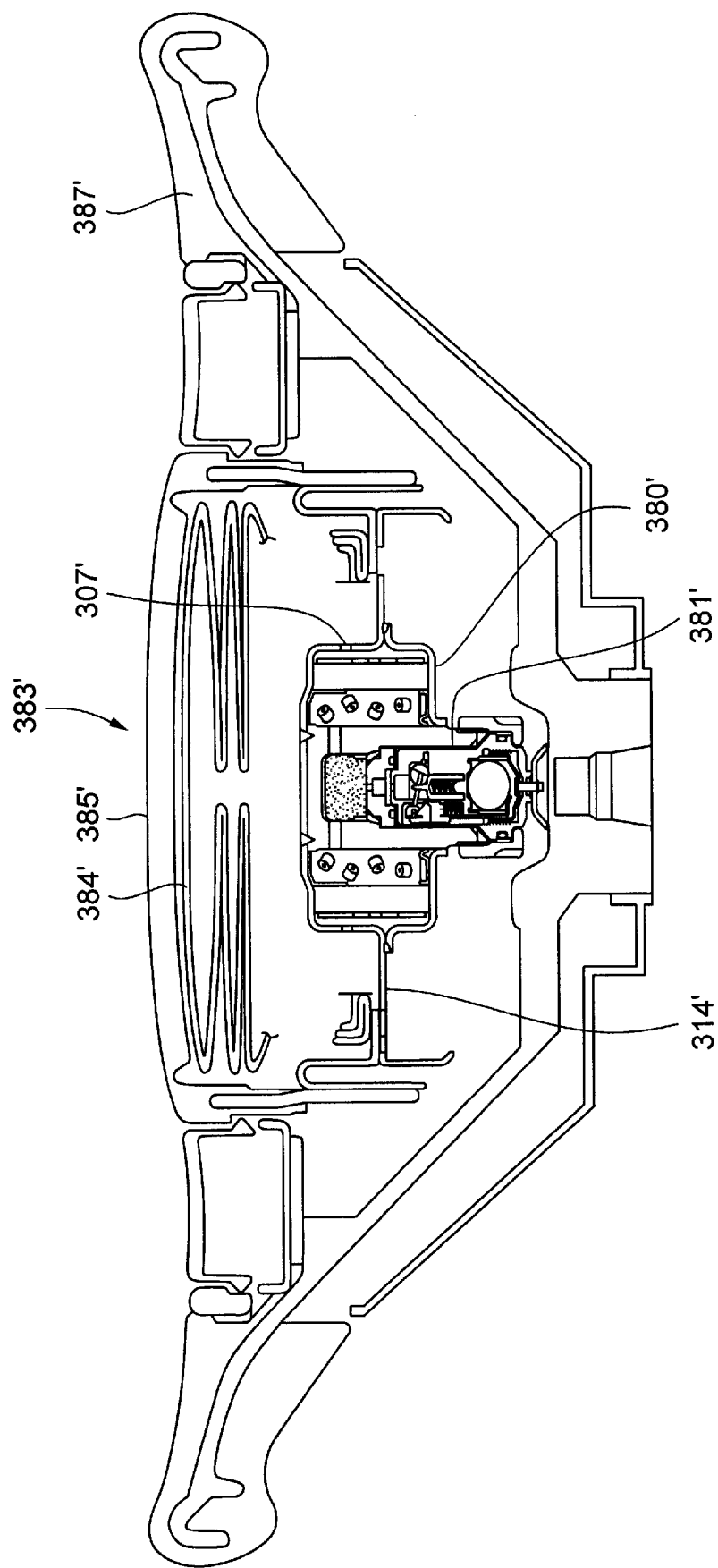
FIG. 32 is a schematic of an airbag apparatus of the present invention incorporating an airbag inflator such as those illustrated in FIG. 23.

FIG. 32 shows an airbag apparatus having a mechanically-actuated inflator 380'. The airbag apparatus shown in the figure includes the mechanically-actuated inflator 380', as illustrated in FIG. 23, and an airbag 384' installed inside a module case 383'.

The module case 383' is made, for example, of a polyurethane and includes a module cover 385'. The airbag 384' and the inflator 380' are disposed inside the module case 383' to form a pad module. The pad module is attached to a steering wheel 387' of an automobile.

The airbag 384' is made of nylon (i.e., nylon 66), or polyester. The gas exhaust ports 307' of the inflator 380' are surrounded by an opening of the airbag 384', and the airbag is folded and attached to a flange portion 314' of the inflator.

In the airbag apparatus utilizing a mechanically-activated inflator 380', as described above, a shock sensor for detecting a shock and a control unit for managing an operation of the inflator, which are required in an electrically activated inflator, as illustrated in FIG. 8, and harnesses for connecting these elements are not necessary.

This airbag apparatus activates the inflator 380' and spouts combustion gas from the gas exhaust port 307' by detecting a shock, generated by a collision of the vehicle, by a mechanical-type sensor 381'. The gas flows into the airbag 384' and expands the bag. The bag, then, tears the module cover 385' and forms a cushion between the steering wheel 387' and a passenger.

A TENTH PREFERRED EMBODIMENT

Figure 26:
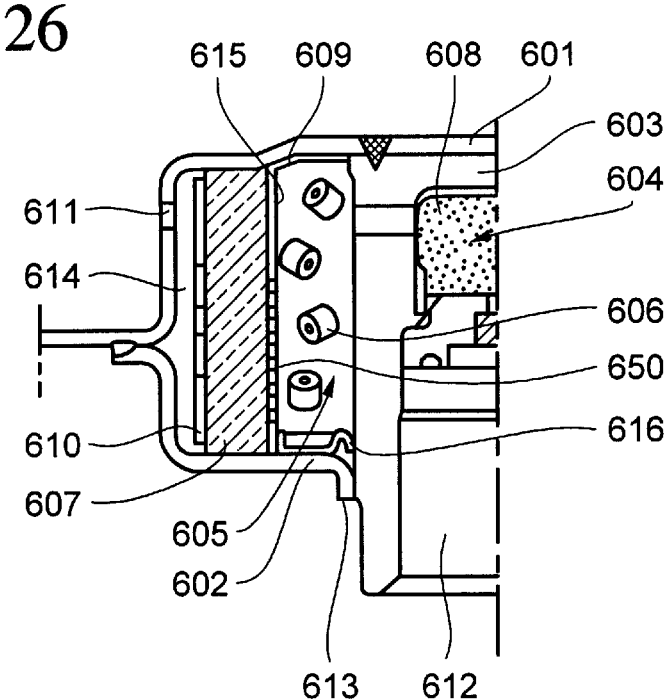
FIG. 26 is a cross-section of yet another embodiment of the airbag inflator of the present invention.
Figure 27:
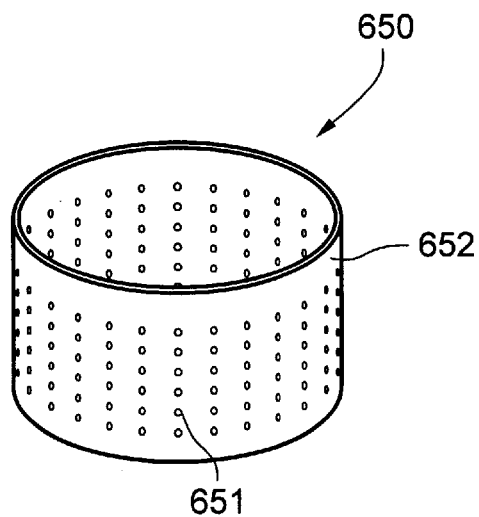
FIG. 27 is a schematic of a perforated basket of the airbag inflator of FIG. 26.
Figure 28:
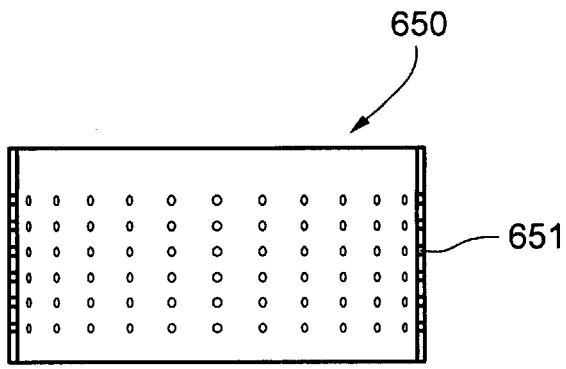
FIG. 28 front view of the perforated basket of the airbag inflator of FIG. 26.

FIG. 26 shows an inflator for an airbag having a perforated basket 2650, made of stainless steel, aluminum, or carbon steel, between gas generating propellants 2606 and a coolant/filter 2607. The inflator has a housing which includes a diffuser shell 2601 having a plurality of gas diffusion ports 2611 and a closure shell 2602, which is joined to the diffuser shell 2601 by one of various welding methods. The housing has two chambers therein, defined by an approximately cylindrical separation wall 2603 disposed concentrically with a central opening 2613. The separation wall 2603 defines an ignition device accommodating chamber 2604 and a combustion chamber 2605. An ignition device including, for example, a transfer charge 2608 and a mechanical-type sensor 2612, as described in conjunction with FIGS. 23–25, is disposed inside the ignition device accommodating chamber 2604. A perforated basket 2650, as shown in FIGS. 27 and 28, and gas generating propellants 2606, a coolant/filter 2607, a coolant/filter supporting element 2609, a ring 2610, a ring-shaped plate member 2616, and other elements suitable for the actuation of the inflator are installed in the combustion chamber 2605. Also, it is possible to provide, for example, a space 2614 outside the coolant/filter 2607.

The perforated basket 2650 is approximately cylindrical in shape and has a plurality of through-holes 2651 on the peripheral wall surface 2652 in peripheral and axial directions. The through-holes 2651 can be either formed at a predetermined interval with regularity or randomly. Further, the size of the through-holes 2651 can be freely adjusted within the range that does not affect the flow of the combustion gas passing therethrough. The perforated basket 2650 is disposed between the gas generating propellants 2606 and the coolant/filter 2607, and covers the entire area where the coolant/filter 2607 is exposed, in other words the entire area below a flame resisting plate portion 2615 of the coolant/filter supporting element 2609. The flame resisting plate portion 2615 has a height of 8–15 mm and extends at least 2 mm below the lowest through-holes in the separation wall, for example, and prevents flames from the through-holes in the separation wall from contacting the coolant/filter 2607. Further, the perforated basket 2650 can be designed to have the same or slightly shorter axial length than that of the coolant/filter 2607 such that the perforated basket 2650 extends to the outside of the flame resisting plate portion 2615 of the coolant/filter supporting element 2609, thereby overlapping with the flame resisting plate portion 2615.

FIG. 26 shows a perforated basket 2650 provided inside the mechanically-actuated inflator having the mechanical-type sensor 2612. However, the perforated basket 2650 can also be used in electrically actuated inflators as shown in FIGS. 1, 7, 10, 16, 17, and 19.

AN ELEVENTH PREFERRED EMBODIMENT

Figure 29:
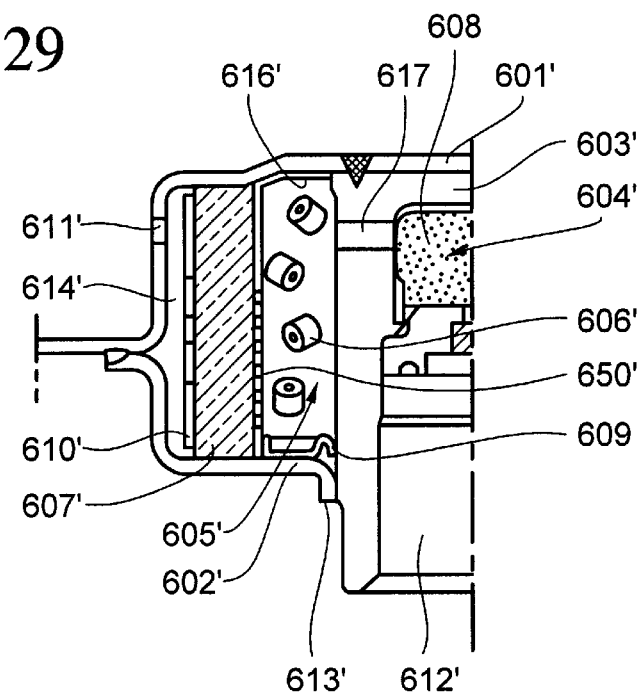
FIG. 29 is a cross-section of still another embodiment of the airbag inflator of the present invention.
Figure 30:
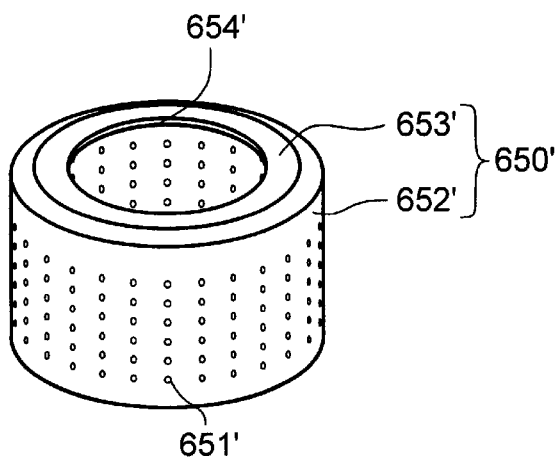
FIG. 30 is a schematic of a perforated basket of the airbag inflator of FIG. 29.
Figure 31:
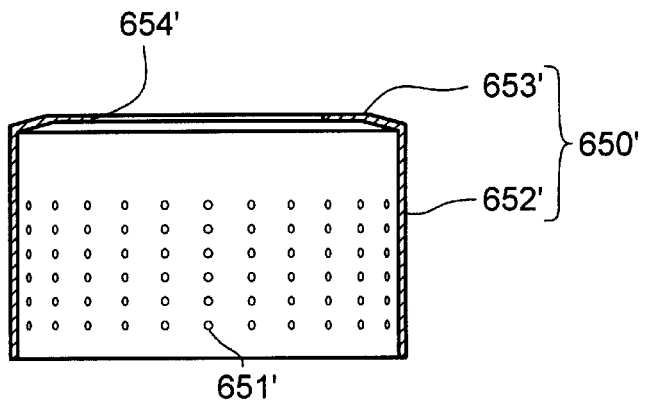
FIG. 31 front view of the perforated basket of the airbag inflator of FIG. 29.

Similar to the airbag inflator shown in FIG. 26, FIG. 29 shows an inflator for an airbag having a housing which includes a diffuser shell 601', having a plurality of gas diffusion ports 611', and a closure shell 602' joined to the diffuser shell 601'. The closure shell 602' has a central opening 613'. The housing has a separation wall 603' which defines the housing into two chambers, namely, an ignition device accommodating chamber 604' and a combustion chamber 605'. An ignition device, including a transfer charge 608' and a mechanical-type sensor 612', as described in conjunction with FIG. 23, is disposed inside the ignition device accommodating chamber 604'. In addition to a perforated basket 650', as shown in FIGS. 30 and 31, gas generating propellants 606', a coolant/filter 607', a ring 610', a ring shaped plate member 609', and other elements suitable for the actuation of the inflator are installed in the combustion chamber 605'. Also, it is possible to provide, for example, a space 614' outside the coolant/filter 607'. The perforated basket 650' is made of stainless steel, aluminum, or carbon steel.

In the present embodiment, the perforated basket 650', disposed between the gas generating propellants 606' and the coolant/filter 607',' has a shape different from the perforated basket 2650 shown in FIG. 26. As illustrated in FIGS. 30 and 31, the perforated basket 650' includes a peripheral wall 652' having a plurality of through-holes 651', and an approximately flat circular cap portion 653' formed at the upper opening of the peripheral wall 652'. The cap portion 653' may be formed such that it engages with an inner surface of an upper circular portion 616' of the housing. Since this particular embodiment has a cylindrical separation wall 603', attached to the diffuser shell 601', for defining the ignition device accommodating chamber 604', the cap portion 653' of the perforated basket 650' has an opening 654', at the center portion thereof, for inserting the separation wall 603'.

In the perforated basket 650' of the present embodiment, the through-holes 651' are formed at portions of the peripheral wall 652' other than portions where it radially opposes the through-holes 617' in the separation wall 603'. In other words, the basket 650' can protect the coolant/filter 607' from flames spouting from the through-holes 617' due to the combustion of the transfer charge 608'. Further, to deflect the flames such that the flames sufficiently reach the gas generating propellants 606', the through-holes 651' in the peripheral wall 652' of the perforated basket 650' are formed at portions other than where it would be exposed to the flames from the through-holes 617' of the separation wall 603'. Preferably, the through-holes 651' are formed, at regular intervals, at portions of the periphery wall 652' at least 2 mm below the flame spouting portions of the separation wall 603'. As a result, the upper portion of the perforated basket 650', more specifically, the portion above the through-holes 651', has a coolant/filter protecting function which protects the coolant/filter 607' from the flames of the transfer charge 608' spouting toward the coolant/filter 607', and also a combustion enhancing function which deflects the flames such that the flames sufficiently reach the gas generating propellants 606'. As in the case of the perforated basket as illustrated in FIGS. 26–28, the size of the through-holes 651' can be adjusted in the similar manner.

FIG. 29 shows a perforated basket 650' provided inside the mechanically-actuated inflator having the mechanical-type sensor 612'. However, the perforated basket 650' can also be used in electrically actuated inflators as shown in FIGS. 1, 7, 10, 16, 17, and 19.

A TWELFTH PREFERRED EMBODIMENT

Figure 33:
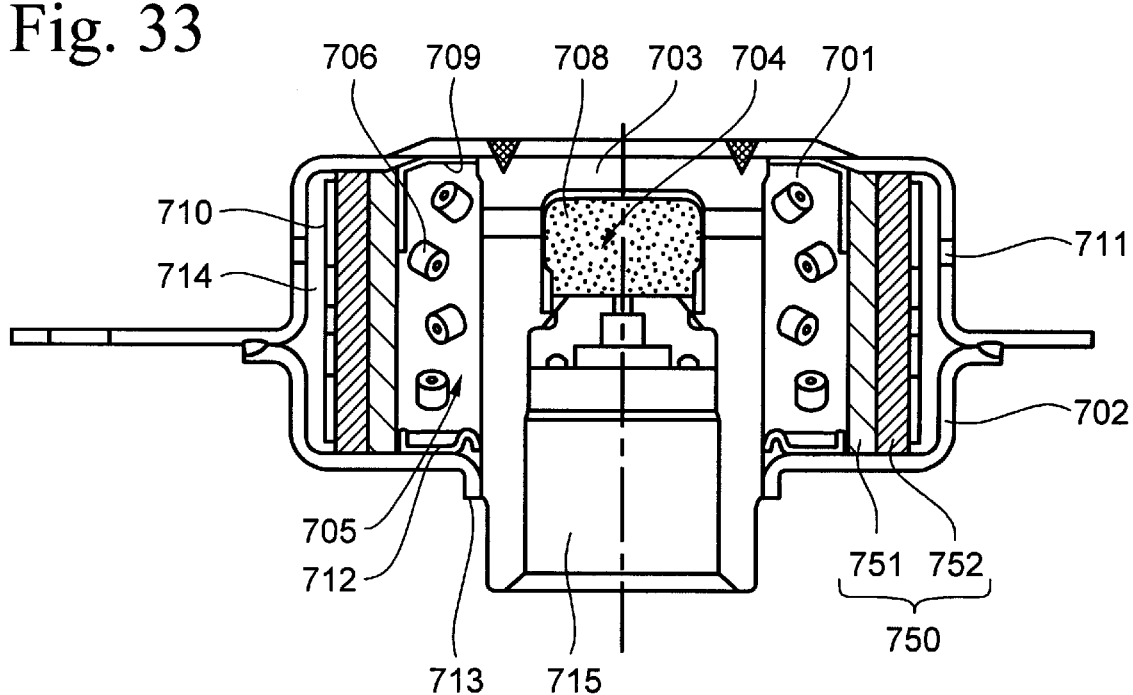
FIG. 33 is a cross-section of yet another embodiment of the airbag inflator of the present invention.
Figure 34:
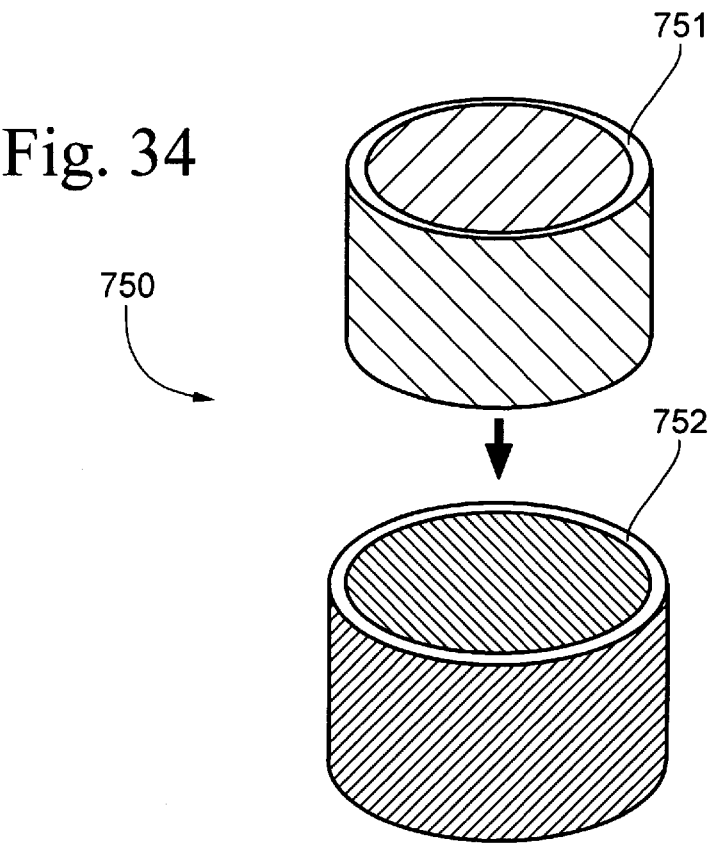
FIG. 34 is a schematic of a coolant/filter of the airbag inflator of FIG. 33.

The airbag inflator, as illustrated in FIG. 33, is characterized in that the coolant/filter 750 consisting of two or more layers, is installed in a housing. The housing has a separation wall 703 which defines the housing into two chambers, namely, an ignition device accommodating chamber 704 and a combustion chamber 705. An ignition device, including a transfer charge 708 and a mechanical-type sensor 715, as described in conjunction with FIG. 23, is disposed inside the ignition device accommodating chamber 704. In addition to a coolant/filter 750 having two or more layers, as illustrated in FIG. 34, gas generating propellants 706, a coolant/filter supporting element 709, a ring 710, a plate member 712, and other elements suitable for the actuation of the inflator are installed in the combustion chamber 705. Also, it is possible to provide, for example, a space 714 outside the coolant/filter 750.

The coolant/filter 750, consisting of two or more layers, can be constructed by forming an inner layer 751 and an outer layer 752 with different densities or different materials, and superimposing these in a radial direction. When constructing a coolant/filter 750 with layers having different densities, the inner layer 751 can be formed with a coarse metal mesh and the outer layer 752 can be formed with a fine metal mesh. For the coarse metal mesh used in the inner layer 751, an annular metal mesh layer, which is compressed in a mold, can be used.

In the present embodiment, as illustrated in FIG. 33, a coolant/filter structure as described in the foregoing was installed in the mechanically-actuated inflator having the mechanical-type sensor 715. However, such coolant/filter can also be installed in electrically actuated inflators as shown in FIGS. 1, 7, 10, 16, 17, and 19.

A THIRTEENTH PREFERRED EMBODIMENT

Figure 36:
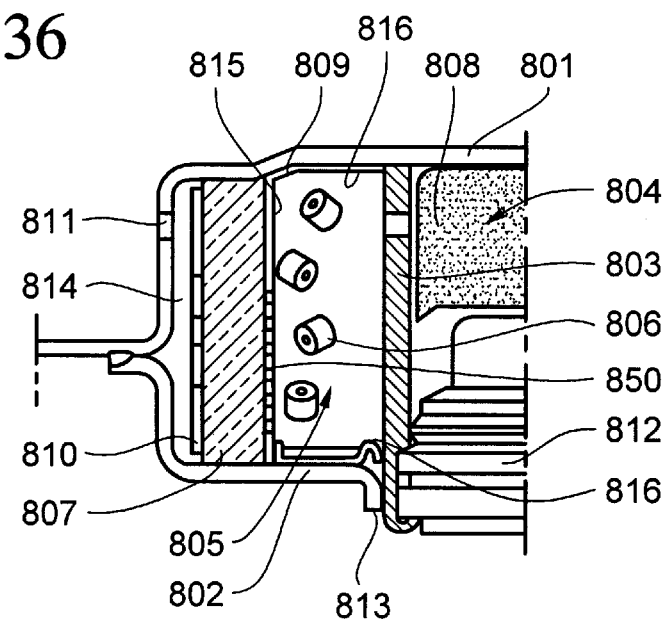
FIG. 36 is a cross-section of yet another embodiment of the airbag inflator of the present invention.
Figure 37:
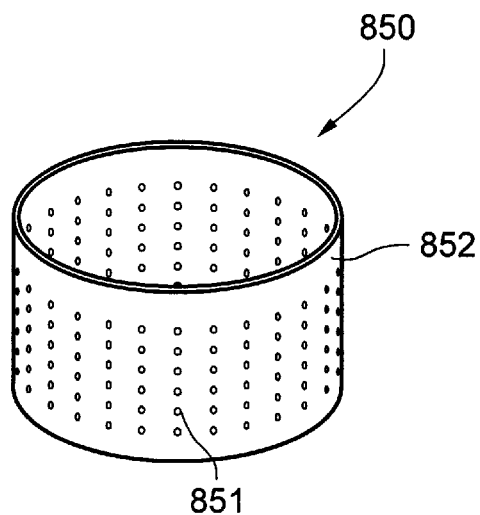
FIG. 37 is a schematic of a perforated basket of the airbag inflator of FIG. 36.
Figure 38:
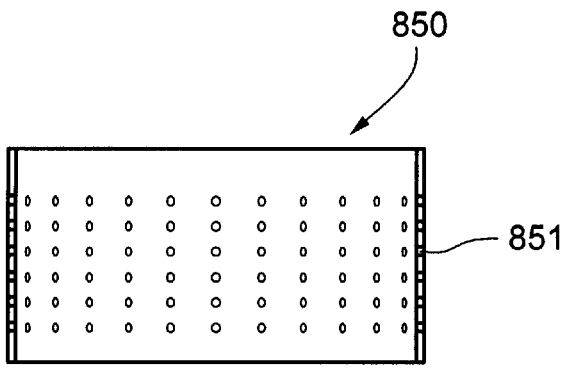
FIG. 38 front view of the perforated basket of the airbag inflator of FIG. 36.

The airbag inflator of the present embodiment, as illustrated in FIG. 36, is similar to the airbag inflator as illustrated in FIG. 26. The inflator of the present embodiment has a perforated basket 850, as illustrated in FIGS. 37 and 38, between gas generating propellants 806 and a coolant/filter 807. This inflator is different from the inflator of FIG. 26 in that the perforated basket 850 is utilized in an electrically-actuated inflator.

The inflator has a housing which includes a diffuser shell 801 having a plurality of gas diffusion ports 811 and a closure shell 802, which is joined to the diffuser shell 801 by one of various welding methods. The housing has two chambers therein, defined by an approximately cylindrical separation wall 803 disposed concentrically with a central opening 813. The separation wall 803 defines an ignition device accommodating chamber 804 and a combustion chamber 805. An ignition device including, for example, a transfer charge 808 and an igniter 812, as described in conjunction with other drawings, is disposed inside the ignition device accommodating chamber 804. A perforated basket 850, as shown in FIGS. 37 and 38, and gas generating propellants 806, a coolant/filter 807, a coolant/filter supporting element 809, a ring 810, a plate member 816, and other elements suitable for the actuation of the inflator are installed in the combustion chamber 805. Also, it is possible to provide, for example, a space 814 outside the coolant/filter 807.

The perforated basket 850 is approximately cylindrical in shape and has a plurality of through-holes 851 in the peripheral wall surface 852 in peripheral and axial directions. The through-holes 851 can be either formed at a predetermined interval with regularity or randomly. Further, the size of the through-holes 851 can be freely adjusted within the range that does not affect the flow of the combustion gas passing therethrough. The perforated basket 850 is disposed between the gas generating propellants 806 and the coolant/filter 807, and covers the entire area where the coolant/filter 807 is exposed, namely the entire area below a flame resisting plate portion 815 of the coolant/filter supporting element 809. Further, the perforated basket 850 can be designed to have the same or slightly shorter axial length than that of the coolant/filter 807 such that the perforated basket 850 extends to the outside of the flame resisting plate portion 815 of the coolant/filter supporting element 809, thereby overlapping with the flame resisting plate portion 815.

The perforated basket 850 can also be utilized in a mechanically-actuated inflator as illustrated in FIG. 26.

A FOURTEENTH PREFERRED EMBODIMENT

Figure 39:
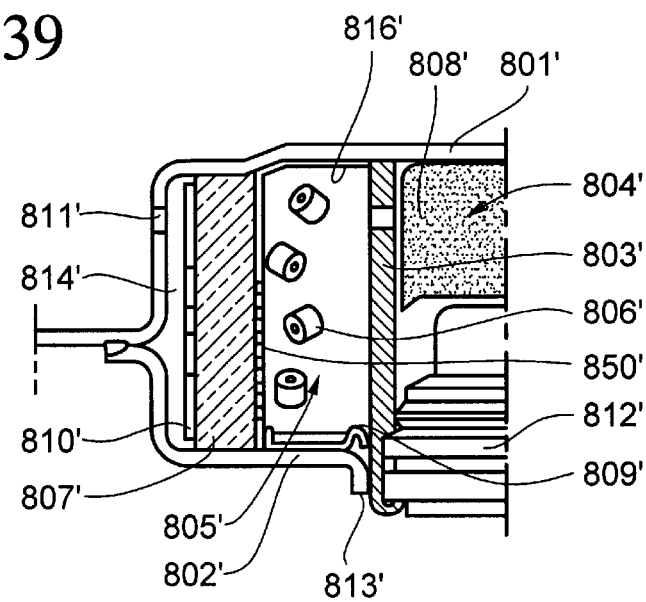
FIG. 39 is a cross-section of still another embodiment of the airbag inflator of the present invention.
Figure 40:
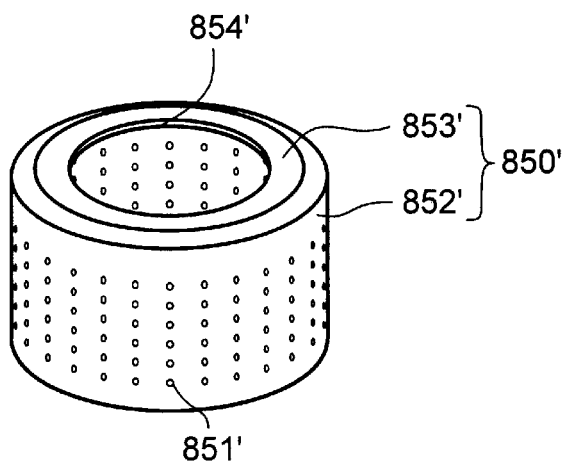
FIG. 40 is a schematic of a perforated basket of the airbag inflator of FIG. 39.
Figure 41:
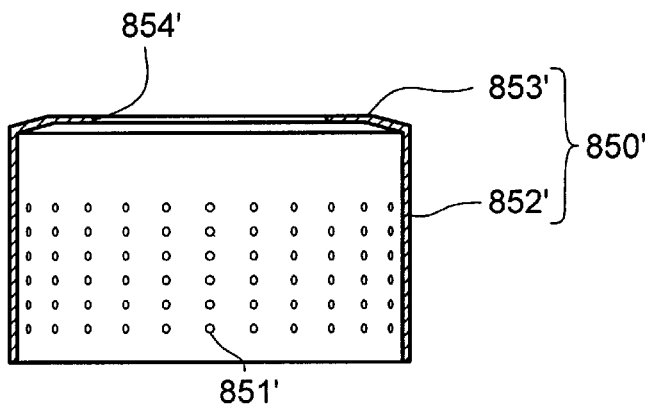
FIG. 41 front view of the perforated basket of the airbag inflator of FIG. 39.

The airbag inflator of the present embodiment, as illustrated in FIG. 39, is similar to the airbag inflator as illustrated in FIG. 29. The inflator of the present embodiment has a perforated basket 850', as illustrated in FIGS. 40 and 41, between gas generating propellants 806' and a coolant/filter 807'. This inflator is different from the inflator of FIG. 29 in that the perforated basket 850' is utilized in an electrically-actuated inflator.

Similar to the airbag inflator shown in FIG. 36, the inflator of the present embodiment has a housing which includes a diffuser shell 801', having a plurality of gas diffusion ports 811', and a closure shell 802' joined to the diffuser shell 801'. The closure shell 802' has a central opening 813'. The housing has a separation wall 803' which defines the housing into two chambers, namely, an ignition device accommodating chamber 804' and a combustion chamber 805'. An ignition device, including a transfer charge 808' and an igniter 812', as described in conjunction with other drawings, is disposed inside the ignition device accommodating chamber 804'. In addition to the perforated basket 850', as shown in FIGS. 40 and 41, gas generating propellants 806', a coolant/filter 807', a ring 810', a ring shaped plate member 809', and other elements suitable for the actuation of the inflator are installed in the combustion chamber 805'. Also, it is possible to provide, for example, a space 814' outside the coolant/filter 807'.

In the present embodiment, the perforated basket 850', disposed between the gas generating propellants 806' and the coolant/filter 860', has a shape different from the perforated basket 850 shown in FIG. 36. As illustrated in FIGS. 40 and 41, the perforated basket 850' includes a peripheral wall 852' having a plurality of through-holes 851', and an approximately flat circular cap portion 853' formed at the upper opening of the peripheral wall 852'. The cap portion 853' may be formed such that it engages with an inner surface of an upper circular portion 816' of the housing. Since this particular embodiment has a cylindrical separation wall 803', attached to the diffuser shell 801', for defining the ignition device accommodating chamber 804', the cap portion 853' of the perforated basket 850' has an opening 854', at the center portion thereof, for inserting the separation wall 803'.

In the perforated basket 850' of the present embodiment, the through-holes 851' are formed at portions of the peripheral wall 852' other than portions where it radially opposes the through-holes 817' in the separation wall 852'. In other words, the basket 850' can protect the coolant/filter 807' from flames spouting from the through-holes 817' due to the combustion of the transfer charge 808'. Further, to deflect the flames such that the flames sufficiently reach the gas generating propellants 806', the through-holes 851' in the peripheral wall 852' of the perforated basket 850' are formed at portions other than where it would be exposed to the flames from the through-holes 817' of the separation wall 803'. Preferably, the through-holes 851' are formed, at regular intervals, at portions of the periphery wall 852' below the flame spouting portions of the separation wall 803'. As a result, the upper portion of the perforated basket 850', more specifically, the portion above the through-holes 851', has a coolant/filter protecting function which protects the coolant/filter 807' from the flames of the transfer charge 808' spouting toward the coolant/filter 807', and also a combustion enhancing function which deflects the flames such that the flames sufficiently reach the gas generating propellants 806'. As in the case of the perforated basket as illustrated in FIGS. 37–38, the size of the through-holes 851' can be adjusted in the similar manner.

The perforated basket 850' can also be used in mechanically-actuated inflators as shown in FIG. 29.

A FIFTEENTH PREFERRED EMBODIMENT

Figure 42:
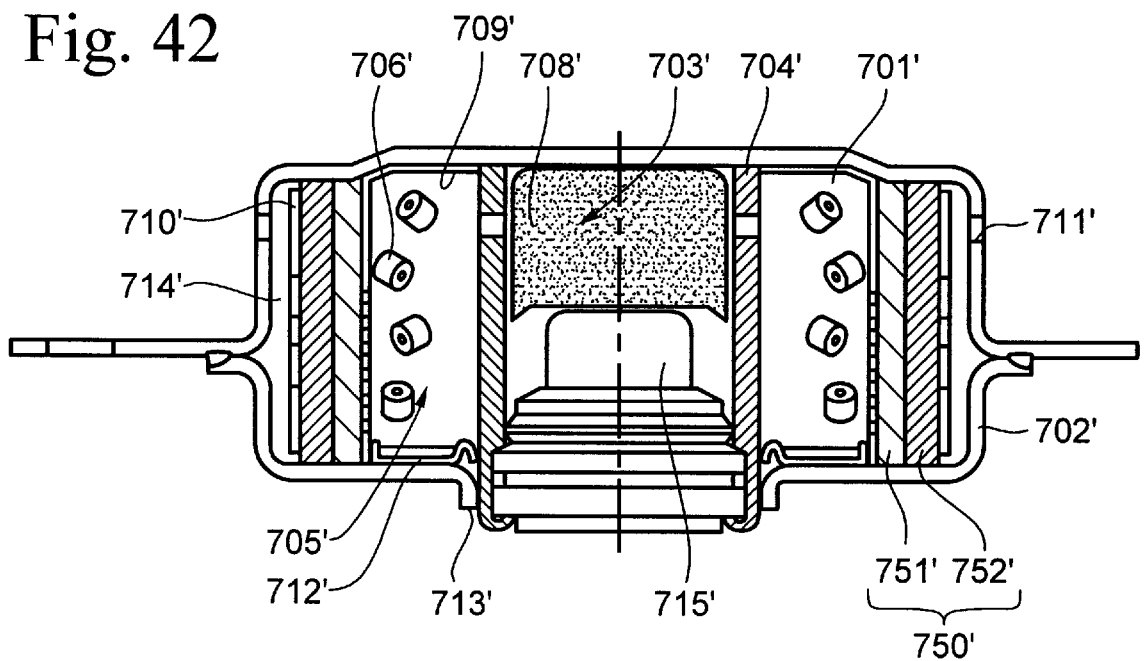
FIG. 42 is a cross-section of yet another embodiment of the airbag inflator of the present invention.

Similar to the airbag inflator as shown in FIG. 33, the airbag inflator, as illustrated in FIG. 42, is characterized in that the coolant/filter 750' consisting of two or more layers, is installed in a housing. This inflator is different from the inflator of FIG. 33 in that a coolant/filter 750' having two or more layers is utilized in an electrically-actuated inflator.

Figure 43:
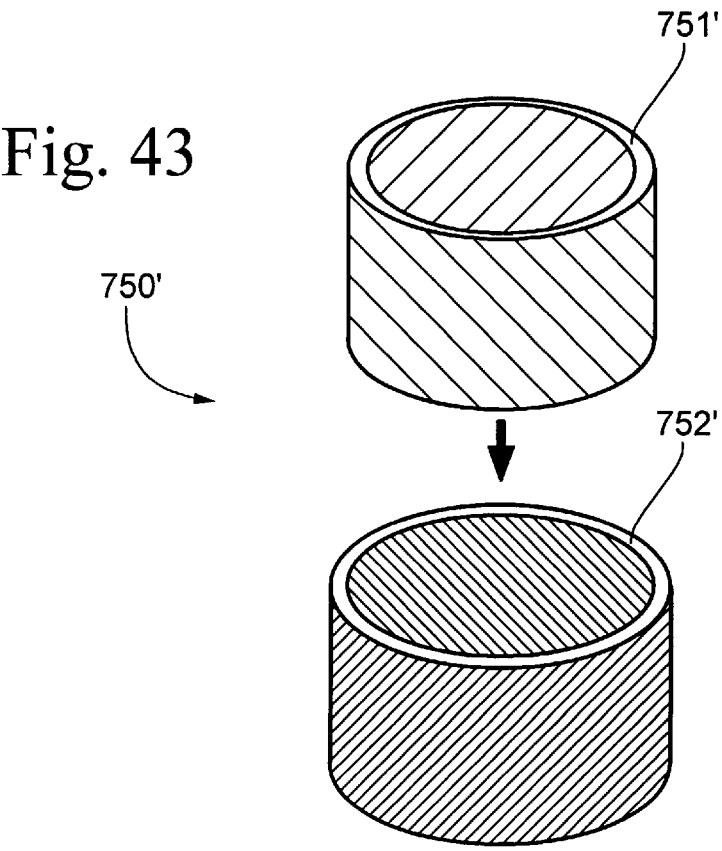
FIG. 43 is a schematic of a coolant/filter of the airbag inflator of FIG. 42.

The inflator of the present embodiment has a housing which includes a diffuser shell 701', having a plurality of gas diffusion ports 711', and a closure shell 702' joined to the diffuser shell 801'. The housing also has a separation wall 703' which defines the housing into two chambers, namely, an ignition device accommodating chamber 704' and a combustion chamber 705'. An ignition device, including a transfer charge 708' and an igniter 715', as described in conjunction with other drawings, is disposed inside the ignition device accommodating chamber 704'. In addition to a coolant/filter 750' having two or more layers, as illustrated in FIG. 43, gas generating propellants 706', a coolant/filter supporting element 709', a ring 710', a plate member 712', and other elements suitable for the actuation of the inflator are installed in the combustion chamber 705'. Also, it is possible to provide, for example, a space 714' outside the coolant/filter 750'.

The coolant/filter 750', consisting of two or more layers, can be constructed by forming an inner layer 751' and an outer layer 752' with different densities or different materials, and superimposing these in a radial direction. When constructing a coolant/filter 750' with layers having different densities, the inner layer 751' can be formed with a coarse metal mesh and the outer layer 752' can be formed with a fine metal mesh. For the coarse metal mesh used in the metal mesh 751', an annular metal mesh layer as illustrated in FIGS. 2–6, which is formed by compressing in a mold, can be used.

The coolant/filter 750' can also be used in mechanically-actuated inflators as shown in FIG. 33.

The Non-Azide Gas Generating Material

The conventional azide gas generating material has the decomposition initiation temperature of 350° C. and the combustion temperature of 1500° K. and, with an ordinary igniter alone, will therefore result in an unstable ignition. Even if ignited, the gas generating material is not burned in a satisfactory condition to exhibit its full performance. Hence, a transfer charge ($B/KNO_3$) is used, which is ignited by the igniter to generate an enough energy to ignite and burn the gas generating material satisfactorily.

It has been discovered that the use, as the airbag inflator's gas generating material, of a non-azide material, which has the decomposition initiation temperature of 330° C. or lower, the combustion temperature of 2000° K. or higher and excellent ignition and combustion characteristics, can obviate the transfer charge that has been required of the conventional airbag inflator. The decomposition initiation temperature is preferably 310° C. or lower.

The non-azide gas generating material used in this airbag inflator can be chosen from a variety of conventionally proposed materials, which include: a compound having as major components an organic nitrogen compound-such as tetrazole, triazole and their metal salts-and an oxygen containing oxidizing agent such as alkali metal nitrate; and a compound which uses triaminoguanidine nitrate, carbohydrazide and nitroguanidine as a fuel and nitrogen source and also nitrate, chlorate and perchlorate of alkali metal or alkaline earth metal as an oxidizing agent. The gas generating material in this invention is not limited to these but can be selected from other materials as required according to such requirements as combustion speed, non-toxicity and combustion temperature. The gas generating material may be formed into appropriate shapes, such as pellets, wafers, hollow cylinders, porous bodies and disks.

When the gas generating material is ignited by the igniter, the greater the surface area of the gas generating material, the easier it ignites. It is therefore desired that the gas generating material be formed into such shapes as hollow cylinders and porous bodies.

The inner volume of the housing of the airbag inflator is preferably in the range of 65 to 115 cc, but may be 60 to 130 cc. The amount of charge of the solid gas generating material is preferably in the range of 30 to 40 g for a driver's side airbag, but may be 20 to 50 g.

When an automotive airbag inflator uses a non-azide gas generating material with the linear burning velocity of 5 to 30 mm/sec under the pressure of 70 kg/cm$^2$, it is required that all the gas generating material be burned completely in 40 to 60 msec for the driver's seat airbag, in 50 to 80 msec for the front passenger seat airbag, and in 5 to 15 msec for the side collision airbag. An internal pressure of the inflator may be controlled as a function of the total area of the gas discharge ports in the diffuser shell. In such a case, to regulate the combustion of the gas generating material, an appropriate setting is made of the ratio A/At, where A is the total surface area of the gas generating material and At is the total area of the gas discharge ports in the diffuser shell. This ratio A/At is set as follows:

For the driver's seat airbag, A/At=100–300, for 20 to 50 g of gas generating material;

For the front passenger seat airbag, A/At=80–240, for 40 to 120 g of gas generating material; and For the side collision airbag, A/At=250–3600, for 10 to 25 g of gas generating material.

When the ratio A/At exceeds the maximum value of each airbag, the pressure in the airbag inflator rises excessively, resulting in the combustion speed of the gas generating material becoming too large. When the ratio is less than the minimum value, the pressure in the airbag inflator does not rise enough, resulting in the combustion speed becoming too small. In either case, the combustion time falls out of the desired range and the airbag inflator with such combustion times is not usable.

To achieve complete combustion in a desired combustion time, it is desired that each piece of the gas generating material have the smallest thickness of 0.01 to 2.5 mm and more preferably 0.01 to 1.0 mm.

Experiments were conducted using four kinds of gas generating material, which were ignited by the igniter using no transfer charge. The result of experiments is shown in Table 1. The igniter uses Zpp (a mixture of zirconium/potassium perchlorate) and has an output of 1250 psi. The composition ratio is a weight %. NQ is a high specific gravity nitroguanidine.

TABLE 1

|  | Composition of gas generating material | Composition ratio |
| --- | --- | --- |
| Embodiment 1 | NQ/Sr(NO$_3$)$_2$ | 55/45 |
| Embodiment 2 | NQ/S(NO$_3$)$_2$/acid clay/ CMC—Na | 35.4/49.6/5/10 |
| Comparison 1 | NaN$_3$/CuO | 61/39 |
| Comparison 2 | NQ/CuO | 26/74 |

TABLE 2

|  | Decomposition initiation temperature | Combustion temperature | Ignition |
| --- | --- | --- | --- |
| Embodiment 1 | 200° C. | 2362° C. | Yes |
| Embodiment 2 | 210° C. | 2270° C. | Yes |
| Comparison case 1 | 350° C. | 1148° C. | No |
| Comparison case 2 | 200° C. | 1253° C. | No |

In the embodiment 1 and embodiment 2, the gas generating material was ignited by the igniter without using a transfer charge.

In the comparison case 1, the gas generating material failed to be ignited without a transfer charge because the decomposition initiation temperature is high and the combustion temperature is too low.

In the comparison case 2, the gas generating material failed to be ignited without a transfer charge because the combustion temperature is low although the decomposition initiation temperature is low.

There is a desire to limit the amount of combustion particulates discharged with the gas from the discharge (diffuser) ports of the inflator housings because such particulates tend to burn an airbag attached to the inflator. An optimum range of particulates is not to exceed 2 g. It should be noted that the combustion temperature of the gas, per se, is not a critical factor for preventing airbag damage.

The coolant/filters of the present invention must work such that the combustion particulates contained in an ordinary amount of the gas generated by the combustion of the gas generating material when the airbag inflator has worked becomes smaller than 2 g, desirably smaller than 1 g, and particularly desirably smaller than 0.7 g. Here, the ordinary amount of the gas generated will be from 0.5 to 1.5 mols in the case of the airbag inflator for an airbag for the driver's seat of an automobile and from 1.5 to 5 mols in the case of the airbag inflator for an airbag for the assistant driver's seat though it may vary depending upon the uses, as a matter of course. In the airbag inflator for an airbag of the present invention, the amount of the combustion particulates contained in the generated gas must be limited to the abovementioned predetermined value irrespective of the amount of the gas generated. In this regard, however, the required number of mols of gas is reduced because of the higher combustion temperatures and attendant higher expanded volume of gas generated by the non-azide gas generating material. Therefore, less propellant is required and smaller inflators are made possible.

The bulk density of such coolant/filters is from 3.0 to 5.0 g/cm³ and preferably 3.5 to 4.5 g/cm³.

The material of the metal meshes will be a stainless steel. As the stainless steel, there can be used, for example, SUS304, SUS310S, SUS316 (specified under JIS), etc. The SUS304 (18Cr-8Ni-0.06C) is an austenite-type stainless steel which exhibits excellent corrosion resistance.

A reinforcing ring having a number of through-holes formed in the whole peripheral wall thereof may be fitted to both or either one of the outer side and the inner side of the coolant/filter, but need not necessarily be used.

The inflators of the present invention use gas generating material of a non-azide type organic nitrogen compound. The non-azide type gas generating material comprises at least an organic nitrogen compound, an oxidizing agent and a slag-forming agent. The gas generating material may be blended with a binder when it is to be molded in a desired shape.

As the organic nitrogen compound, there can be used any compound selected from the group consisting of triazole derivative, tetrazole derivative, guanidine derivative, azodicarbonamide derivative, and hydrazine derivative, or a mixture thereof.

Concrete examples include 5-oxo-1,2,4-triazole, tetrazole, 5-aminotetrazole, 5,5'-bi-1H-tetrazole, guanidine, nitroguanidine, cyanoguanidine, triaminoguanidine nitrate, guanidine nitrate, guanidine carbonate, biuret, azodicarbonamide, carbohydrazide, carbohydrazide nitrate complex, dihydrazide oxalate, hydrazine nitrate complex, and the like. Among them, nitroguanidine and cyanoguanidine are preferred, and nitroguanidine is most preferred having the least carbon atoms in the molecules. The nitroguanidine includes needle-like crystalline nitroguanidine having a low specific weight and a massive crystalline nitroguanidine having a high specific weight, and both of them can be used. However, the nitroguanidine having a high specific weight is preferred from the standpoint of safety at the time of production in the presence of a small amount of water and easy handling.

The compound is used at a concentration of usually from 25 to 60% by weight and, preferably, from 30 to 40% by weight though it may vary depending upon the numbers of carbon atoms, hydrogen atoms and other elements to be oxidized in the molecular formula. The concentration of a trace amount of CO increases in the generated gas when the amount of the compound is larger than a theoretical complete oxidation requirement and the concentration of a trace amount of NOx increases in the generated gas when the amount of the compound is equal to, or smaller than, the theoretical complete oxidation requirement, though the absolute value may change depending upon the kind of the oxidizing agent that is used. The most desired range is the one in which an optimum balance is maintained between the two.

A variety of oxidizing agents can be used such as the one selected from at least nitrates containing cations of an alkali metal or an alkaline earth metal. The amount of its use is from 40 to 65% by weight and, particularly, from 45 to 60% by weight from the standpoint of the concentrations of the above-mentioned CO and NOx, though the absolute value may differ depending upon the kind and amount of the gas generating compound.

There can be also used oxidizing agents such as nitrite and perchlorate that are much used in the field of airbag inflators. It is, however, desired to use a nitrate from such a standpoint that the number of oxygen atoms decreases in the nitrite molecules compared with that of the nitrate and that fine powdery mist that tends to be emitted out of the bag is formed in a decreased amount.

The slag-forming agent works to transform the oxides of alkali metals or alkaline earth metals formed by the decomposition of the oxidizing agent component in the gas generating material composition into a solid from a liquid to permit the coolant/filter better to confine them in the combustion chamber, so that they will not be emitted in the form of a mist out of the inflator. The coolant/filter intercepts the mix of slag-forming agent and powdery residue to cool it and cause it to build into particle sizes which cannot then pass through the coolant/filter. It is this interaction which eliminates the need for a conventional filter structure. An optimum slag-forming agent can be selected depending upon the metal components. Examples of the slag-forming agent include natural clays containing aluminosilicate as a main component, such as bentonite and kaolin, artificial clays such as synthetic mica, synthetic kaolinite and synthetic smectite, and talc which is a hydrated magnesium silicate mineral. Any one of them can be used as the slag-forming agent. A preferred example of the slag-forming agent is an acid clay.

A mixture of oxides of three components of a calcium oxide generated from a calcium nitrate, an aluminum oxide which is a chief component of a clay and a silicon oxide, exhibits a viscosity of from about 3.1 poises to about 1000 poises over a temperature range of from 1350° C. to 1550° C. and a melting point of from 1350° C. to 1450° C. depending upon the composition ratios. By utilizing these properties, the slag-forming performance is exhibited depending upon the mixing composition ratio of the gas generating material composition.

The slag-forming agent is used in an amount of from 1 to 20% by weight and, preferably, from 3 to 7% by weight. When used in too large amounts, the linear burning velocity decreases and the gas generating efficiency decreases. When used in too small amounts, the slag-forming performance is not exhibited to a sufficient degree.

The binder is necessary for obtaining a desired molded article of a gas generating material composition. Any binder can be used provided it exhibits viscosity in the presence of water and solvent without adversely affecting the combustion behavior of the composition. Examples of the binder may include polysaccharide derivatives such as metal salts of carboxymethyl cellulose, hydroxyethyl cellulose, cellulose acetate, cellulose propionate, cellulose acetate butyrate, nitrocellulose, starch and the like. Among them, however, a water-soluble binder is preferred from the standpoint of safety in the production and easy handling. There can be preferably exemplified a metal salt of carboxymethyl cellulose and, particularly, sodium salt.

The binder is used in an amount of from 3 to 12% by weight and, more preferably, from 4 to 12% by weight. When the binder is used on the side of large amounts, the molded article exhibits an increased breakdown strength. The numbers of carbon atoms and hydrogen atoms in the composition increase with an increase in the amount of the binder, resulting in an increase in the concentration of a trace amount of CO gas which is a product of incomplete combustion of carbon and causing the quality of the generated gas to be deteriorated. When the binder is used in an amount in excess of 12% by weight, in particular, the oxidizing agent must be used at a relatively increased ratio, whereby the ratio of the gas generating compound relatively decreases, making it difficult to establish a practicable inflator system.

Furthermore, the subsidiary effect of a sodium salt of carboxymethyl cellulose is that when a molded article is produced by using water, the sodium nitrate formed by the metal exchange reaction with the nitrate which exists in a minute form of a size of molecules causes the decomposition temperature of the nitrate which is the oxidizing agent and, particularly, of the strontium nitrate having a high decomposition temperature to be shifted toward the low temperature side, contributing to enhancing the combustibility.

Therefore, a preferred gas generating material composition used for putting the present invention into practice comprises:

(a) about 25 to 60% by weight and, preferably, 30 to 40% by weight of a nitroguanidine;

(b) about 40 to 65% by weight and, preferably, 45 to 65% by weight of an oxidizing agent;

(c) about 1 to 20% by weight and, preferably, 3 to 7% by weight of a slag-forming agent; and (d) about 3 to 12% by weight and, preferably, 4 to 12% by weight of a binder, and particularly preferably comprises:

(a) about 30 to 40% by weight of a nitroguanidine;

(b) about 40 to 65% by weight of a strontium nitrate;

(c) about 3 to 7% by weight of acid clay; and (d) about 4 to 12% by weight of a sodium salt of carboxymethyl cellulose.

According to the present invention, therefore, there is provided a molded article of a gas generating material for an airbag comprising:

(a) about 25 to 60% by weight of a nitroguanidine;

(b) about 40 to 65% by weight of an oxidizing agent;

(c) about 1 to 20% by weight of a slag-forming agent; and (d) about 3 to 12% by weight of a binder.

As an organic nitrogen compound, dicyandiamide can be preferably used, too.

The gas generating material composition contains the organic nitrogen compound in such an amount that the oxygen balance is most desirably brought near to zero by a proper combination of an oxidizing agent or other additives, though the amount of the organic nitrogen compound may vary depending upon the numbers of atoms and molecular weight of the nitrogen compound and upon the oxidizing agent and the additives. A molded article of an optimum composition can be obtained by adjusting the oxygen balance toward the positive side or the negative side depending upon the concentration of trace amounts of CO and NOx that are generated. When the dicyandiamide is used, for example, its amount will preferably be from 8 to 20% by weight.

The oxidizing agent containing oxygen used in the present invention will be the one that has been widely known in the field of gas generating materials for airbags. It is, however, desired to use an oxidizing agent of which the residue basically assumes the liquid or gaseous form and which forms a high-melting substance so will not to exert thermal load upon the coolant/filter.

For example, the potassium nitrate is an oxidizing agent which is generally used for the gas generating materials. However, the potassium nitrate is not desirable from the standpoint of thermal load upon the coolant/filter, since the principal particulates thereof after the combustion is potassium oxide or potassium carbonate, the potassium oxide decomposing into potassium peroxide and metal potassium at about 350° C., and the potassium peroxide exhibiting a melting point of 763° C. to assume the liquid or gaseous form in the state where the airbag inflator is operated.

The oxidizing agent preferably used in the present invention may be a strontium nitrate. The particulates after the combustion of the strontium nitrate is a strontium oxide having a melting point of 2430° C., which remains almost in a solid state even in a state where the airbag inflator has worked.

There is no particular limitation on the amount of the oxidizing agent used in the present invention provided it is used in an amount sufficient for completely burning the organic nitrogen compound. The amount can be suitably changed for controlling the linear burning velocity and the amount of heat generated. When the strontium nitrate is used as the oxidizing agent for the dicyandiamide, it is desired that its amount is from 11.5 to 55% by weight.

A preferred gas generating material composition of the present invention contains 8 to 20% by weight of dicyandiamide, 11.5 to 55% by weight of strontium nitrate, 24.5 to 80% by weight of copper oxide, and 0.5 to 8% by weight of a sodium salt of carboxymethyl cellulose. The present invention, however, further provides a gas generating material composition containing 8 to 20% by weight of dicyandiamide, 11.5 to 55% by weight of strontium nitrate, 24.5 to 80% by weight of copper oxide, and 0.5 to 8% by weight of a sodium salt of carboxymethyl cellulose.

A non-azide solid gas generating material, comprising nitroguanidine, $Sr(NO_3)_2$, carboxymethyl cellulose, and acid clay at % by weight of nitroguanidine:$Sr(NO_3)_2$:carboxymethylcellulose:acidclay=35.4:49.6:10:5 was ignited in an airbag inflator of the present invention in a tank to generate a gas. The gas generated from the airbag inflator was contained in the tank which was then washed with acetone to collect combustion particulates contained in the gas discharged through the gas discharge ports of the inflator into that tank, in order to measure the amount of the combustion particulates residing in that gas.

As a result, the amount of the gas discharged through the discharge ports of the airbag inflator was one mol, and 0.3 g of combustion particulates were contained therein.

An airbag inflator of the present invention for a passenger side airbag in a similar test produced gas in an amount of 4 mols containing 0.6 g of combustion particulates. Both of these tests show production of less than 2 g of particulates and hence, such results preclude particulate damage to airbags.

ADDITIONAL OPERATING PARAMETERS

It has been discovered by the inventor that to stably burn the non-azide gas generating material requires the maximum pressure inside the airbag inflator to be at least 100 $kg/cm^2$ and that, when the maximum internal pressure exceeds 300 $kg/cm^2$, the housing of the airbag inflator is required to have an excessively large strength, thus making it difficult to reduce the size and weight of the airbag inflator.

Further, the inventor has found that there is no need for pressure control on the maximum internal pressure of the inflator by a discharge impeding fracture plate or the like and that if a small housing (with an inner volume less than 120 cc) has the maximum internal pressure in the range of from 100 to 300 $kg/cm^2$ and the total area of the openings/gas generation in the range of from 0.50 to 2.50 $cm^2/mol$, a desired output curve for inflating the airbag can be obtained.

That is, the present invention provides an airbag inflator, which accommodates a gas generating material in the housing and has a plurality of openings to allow the gas generated from combustion of the gas generating material to flow into the airbag. This airbag inflator is characterized in that the total area of the openings per unit volume of the generated gas is 0.50 to 2.50 $cm^2/mol$ and the maximum internal pressure during operation of the airbag inflator is 100 to 300 $kg/cm^2$.

In implementing this invention, the openings each preferably have an equivalent circle diameter of 3 to 4.5 mm. The word equivalent circle diameter is used instead of a diameter because the openings may have, in addition to a true circle, a shape that can be approximated to circle. This represents a diameter of a true circle that has an area equal to that of the opening in question. For the equivalent circle diameter of the openings less than 2 mm, even if the total area of the openings per unit volume of generated gas is 2.50 cm$^2$/mol or less, the airbag parts located at the outlet of the openings—an airbag if the openings are gas discharge ports of the diffuser of the housing or a coolant/filter if the openings are a combustion chamber wall inside the housing-will be damaged. Increasing the number of openings to prevent this damage results in an increase in the manufacture cost.

In this invention, selection of the non-azide gas generating material is made and the diameter and number of the openings determined in such a way that, in a small housing with an internal volume of 120 cc or less, the maximum internal pressure is controlled in the range of 100 to 300 kg/cm$^2$, preferably 130 to 180 kg/cm$^2$, and the total area of the openings per unit volume of generated gas in the range of 0.50 to 2.50 cm$^2$/mol, preferably 1.00 to 1.50 cm$^2$/mol. This arrangement provides an output curve suited for inflating the airbag. The total area of the openings is determined from (one hole area)×(number of holes).

The airbag inflator of this invention needs only to have a construction, in which a plurality of openings for controlling the combustion of the gas generating material accommodated in the housing are formed in the housing or a separation wall in the housing (simply referred to as an in-housing separation wall) so that a gas produced from the gas generating material flows through the openings into the airbag. The openings each have an area equivalent to the area of a circle 3 to 4.5 mm in inner diameter. It is preferred that a total of 12 to 20 such openings be formed in the housing or the in-housing separation wall, or both, and arranged in the circumferential direction. The maximum internal pressure during the operation of the airbag inflator is determined by the openings formed in either the housing or the in-housing separation wall or by the openings formed in both the housing and the in-housing separation wall. For example, when the openings are formed in both the housing and the in-housing separation wall and the inner pressure of the housing is controlled by the openings in one of the housing and the separation wall, it is possible to appropriately form the openings of the other one of the housing and the separation wall as long as they do not put a further control on the inner pressure.

The openings through which the generated gas passes may be arranged in a row or in a stagger in the circumferential direction of the housing and/or the in-housing separation wall, and may have different areas.

The housing can be formed by casting or forging. It can also be formed by welding, which involves pressing a diffuser shell having openings for discharging gas (gas discharge ports) and a closure shell having a center hole, and joining them together by welding, such as plasma welding, friction welding, projection welding, electron beam welding, laser welding and TIG arc welding. The housing has gas discharge ports. The housing formed by pressing is easy to manufacture and has reduced manufacturing cost. The diffuser shell and the closure shell may be formed of, for example, a stainless steel plate 1.2 to 2.0 mm thick, with the outer diameter of the diffuser shell set to 65 to 70 mm and the closure shell to 65 to 75 mm. A steel plate plated with nickel may be used instead of the stainless steel plate. It is preferred that the housing be formed with a mounting flange and that a narrow space 1.0 to 4.0 mm thick be formed as a gas passage between the housing inner circumferential wall and the coolant. The overall height of the housing is preferably set at 30 to 35 mm.

The separation wall is provided in the housing, as required, for dividing the interior of the housing into two or more chambers. In this invention, the separation wall, which is formed with a plurality of openings that control the combustion of the gas generating material, is a separation wall through which the gas generated from the gas generating material in the combustion chamber passes. Such a separation wall includes a separation wall disposed between the gas generating material accommodating chamber in the housing and the coolant/filter, and a combustion ring. The combustion ring is installed in the housing in such a manner as to surround the combustion chamber and has a number of openings formed in its circumferential wall to control the maximum inner pressure during the combustion of the gas generating material.

The separation wall can also be formed by installing a cylindrical member in the housing and using its circumferential wall as the separation wall. The cylindrical member may be constructed by rolling a stainless steel plate 1.2 to 2.0 mm thick into a tube and welding it. When the cylindrical member is used as the separation wall, too, it is formed with openings.

When it is necessary to prevent entry of outside air (moisture), it is desired that the openings be sealed with a seal tape with a width 2 to 3.5 times the diameter of the openings. The seal tape is designed to prevent ingress of moisture by closing the openings and does not present any hindrance against the generated gas passing through the openings nor does it control the internal pressure of the housing. Hence, the seal tape need only have a thickness enough to prevent entry of moisture. When an aluminum tape is used as the seal tape, the tape thickness is set to 25 $\mu$m or more, for example, to block entry of moisture via the tape surface. In this invention, however, because the maximum internal pressure of the housing is controlled solely by the total area of the openings in order to ensure quick activation of the airbag inflator, when the aluminum tape thickness is 80 $\mu$m or greater, the tape becomes difficult to break even by the ejecting gas from the combustion of the gas generating material and takes some time to be broken, delaying the activation of the airbag apparatus. This may result in a failure to achieve an intended performance of the apparatus. Thus, when an aluminum tape is used as a seal tape, the tape thickness is desirably set to 25 to 80 $\mu$m.

ADVANTAGES AND EFFECTS OF THE INVENTION

In the airbag inflator of this invention, the housing is formed not by forging, which is costly, but by pressing, which is less expensive and easier. The airbag inflator of this invention is therefore advantageous in terms of cost and manufacturability. That is, by pressing the diffuser shell and the closure shell, the manufacture cost is reduced and the manufacture of these shells made easy.

Because the central cylinder member, which has been formed integral with the circular portion of the diffuser shell in the conventional airbag inflator, is formed separately, the shape of the diffuser shell can be made simpler. The separate forming of the central cylinder member and the diffuser shell allows the volume of the central cylinder member to be changed as required independently of the diffuser shell. The central cylinder member can be formed as a single component at low cost by, for example, the UO pressing method.

Because the coolant/filter of the airbag inflator of this invention has, in addition to the cooling function, a function of defining the combustion chamber and a function of arresting combustion particulates, it is possible to eliminate the combustion chamber separation wall member and the filter, both of which have been provided in addition to a coolant in conventional airbag inflators. This reduces the number of components and also the diameter of the airbag inflator, thus realizing a small, lightweight airbag inflator.

The airbag apparatus with this airbag inflator has a reduced number of components in the airbag inflator and a reduced diameter of the airbag inflator. Thus, a small, lightweight airbag apparatus can be realized.

More specifically, the coolant/filter structure of the present invention, constituted as described above, is capable of effectively entrapping even fine combustion particulates. That is, the coolant/filter exhibits an excellent entrapping function in addition to its cooling function, and makes it possible to omit the filter that was previously needed in addition to a coolant.

Furthermore, the coolant/filter structure of the present invention makes it possible to define a pressure chamber such as combustion chamber of the airbag inflator. This makes it possible to omit members for defining the combustion chamber such as combustor cups, combustion rings, etc. that were previously needed in addition to a coolant.

Therefore, the airbag inflator equipped with the coolant/filter device of the present invention uses a decreased number of parts, has a decreased diameter, and can be smaller in size and decreased in weight from conventional inflators.

The coolant/filter device having a predetermined bulk density exhibits very increased shape-retaining strength, is not readily deformed by the gas pressure, maintains a proper combustion particulates-entrapping function, and can be of decreased thickness from conventional coolant and/or filter devices.

Desirably, furthermore, the coolant/filter of the present invention has a swell-suppressing means formed on the outer periphery thereof and maintains a gap or space between the filter of the gas generator and the housing during operation of the airbag inflator.

By maintaining a space between the coolant/filter and the housing, the combustion gas flows through an entire area of the coolant/filter structure. Therefore, the coolant/filter is effectively used, and an effective cooling and purification of the gas is obtained.

Because the airbag inflator of this invention is constructed as described above, the combustion gas passes through the entire area of the coolant/filter structure realizing efficient utilization of the coolant/filter and effective cooling and cleaning of the combustion gas.

The perforated basket protects the inner surface of the coolant/filter from melting without affecting the pressure inside the inflator. Further, the perforated basket prevents direct contact of the coolant/filter and the gas generating propellants, and also prevents the propellants from rubbing against the coolant/filter due to vibration.

The flame-preventing portion of the perforated basket or the flame-preventing plate, which is disposed opposing the row of through-holes in the separation wall, covers the inner peripheral surface of the coolant/filter from flame that gushes toward the coolant/filter, and further causes the gushing flame to be deflected so that the flame sufficiently reaches the gas generating material. Further, by forming the flame-preventing portion and the perforated portion as a unit, a manufacturing process can be reduced and an element for connecting the perforated portion to the flame-preventing portion can be eliminated.

The airbag inflator of this invention obviates the need for a transfer charge that has been used in conventional airbag inflators. Compared with a conventional three-chamber airbag inflator, the airbag inflator of this invention has a reduced diameter, realizing reductions in size and weight. Further, the common igniter/combustion chamber airbag inflator of this invention having no separation wall for enhancer, and having gas generating propellants surrounding the igniter, within the housing, has simplified shapes of the diffuser shell and closure shell that form the housing, which in turn makes the airbag inflator smaller, lighter, and easier to manufacture and less costly.

When sensing a shock caused by a collision, the mechanical-type sensor installed in the airbag inflator of the present invention obviates the electrical shock sensor, the electronic control unit, and harness connecting the sensor and control unit. Thus, the present invention provides an airbag apparatus more compact and lighter in weight as compared to the electrically activated airbag apparatus.

The airbag inflator of the present invention can either be actuated by electrically or mechanically sensing a shock due to a collision.

The airbag inflator of this invention uses a non-azide gas generating material. By controlling the diameter of the openings, through which the generated gas flows into the airbag, and also the total area of openings/amount of gas generated, it is possible to burn the gas generating material stably without using a fracture plate and thereby produce an output curve optimal for inflating the airbag folded in a small container. This invention therefore is advantageous in reducing the size and weight of the airbag inflator.

More specifically, the airbag inflator for an airbag of the present invention uses a non-azide type gas generating material composition containing an organic nitrogen compound, an oxidizing agent and acid clay as essential components, and further uses a coolant/filter having a bulk density of 3.0 to 5.0 g/cm$^3$. Therefore, even when liquid combustion particulates are generated by the combustion of the gas generating material, a slag is formed which is then filtered by the coolant/filter device in the airbag inflator of the present invention. As a result, a minimum amount of combustion particulates pass through the coolant/filter device, and do not cause damage to the airbag.

In the airbag apparatus using the airbag inflator of the present invention, the airbag is not damaged by combustion particulates. Thus, the airbag apparatus is suited for mounting on the automobiles, aircraft, etc. to protect the human body.

The airbag inflator of this invention has a short pass prevention means of the above construction to prevent a short pass of the combustion gas to ensure that all the combustion gas passes through the coolant/filter device, thus effectively cooling and cleaning the combustion gas and assuring normal unfolding of the airbag.

Because of the various constructions described above, the airbag inflator of this invention can burn the gas generating material completely and predictably within a desired length of time.

In the airbag inflator of this invention, the construction of the flange portions in the foregoing embodiments prevents excessive deformation of the housing at the time of activation of the airbag inflator, ensuring normal combustion of the gas generating means and normal flow of the combustion gas, which in turn permits reduction of the thickness of the housing, thereby permitting reductions in size and weight of the airbag inflator.

The flange portion provided on the diffuser shell eliminates the danger of the passenger on the airbag side being injured should the welded portion be broken.

Forming the diffuser shell and the closure shell by pressing realizes a reduction in the manufacture cost and also facilitates the manufacture of the diffuser shell and closure shell.

One or both of the circular portions of the diffuser shell and the closure shell are provided with reinforcement ribs or a reinforcement stepped portion, or both, to prevent deformation of the housing, particularly its circular portions, when the airbag inflator is activated. This in turn prevents a short pass of combustion gas between the inner surfaces of the circular portions and the end faces of the coolant/filter device, thus assuring normal unfolding of the airbag when activated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An inflator for an airbag, comprising:
    a housing having a plurality of gas-discharge ports;
    an ignition device installed in said housing;
    a non-azide gas-generating material installed around said ignition device, said gas-generating material being a solid material ignitable by said igniter to produce combustion gas; and
    a coolant-filter device installed around said gas-generating material, wherein
    the total area of said gas-discharge ports per volume of combustion gas generated within said inflator is in the range of 0.5 to 2.50 $cm^2/mol$.

2. An inflator of claim 1, wherein the maximum internal pressure in said inflator during operation is controlled in a range of 100–300 $kg/cm^2$.

3. An inflator according to claims 1 or 2, wherein the total area of said gas-discharge ports per unit volume of generated gas is 1.00–1.50 $cm^2/mol$.

4. An inflator according to claim 1, wherein the maximum internal pressure during the operation is 130–180 $kg/cm^2$.

5. An inflator as in one of claims 1, 2 or 4, wherein each of said gas-discharge ports has an equivalent circle diameter of about 2–5 mm.

6. An inflator according to claims 1 or 2, wherein said plurality of gas-discharge ports that control the combustion of said gas-generating material are provided in at least one of said housing and a separation wall, separating said ignition device and said gas-generating material, in the direction in which a gas produced by said gas-generating material stored in said housing flows into an airbag.

7. An inflator according to claims 1 or 2, wherein said plurality of gas-discharge ports have one or two different areas.

8. An inflator according to claims 1 or 2, wherein a total of 12 to 24 gas-discharge ports are arranged in said housing or in a separation wall, separating said ignition device and said gas-generating material, in a circumferential direction.

9. An inflator of claim 8, wherein a total of 12 to 20 gas-discharge ports are arranged in said housing or in said separation wall.

10. An inflator according to claims 1 or 2, further comprising:
    a moisture prevention seal tape which seals said gas-discharge ports.

11. An inflator of claim 10, wherein said seal tape is an aluminum tape having a width 2 to 3.5 times the diameter of said gas-discharge ports and a thickness of 25–80 $\mu m$.

12. An inflator of claim 10, wherein said seal tape ruptures in response to combustion of said gas-generating material without controlling the maximum internal pressure created in said housing by said generated gas.

13. An inflator according to claims 1 or 2, wherein an internal volume of the housing is 120 cc or less.

14. An inflator of claims 1 or 2, wherein said non-azide material has a linear combustion velocity of 30 mm/sec or less under a pressure of 70 $kg/cm^2$.

15. A method of controlling the flow of gas from a gas generator to an airbag associated therewith, comprising:
    providing an inflator housing;
    placing a combustible non-azide gas-generating material in said housing;
    providing a plurality of diffusion openings in communication with said gas-generating material and said airbag; and
    correlating the total area of said diffusion openings and the characteristics of said gas-generating material such that said total area/volume of gas generated is in the range of 0.50 to 2.50 $cm^2/mol$.

16. The method of claim 15, wherein said correlating step includes,
    correlating the total area of said diffusion openings and the characteristics of said gas-generating material such that the maximum internal pressure in said housing created by said gas is in the range of 100 to 300 $kg/cm^2$.

17. The method according to claims 15 or 16, wherein said providing step includes,
    setting said total area/volume of gas generated between 1.00 to 1.50 $cm^2/mol$.

18. The method according to claim 15, wherein said correlating step includes,
    correlating the total area of said diffusion openings and the characteristics of said gas-generating material such that the maximum internal pressure in said housing created by said gas is in the range of 130 to 180 $kg/cm^2$.

19. The method according to claims 15 or 16, wherein said diffusion opening providing step includes,
    adjusting the size of said plurality of diffusion openings in the range of circle equivalent diameters of 2 to 5 mm.

20. The method according to claims 15 or 16, wherein said diffusion opening providing step includes,
    providing said diffuser openings in at least one of a housing of said inflator and an inner wall provided in said inflator.

21. The method according to claims 15 or 16, wherein said diffusion opening providing step includes,
    adjusting the size of said plurality of diffusion opening in groups with at least two respective circle equivalent diameters.

22. The method according to claims 15 or 16, wherein said diffusion opening providing step includes,
    providing between 12 and 24 of said diffusion openings in an array in an circumference of said housing.

23. The method of claim 22, wherein said diffusion opening providing step includes,
providing between 12 and 20 of said diffusion openings in an array in the circumference of said housing.

24. The method according to claims 15 or 16, further comprising:
sealing the diffusion openings with a readily frangible moisture proof layer to preclude moisture deterioration of said gas-generating material.

25. The method of claim 24, wherein said sealing step includes,
preparing, as said moisture proof layer, an aluminum tape having a width 2 to 3.5 times the diameter of said gas-discharge ports and a thickness of 25–80 $\mu$m.

26. The method of claim 24, wherein said sealing step includes,
preparing, as said moisture proof layer, a material that ruptures in response to combustion of said gas-generating material without controlling the maximum internal pressure created in said housing by said generated gas.

27. The method according to claims 15 or 16, wherein said inflator housing providing step includes,
providing said housing with an internal volume of 130 cc or less when said inflator is used in a driver side airbag apparatus.

28. The method of claim 15, further comprising:
selecting the non-azide gas-generating material having a linear combustion velocity of 30 mm/sec or less under a pressure of 70 kg/cm$^2$.

29. A method of controlling internal pressures and quality of a predetermined amount of gas produced in a pyrotechnic airbag inflator housing, comprising:
providing a housing having a combustion chamber and an igniter associated with that chamber;
providing a non-azide combustible gas-generating material in said combustion chamber;
providing a coolant/filter structure surrounding said gas-generating material in said combustion chamber;
providing a plurality of gas discharge ports in said housing to convey generated gas toward an airbag at the exterior of said housing;
correlating the total open area of said plurality of discharge ports and the characteristics of said gas-generating material to control the maximum internal pressures generated in said housing by combustion of said gas-generating material; and
further correlating the characteristics of said coolant/filter structure with the characteristics of said gas-generating material for producing combustion contaminants, to effect entrapment of particulates of combustion in said coolant/filter structure to a predetermined degree.

30. The method of claim 29, wherein said non-azide combustible gas-generating material is selected from a solid material having a linear burning velocity of 30 mm/sec or less under a pressure of 70 kg/cm$^2$.

31. The method of claim 30, wherein the total open area of said plurality of discharge ports per volume of combustion gas generated within said inflator is in the range of 0.5 to 2.50 cm$^2$/mol.

32. The method of claim 30, wherein the total open area of said discharge ports per volume of combustion gas generated within said inflator is in the range of 0.5 to 2.50 cm$^2$/mol to control the maximum internal pressure generated in said housing is a range of 100 to 300 kg/cm$^2$.

33. The method as in any one of claims 29 to 32, wherein each of said discharge ports has a circle equivalent diameter of 2 to 5 mm.

34. The method as in any one of claims 29 to 32, wherein the volume of said housing internally of said discharge ports is selected such that in combination with the combustion characteristics of said gas generating material the maximum internal pressure in the housing in maintained.

35. The method of claim 34, wherein said housing volume is 130 cc or less.

36. The method according to claims 29 or 30, wherein the total area of said discharge ports is 1.00 to 1.50 cm$^2$/mol of gas generated in said housing to control the maximum internal pressure generated in said housing in a range of 100 to 300 kg/cm$^2$.

37. The method of claim 36, wherein each of said discharge ports has an equivalent circle diameter of 2 to 5 mm.

38. The method of claim 36, wherein said discharge ports are sized to include ports of at least two different size openings.

39. The method of claim 29, wherein the number of discharge ports is selected in the range of 12 to 20 and positioned circumferentially in the housing between the non-azide gas-generating material and an airbag mounted externally of the housing.

40. The method of claim 36, wherein the volume of said. housing internally of said discharge ports is selected such that the combustion characteristics of said gas-generating material the maximum internal pressure of the housing is maintained.

41. The method of claim 40, wherein each of said discharge ports has an equivalent circle diameter of 2 to 5 mm.

42. The method of claim 40, wherein said housing volume is 130 cc or less.

43. The method of claim 40, wherein each of said discharge ports has an equivalent circle diameter of 2 to 5 mm.

44. The method as in any one of claims 29 to 32, wherein said discharge ports are sized to include ports of at least two different size openings.

45. The method as in any one of claims 29 to 32, further comprising:
sealing said discharge ports with a frangible moisture blocking sealing tape having substantially no controlling effect on said maximum interval pressure range.

46. The method of claim 45, wherein said discharge ports are sized to include ports of at least two different size openings.

47. The method of claim 45, wherein said sealing tape is aluminum tape having a width of 2 to 3.5 times the diameter of said discharge ports and a thickness of 25 to 80 $\mu$m.

48. The method as in any one of claims 29 to 32, wherein the number of discharge ports is selected in the range of 12 to 20 and positioned circumferentially in the housing between the gas-generating material and an airbag mounted externally of the housing.

49. The method of claim 48, wherein said discharge ports are sized to include ports of at least two different size openings.

50. The method of claim 48, further comprising:
sealing said discharge port with a frangible moisture blocking sealing tape having substantially no controlling effect on said maximum interval pressure range.

51. The method of claim 50, wherein said discharge ports are sized to include ports of at least two different size openings.

52. The method of claim 50, wherein said sealing tape is aluminum tape having a width of 2 to 3.5 times the diameter of said discharge ports and a thickness of 25 to 80 $\mu$m.

53. The method of any one of claims 29 to 32, wherein said coolant/filter structure is provided with a pressure loss of $0.3 \times 10^{-2}$ to $1.5 \times 10^{-2}$ kg/cm$^2$ at a flow rate of 100 l/min/cm$^2$ at a normal temperature.

54. The method of claim 53, wherein each of said discharge ports has a circle equivalent diameter of 2 to 5 mm.

55. The method of claim 53, wherein the volume of said housing internally of said discharge ports is selected such that with the combustion characteristics of said non-azide gas-generating material the maximum internal pressure of the housing is maintained.

56. The method of claim 55, wherein said housing volume is 120 cc or less.

57. The method according to claims 29 or 30, wherein the total open area of said discharge ports per volume of combustion gas generated within said inflator is in the range of 1.00 to 1.50 cm$^2$/mol to control the maximum internal pressure generated in said housing in a range of 100 to 300 kg/cm$^2$, and wherein said coolant/filter structure is provided with a pressure loss of $0.3 \times 10^{-2}$ to $1.5 \times 10^{-2}$ kg/cm$^2$ at a flow rate of 100 l/min/cm$^2$ at a normal temperature.

58. The method as in any one of claims 29 to 32, wherein the housing has an outer wall containing said discharge ports; and further includes the step of providing a space between the coolant/filter structure and a circumferential wall to enhance the uniformity of flow of gas from said non-azide gas-generating material throughout the entire body of said coolant/filter device.

59. The method as in any one of claims 29 to 32, further comprising:

providing a peripheral space between the outer periphery of the said coolant/filter structure and the interior of a wall of said housing containing said plurality of discharge ports for enhancing the uniformity of flow through said coolant/filter device of combustion gas from said combustion chamber toward said discharge ports.

60. The method of claim 59, wherein both the coolant/filter device and the peripheral space provided are annular in shape and are substantially coextensive at the outer periphery of said coolant/filter device.

61. The method of claim 60, wherein the radial extent of said peripheral space is in the range of 1.0 to 4.0 mm.

62. The method of claim 61, wherein the radial cross-sectional area $S_t$ of said peripheral space is equal to or greater than the total areas $A_t$ of the gas discharge ports for controlling the maximum internal pressure in said housing.

63. The method of claim 63, wherein the ratio $S_t/A_t$ is in the range of 1–10.

64. The method of claim 62, wherein the ratio $S_t/A_t$ is in the range of 2–5.

65. The method of claim 60, wherein said maximum internal pressure in said housing is in the range of 130 to 180 kg/cm$^2$.

66. The method of claim 65, wherein the radial extent of said annular peripheral space is 1.0 to 4.0 mm.

67. The method of claim 65, wherein the radial cross-sectional area $S_t$ of said peripheral space is equal to or greater than the total areas $A_t$ of the gas discharge ports for controlling the maximum internal pressure in said housing.

68. The method of claim 29, wherein a total weight of combustion particles discharged from said discharge ports is 2 g or less.

69. The method of claim 29, wherein an internal pressure of the airbag inflator, at a time when said non-azide solid gas-generating material is generating a combustion gas, is a function of said total open area $A_t$ of the gas discharge ports.

70. A method of maximizing the gas output of an airbag inflator while minimizing the physical size thereof, comprising:

forming an inflator housing having an internal volume of no greater than 130 cc; and charging said housing with a solid non-azide gas-generating material having a decomposition initiation temperature of 330° C. or lower and a combustion temperature of 2000° K. or higher.

71. The method of claim 70, further comprising:

providing said non-azide solid gas-generating material with a linear burning velocity of no greater than 30 mm/sec under a pressure of 70 kg/cm$^2$.

72. The method of claims 70 or 71, wherein said forming step includes, selecting the inflator housing capacity in the range of 60 to 130 cc and the amount of non-azide solid gas-generating material in the range of 20 to 50 g.

73. An airbag apparatus, comprising:

an airbag inflator including,
  a housing having a plurality of gas-discharge ports,
  an ignition device installed in said housing,
  a non-azide gas-generating material installed around said ignition device, said gas-generating material being a solid material ignitable by said igniter to produce combustion gas, and
  a coolant/filter device installed around said gas-generating material, wherein
  the total area of said gas-discharge ports per volume of combustion gas generated within said inflator is in the range of 0.5 to 2.50 cm$^2$/mol;

an impact sensor for detecting an impact and outputting an impact detection signal;

a control unit for receiving the impact detection signal and outputting a drive signal to the ignition device of said airbag inflator;

an airbag to be inflated by admitting a gas thereto generated by said airbag inflator; and a module case for accommodating said airbag.

74. An airbag inflator for inflating airbags, comprising:

a housing having a plurality of gas discharge ports having a total open area $A_t$;

an ignition device installed in the housing;

a non-azide solid gas-generating material having a given surface area A installed in the housing and ignitable by the ignition device to produce a combustion gas; and a coolant/filter device accommodating the solid gas-generating material and adapted to cool the combustion gas and arrest combustion contaminant particulates from said gas;

wherein the ratio $A/A_t$ of the total surface area A of the solid gas-generating material to the sum $A_t$ of open areas of the gas discharge ports is equal to or greater than 100.

75. The airbag inflator of claim 74, wherein said the ratio $A/A_t$ is 100–300 for a driver side airbag.

76. The airbag inflator of claim 74, wherein the ratio $A/A_t$ is 250–3600 for an airbag for use for side collision protection.

77. An airbag inflator according to claim 74, wherein the non-azide solid gas-generating material has a linear burning velocity of 5–30 mm/sec under a pressure of 70 kg/cm$^2$.

78. An airbag inflator according to claim 74, wherein the non-azide solid gas-generating material has a linear burning velocity of 5–15 mm/sec under the pressure of 70 kg/cm$^2$.

79. an airbag inflator according to claims 77 or 78, wherein the housing has an inner volume of 60–130 cc.

80. an airbag inflator according to claim 74, wherein the housing has an inner volume of 60–130 cc.

81. An airbag inflator as in any one of claims 77 to 80, wherein the amount of the non-azide solid gas-generating material therein is 20–50 g.

82. An airbag inflator according to claim 74, wherein the amount of the non-azide solid gas-generating material therein is 20–50 g.

83. An airbag inflator of claim 74, wherein the total area of said plurality of gas discharge ports per volume of combustion gas generated within said inflator is in the range of 0.5 to 2.50 cm$^2$/mol.

84. An airbag inflator of claim 74, wherein the maximum internal pressure in said inflator is controlled thereby in a range of 100–300 kg/cm$^2$.

85. An airbag inflator according to claim 74, wherein the non-azide gas-generating material is a solid non-azide material ignitable by said igniter to produce combustion gas.

86. An airbag inflator according to claim 74, wherein the quantity of combustion particulates contained in said gas discharged from said gas discharge ports is an amount of not larger than 2 g.

87. An airbag inflator according to claim 74, wherein said inflator is attached to a steering wheel.

88. An airbag inflator according to claim 74, wherein said inflator is installed in a passenger side dashboard.

89. An airbag apparatus, comprising:
   an airbag inflator including,
      a housing having a plurality of gas discharge ports having a total open area $A_t$,
      an ignition device installed in the housing,
      a non-azide solid gas-generating material having a known surface area A installed in the housing and ignitable by the ignition device to produce a combustion gas, and
      a coolant/filter device accommodating the solid gas-generating material and adapted to cool the combustion gas and arrest combustion contaminant particulates from said gas,
      wherein the ratio $A/A_t$ of the total surface area A of the solid gas-generating material to the sum $A_t$ of open areas of the gas discharge ports is equal to or greater than 100;
   an impact sensor for detecting an impact and outputting an impact detection signal;
   a control unit for receiving the impact detection signal and outputting a drive signal to the ignition device of said airbag inflator;
   an airbag to be inflated by admitting a gas thereto generated by said airbag inflator; and
   a module case for accommodating said airbag.

90. An airbag apparatus according to claim 89, wherein the non-azide solid gas-generating material has a linear burning velocity of 5–30 mm/sec under a pressure of 70 kg/cm$^2$.

91. An airbag apparatus according to claim 89, wherein the solid gas-generating material has a linear burning velocity of 5–15 mm/sec under a pressure of 70 kg/cm$^2$.

92. An airbag apparatus according to claim 90 or 91, wherein the housing has an inner volume of 60–130 cc.

93. An airbag apparatus according to claim 89, wherein the housing has an inner volume of 60–130 cc.

94. An airbag apparatus as in any one of claims 90 to 93, wherein an amount of the non-azide solid gas-generating material therein is 20–50 g.

95. An airbag apparatus according to claim 89, wherein an amount of the non-azide solid gas-generating material therein is 20–50 g.

96. An airbag apparatus of claim 89, wherein the total area of said plurality of gas discharge ports per volume of combustion gas generated within said inflator is in the range of 0.5 to 2.50 cm$^2$/mol.

97. An airbag apparatus of claim 96, wherein the maximum internal pressure in said inflator is controlled thereby in a range of 100–300 kg/cm$^2$.

98. An airbag apparatus of claim 89, wherein the non-azide gas-generating material is a solid non-azide material ignitable by said igniter to produce combustion gas.

99. An airbag apparatus of claim 89, wherein the quantity of combustion particulates contained in said gas discharged from said gas discharge ports is an amount of not larger than 2 g.

100. An airbag apparatus of claim 89, wherein said inflator is attached to a steering wheel.

101. An airbag apparatus of claim 89, wherein said inflator is installed in a passenger side dashboard.

102. A method of inflating an airbag, comprising:
   providing a housing having a plurality of gas discharge ports having a total open area $A_t$;
   installing an ignition device in the housing;
   installing a non-azide solid gas-generating material having a surface area A in the housing, said non-azide solid gas-generating material being ignitable by the ignition device to produce a combustion gas;
   providing a coolant/filter device which accommodates the solid gas-generating material and adapted to cool the combustion gas and arrest combustion contaminant particulates from said gas; and
   setting the ratio $A/A_t$ of the total surface area A of the solid gas-generating material to the sum $A_t$ of open areas of the gas discharge ports to be equal to or greater than 100.

103. An airbag inflator for inflating airbags, comprising:
   a housing having a plurality of gas discharge ports having a total open are $A_t$;
   an ignition device installed in the housing;
   a non-azide solid gas-generating material having a surface area A installed in the housing an ignitable by the ignition device to produce a combustion gas; and
   a coolant/filter device accommodating the solid gas-generating material and adapted to cool the combustion gas and arrest combustion contaminant particulates from said gas;
   wherein the ratio $A/A_t$ of the total surface area A of the solid gas-generating material to the sum $A_t$ of open areas of the gas discharge ports is 80–240 for an airbag for a front passenger seat.

* * * * *